Aug. 25, 1964          S. D. SILLIMAN ETAL          3,146,456
                SUPERVISORY REMOTE CONTROL APPARATUS
Filed Feb. 19, 1958                               36 Sheets-Sheet 1

WITNESSES

INVENTORS
Sheldon D. Silliman
& Carl L. Cadwell
BY
ATTORNEY

CONTROL RECEIVER

INDICATION RECEIVER

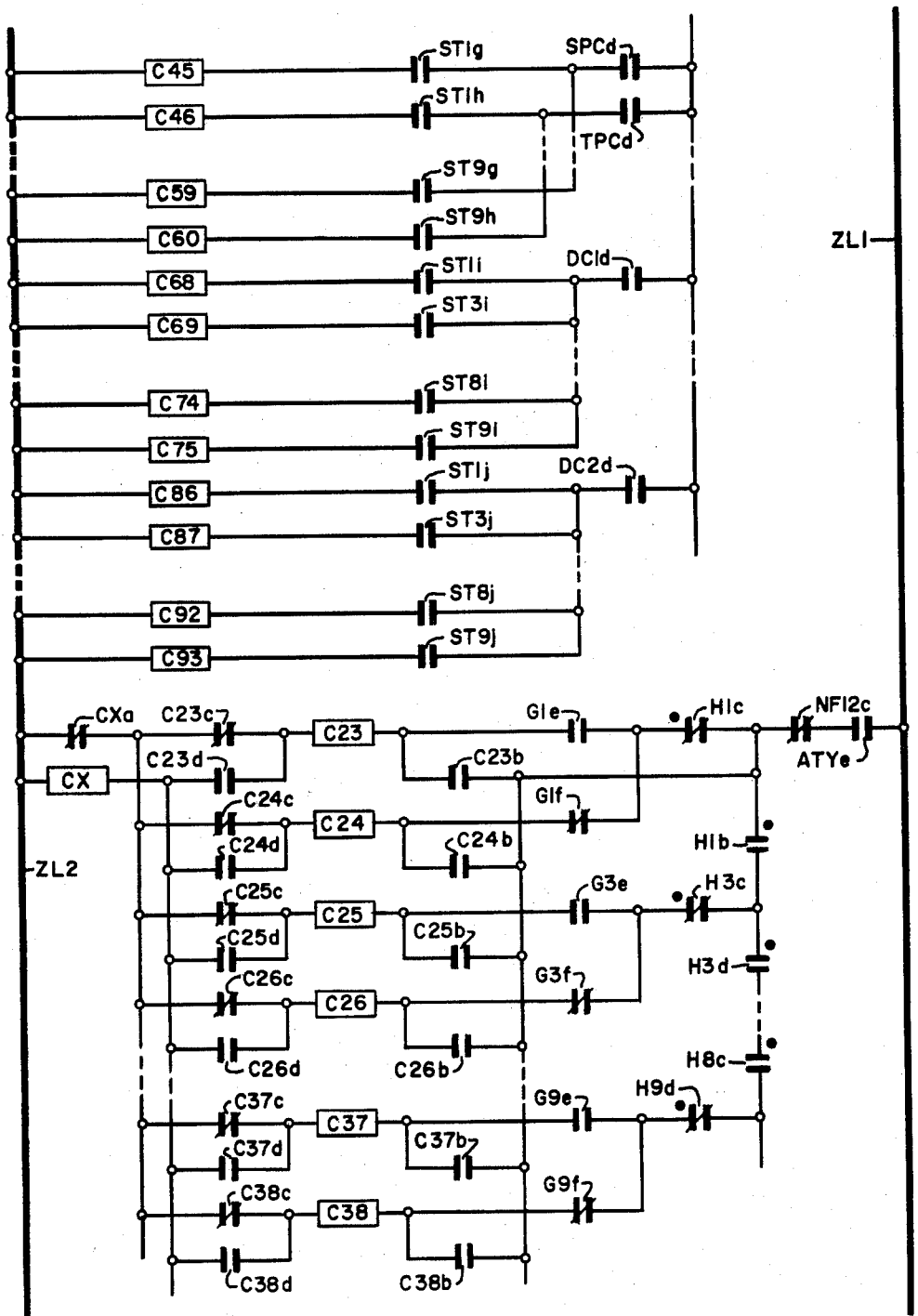
Fig. 5C.   •Actuated in Standby

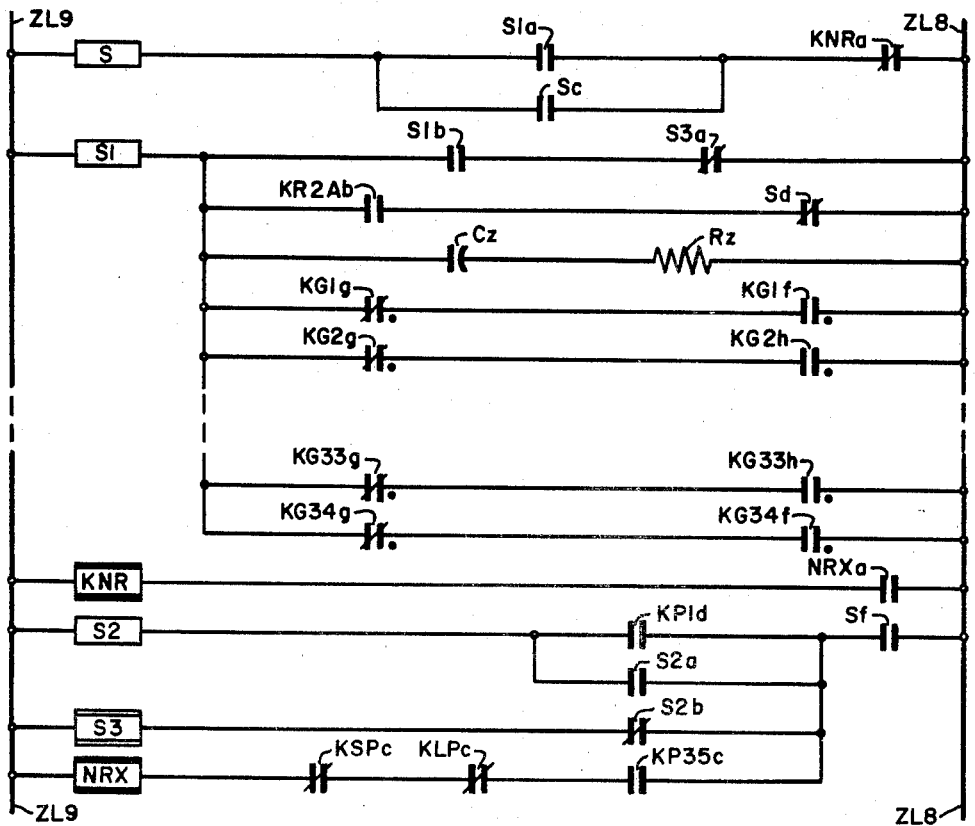
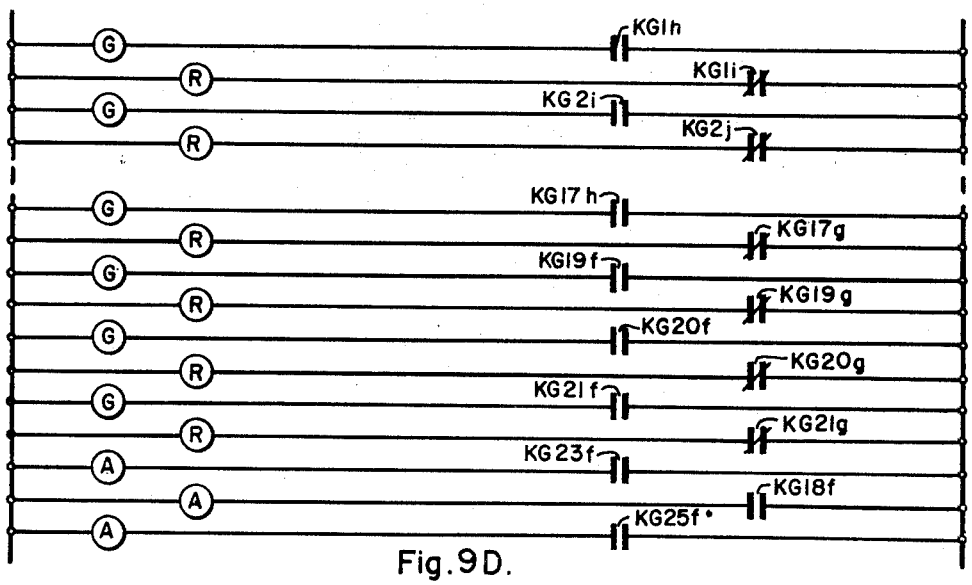
Fig. 9D.

Aug. 25, 1964    S. D. SILLIMAN ETAL    3,146,456
SUPERVISORY REMOTE CONTROL APPARATUS
Filed Feb. 19, 1958    36 Sheets-Sheet 26

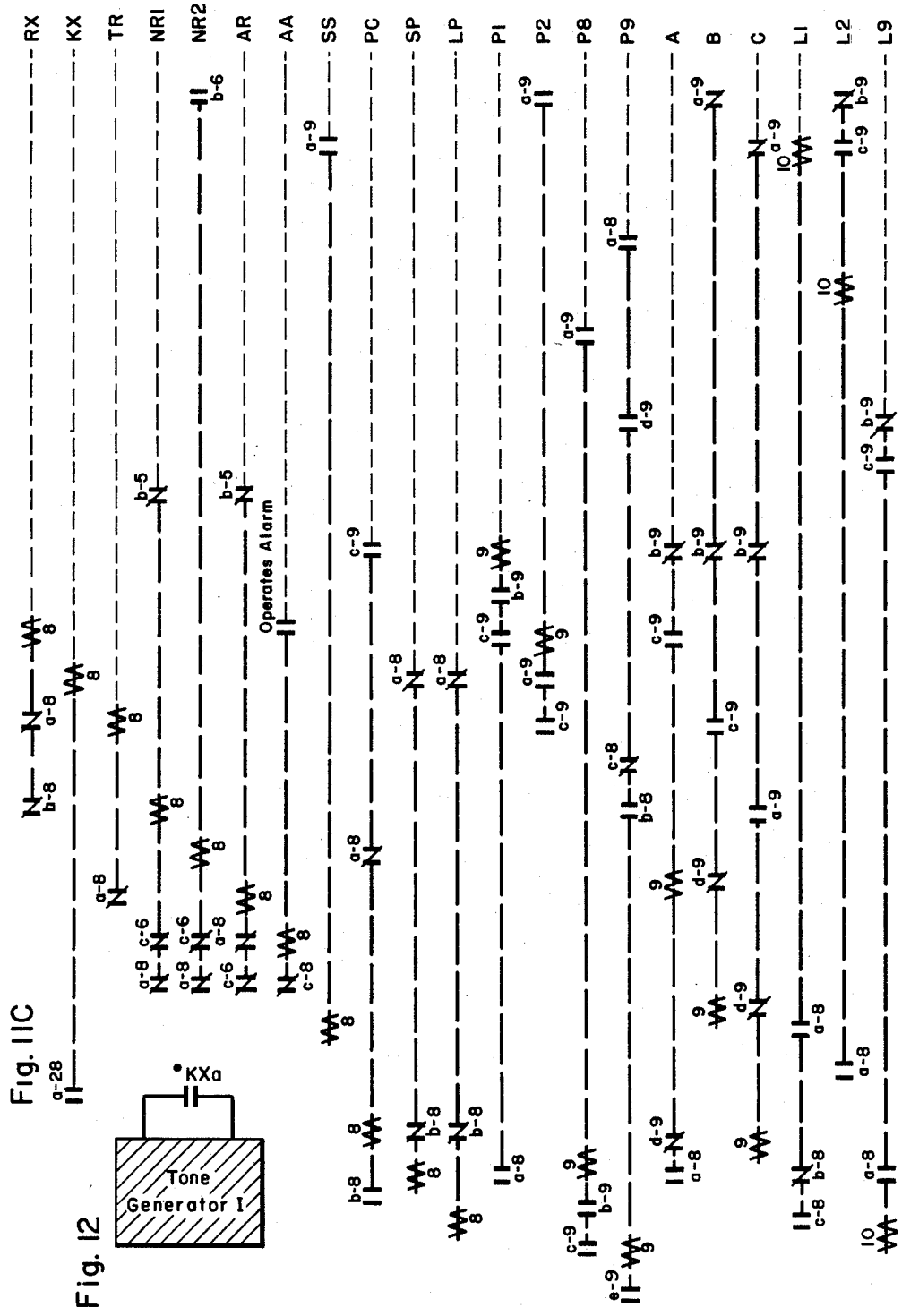

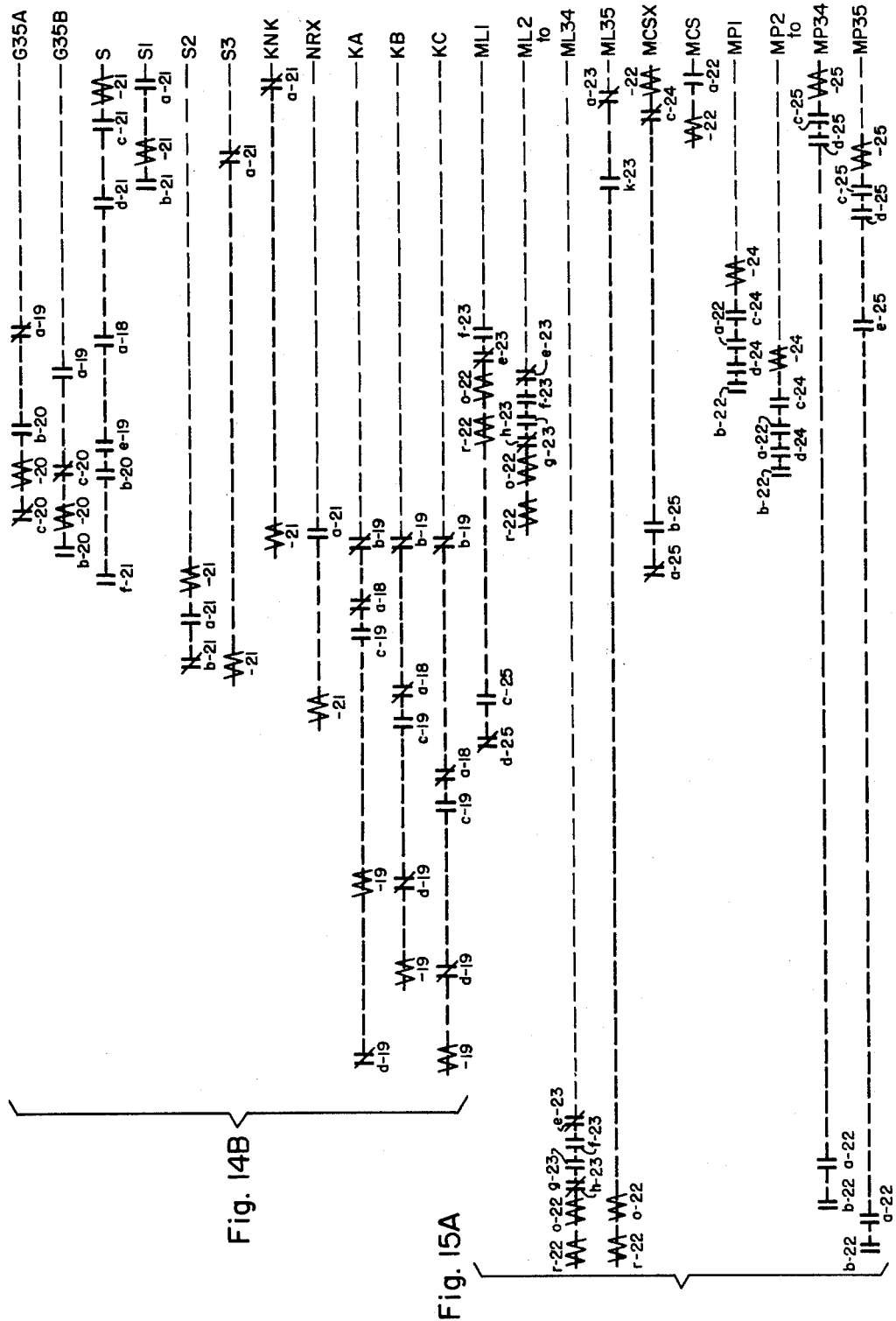

United States Patent Office 3,146,456
Patented Aug. 25, 1964

3,146,456
SUPERVISORY REMOTE CONTROL APPARATUS
Sheldon D. Silliman, Forest Hills, and Carl L. Cadwell, Pittsburgh, Pa., assignors to Westinghouse Electric Corporation, East Pittsburgh, Pa., a corporation of Pennsylvania
Filed Feb. 19, 1958, Ser. No. 716,145
14 Claims. (Cl. 340—163)

This invention relates to the communication art and has particular relationship to supervisory control. In its specific aspects this invention deals with the remote control of complex systems including both apparatus to be remotely controlled and indicators of the state of the apparatus, the setting of which is to be remotely signaled. A broad object of this invention is to achieve effective, accurate and reliable, remote communication of the many control commands for controlling this apparatus and of the many signals identifying the settings of the indicators.

Supervisory control is characterized by the communication of the command or signalling information by coded signals transmitted over a single or a limited number of channels as distinct from the transmission of currents over wires to effect the control or set the signals directly. The codes may for example be transmitted by modulating carrier current passing over a wire or system of wires or they may be beamed by means of a microwave radar system. Where a large number of control commands and the state of a large number of indicators are to be transmitted, there must necessarily be a large number of codes.

This invention concerns itself with supervisory control and supervisory indication in which binary codes are used to identify the information being transmitted. Specifically, the binary code selected is one including a long signal component and a short signal component. A code signal may consist of a predetermined number of such components, selected components being long and the other components being short. Where the number of signal components in a code is equal to $n$, the number of code combinations which may be available is equal to $2_n$. Thus where $n$ is 8 the number of code combination is 256. This number of combinations can be used in the remote control of a relatively complex system.

The long and short components may be and usually are long and short pulses, and where a signal consists of a number of long and short pulses, there is a space between each pulse and the succeeding one. These spaces may be set long or short so that the spaces may also be used in communicating the information. The expression "signal component" used herein is intended to refer to binary coding either with long and short pulses with equal spaces between the pulses or with long and short spaces with equal pulses between the spaces or with both long and short pulses and long and short spaces, the spaces, long or short, being interposed between the pulses, such as disclosed and claimed in copending application Serial No. 824,633 filed July 2,1959 by S. D. Silliman, which is assigned to the same assignee as the present application, and to other analogous identifications.

It is an object of this invention to provide supervisory control and supervisory indication apparatus in which the coding ie effected by means of a binary code, and more specifically to provide apparatus in which the binary code is of the type including a long signal component and a short signal component.

So that this invention may be clearly understood a system to which this invention is actually being applied will be briefly described. This system includes a control station and a chain of controlled stations which cooperate to identify the position and state of a flying object or missile which takes off or is projected from a point near the control station. With reference to the flight path of the object or the trajectory of the missile, the control station is described as up range and the controlled stations as down range, controlled stations more remote from the control station than others being down range with respect to the nearer stations and the nearer stations being up range with respect to the more remote stations. Each of the controlled stations may include radar equipment and equipment for communicating with the flying object. The radar equipment is provided with automatic tracking facilities. Each of hte controlled stations includes indicators and the control station includes master indicators on which the setting of the indicators at the respective controlled stations is signaled.

The control station includes facilities for selecting a controlled station and for setting apparatus at the selected station in a predetermined manner. The selection may be effective manually or automatically in response to the setting of certain signals on the master indicators. Each controlled station includes facilities for reporting back that it is set as command by the control station and also for signalling its setting to the adjacent up-range and down-range controlled stations. Each controlled station also includes automatic means for scanning its indicators and reporting their settings to the control station.

In the practice of this invention the above-described control and signalling is effected by supervisory control in which the code is spelled out in long and short signal components.

In supervisory control and indication apparatus in accordance with the teachings of the prior art in which the coding is effected by means of long and short signals, the identification of each signal as long or short has remained uncertain until each signal was completed. That is, on the receipt of each compenent the receiving apparatus is set initially as if the component will be short; if the signal component turns out to be long, the apparatus is changed. In the transmission of information as to the state of indicators, in accordance with this teaching, the indicators first produce an indication corresponding to a short signal component and if the signal component subsequently turns out to be long, the indication is changed from that corresponding to a short component to that corresponding to a long component. This mode of signalling leads to confusion particularly in situations as in the above example where signal indications are being transmitted frequently. In situations as described above where an operation of apparatus may be started for a signal component identifying an indicator setting this mode of signalling is entirely inapplicable since the starting of an operation corresponding to a short signal component and its change if the signal component turns out to be long is not as a rule feasible.

It is then another object of this invention to provide supervisory control and indication apparatus in which the signalling is effected by means of long and short signal components and in the operation of which each signal component shall be identified before any control or indication function is effected by it and it is a specific object of this invention to provide novel decoding apparatus particularly suitable for use in supervisory control of the just-described type but having other possible uses.

A further object of this invention is to provide a novel method of signalling particularly suitable for supervisory control and supervisory indication in which the signalling is effected by means of a binary code consisting of long and short signal components each of which is identified during the decoding process, and it is a specific object of this invention to provide a novel decoder particularly suitable for practicing this method.

In a system of the above-described type where the control station includes manual selection means for selecting a controlled station and also for selecting the apparatus to be controlled at the latter station and also facilities which automatically respond to changes in signals received from controlled stations to cause changes at one or more of the controlled stations. Confusion and misoperation could result from the concurrent functioning of the manual and automatic control apparatus. It is then an object of this invention to provide supervisory control and indication apparatus including manual and automatic facilities for causing the transmission of control signals in which simultaneous operation of the manual and automatic facilities shall be prevented.

In supervisory control and indication apparatus of the type described, it is necessary to reset the control station, once the sending of a code has been completed and also to recondition the controlled stations for receiving, once a coding operation has been completed. But it may happen that for one reason or another the operation desired has not been effected at either of the stations. Under such circumstances it is also necessary to reset the control station or recondition the controlled station so that the code may be retransmitted or other measures taken.

It is an object of this invention to provide supervisory control and indication apparatus including facilities for resetting the control station after a code has been transmitted and the desired operation effected and alternatively for resetting the control station in the event that the desired operation has not been completed by reason of some misoperation either of the coding system or the apparatus at the controlling or controlled station.

It is also an object of this inventon to provide apparatus for analogously resetting a controlled station.

Another object of this invention is to provide a novel method of communication particularly suitable in the control and resetting of a supervisory control and indication system as described above in which the signalling is effected by a binary code, and a further object of this invention is to provide communication apparatus particularly suitable for practicing this method.

An incidental object of this invention is to provide a novel method of signalling the status of the indicators on a panel which method is particularly suitable for practice with a binary coding system.

In accordance with this invention the control station includes a system for transmitting the apparatus controlling codes to the controlled stations. Each of the controlled stations includes apparatus for receiving, decoding and applying the codes transmitted by the control station. In addition, each of the controlled stations includes a sending system for sending codes to indicate the status of the indicators at the controlled station, and the control station includes apparatus for receiving and decoding the indication codes and presenting their status on a master indication unit at the control station. The master indication unit is interconnected with the control unit at the control station so that certain indication signals received at the control station automatically cause the control station to transmit control information. For supervisory control purposes there is at the control station manual selection units for selecting the controlled station to be operated and for selecting the equipment and the mode of operation of this equipment. In addition there is an automatic selection unit for causing the transmission of codes to operate equipment at any of the controlled stations. To prevent simultaneous response to the automatic and manual selection, an interlock is provided. This interlock prevents the operaton in response to the automatic selection unit once the equipment at a station has been selected and it prevents operation in response to the manual selection once the automatic selection is started. This interlock is such that when the selection is simultaneous the automatic selection unit prevails.

The operation of any selecting mechanism for any selection units selects a code consisting of a predetermined number of long and short signal components. Each signal component of the code is impressed on a tone generator which produces an audio tone that modulates a carrier. The checking of the code is effected by determining if the number of long or short pulses in the code is odd or even as desired. For checking purposes, an additional signal component is produced at the control station. This component is long or short depending on the number of long or short components in the code. If, for example, for checking purposes it is to be verified that the number of long components in the code actually sent is odd or even as predetermined, the checking component is long if the number of long components in the code is to be odd and short if it is even. The checking signal component, in addition to serving for checking, starts the timing out of a timing mechanism. The interval of this mechanism is such that it times out only after a sufficiently long time has elapsed such that an indication of proper operation of the controlled station would be received if the controlled station has operated. If an indication of proper response to the code is received the control station is reset before this mechanism times out. If a report of proper operation is not received the mechanism times out resetting the control station and in addition it energizes an alarm signal to indicate improper operation.

The receiver at the controlled station also includes a long-short pulse discriminator which cooperates with a pulse counter in such manner that each signal is identified before any operation corresponding to the signal takes place. This is achieved in accordance with the invention by providing a counter including a plurality of voltage responsive devices. On the receipt of a signal component, one of these voltage responsive devices is conditioned to respond while the other one remains unconditioned, but as long as the pulse persists, neither of the responsive devices is capable of responding. If the pulse is short, the conditioned voltage responsive device responds after the pulse is terminated. If the pulse is long, the conditioning of the voltage responsive devices is changed following the expiration of a timed interval longer than the duration of the short pulses but shorter than the duration of the long pulse. At the end of this timed interval the unconditioned device is conditioned and the conditioned device becomes unconditioned. The response of the latter device is deferred so long as the long signal component persists. When the signal component is interrupted the now conditioned device operates. The effect is that the responsive device which is first conditioned produces operation for a short pulse and the responsive device which is conditioned if the duration of the signal component is longer than the short duration produces the response for a long signal component.

The identified long and short components constitute a code. The code is subjected to an odd-even check with the aid of the additional signal component transmitted. If this check shows the code to have the proper oddness or evenness of components, a code responsive unit is actuated which in turn actuates the apparatus controlled. In addition, a normal reset unit is actuated, resetting the apparatus and a report unit is actuated sending back a coded report to the effect that the proper operation has been produced. In addition, a timing mechanism is actuated by the code responsive unit and this timing mechanism provides for reset in the event that the desired operation has not been produced within a predetermined time interval.

The supervisory indication system has the purpose of transmitting signal components each of which indicates the status of an indicating device at any of the controlled stations. Usually the indicating devices are of the dual type having either one of two states, for example, the indicating device may be a pair of lamps one of which is red and the other green. In accordance with this invention, the binary coding system is applied to indicate the status or setting of a panel of a large number of lamps. In the preferred practice of this invention, the long signal component indicates one setting or state for an indicator (for example green) and the short signal component the other (for example red).

As many signal components are transmitted as there are indicating devices. For example, if there are 30 indicating devices, 30 signal components are transmitted. In addition, a signal component for odd-even check is transmitted. The transmission of this component is so controlled that the odd-even check component corresponds not to the signalling at the beginning of a cycle during which the indicating devices are scanned, but at the end of this cycle. Thus, if one of the indicating devices has changed indications during a scanning cycle, the overall code will not meet the odd-even check.

The sending cycle is controlled by a memory unit. This unit is connected to respond either to a code signal manually caused to be sent from the control station or automatically to a change in the indicating devices at the controlled station signalling the settings of indicators. In either event, the memory unit sets the apparatus to produce an indicating device scanning cycle at the end of any cycle which happens to be in progress. The new scanning cycle is produced following any scanning cycle whether the indicating device which has changed has already been scanned during the cycle in progress or is about to be scanned. At the beginning of each cycle the memory device actuates a code—signal producing—and counting unit to produce the code. This producing unit actuates a tone generator to produce the signal components which are then impressed to modulate a carrier. If the apparatus meets the odd-even check, the indication sender is reset for another operation by the additional pulse which is produced for checking purposes.

The indication receiver includes a long-short signal component discriminator and a counter unit similar to that of the control receiver. As each component is received and identified, a corresponding indicating lamp is set in a state corresponding to the component. For example, if a short component is received, a red lamp is energized and if a long component is received a green lamp is energized. In addition, the registration of the signal component identifications is subjected to an odd-even check which takes place when the additional signal component is received. If the check is satisfied, a normal reset unit is actuated to reset the indication receiver. If the check is not satisfied, there is an alarm. There is also an alarm indication if transmission disturbance, for example static, has produced an extra pulse not sent.

The apparatus also includes a timing mechanism which starts a timing operation at the end of each signal component. The interval which this mechanism times is longer than the pause between signal components. Thus, so long as a signal is being transmitted, the timing component fails to time out. On interruption of the coding, the signal component times out. This component is locked out when the check pulse is received. But if these events fail to occur or if the signaling is interrupted before the end of a scanning cycle, the timing mechanism times out and resets the apparatus and in addition produces an alarm signal.

The novel features considered characteristic of this invention are disclosed generally above. The invention itself both as to its organization and as to its method of operation, together with additional objects and advantages thereof, will be understood from the following description of specific embodiments when read in connection with the accompanying drawings showing diagrammatically the essential parts as far as this invention is concerned of a control station and of a controlled station of the type described above. In the drawings.

Figure 1:
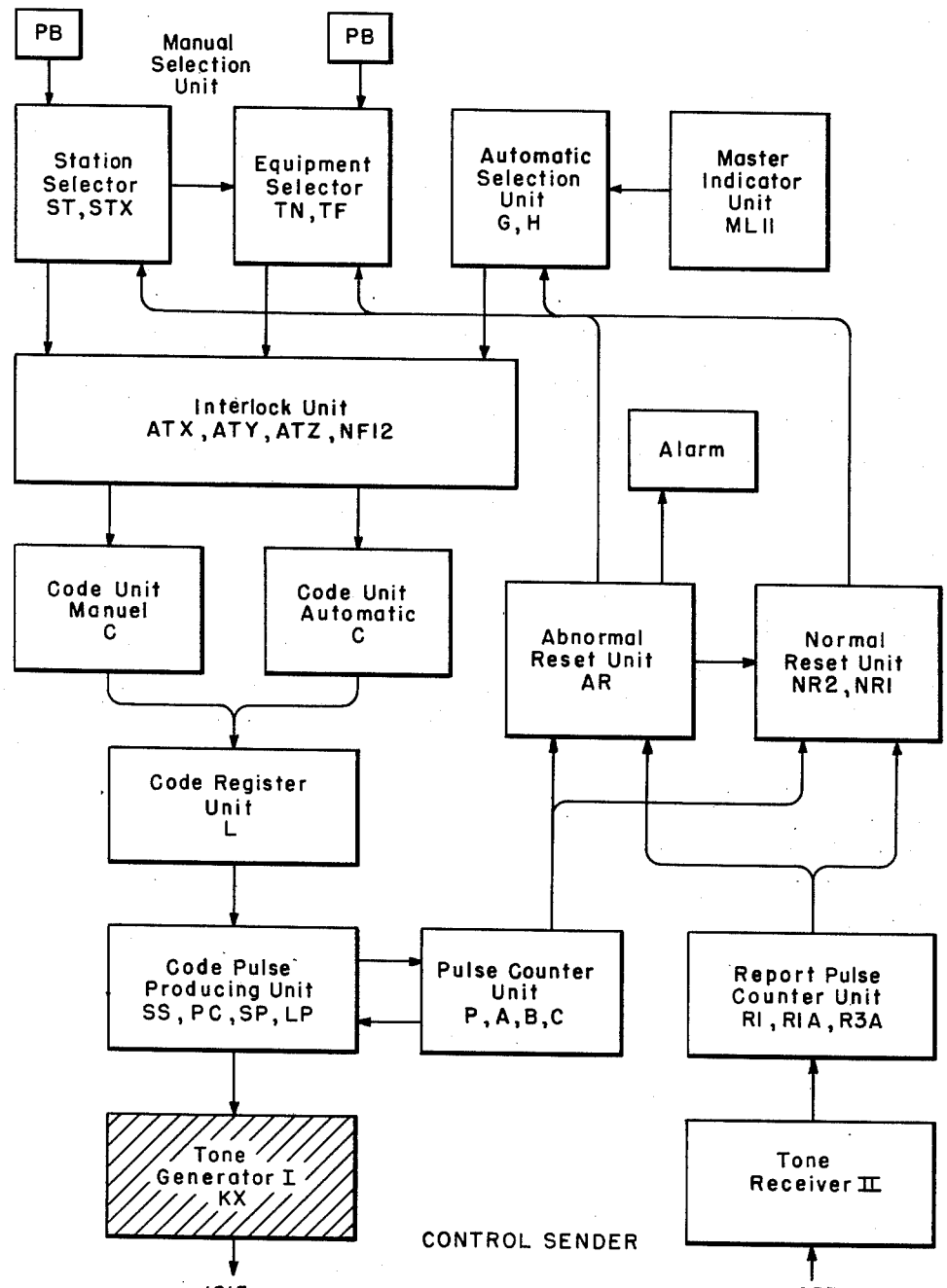
FIGURE 1 is a block diagram showing a control sender in accordance with this invention which is located at the control station mentioned above.
Figure 2:
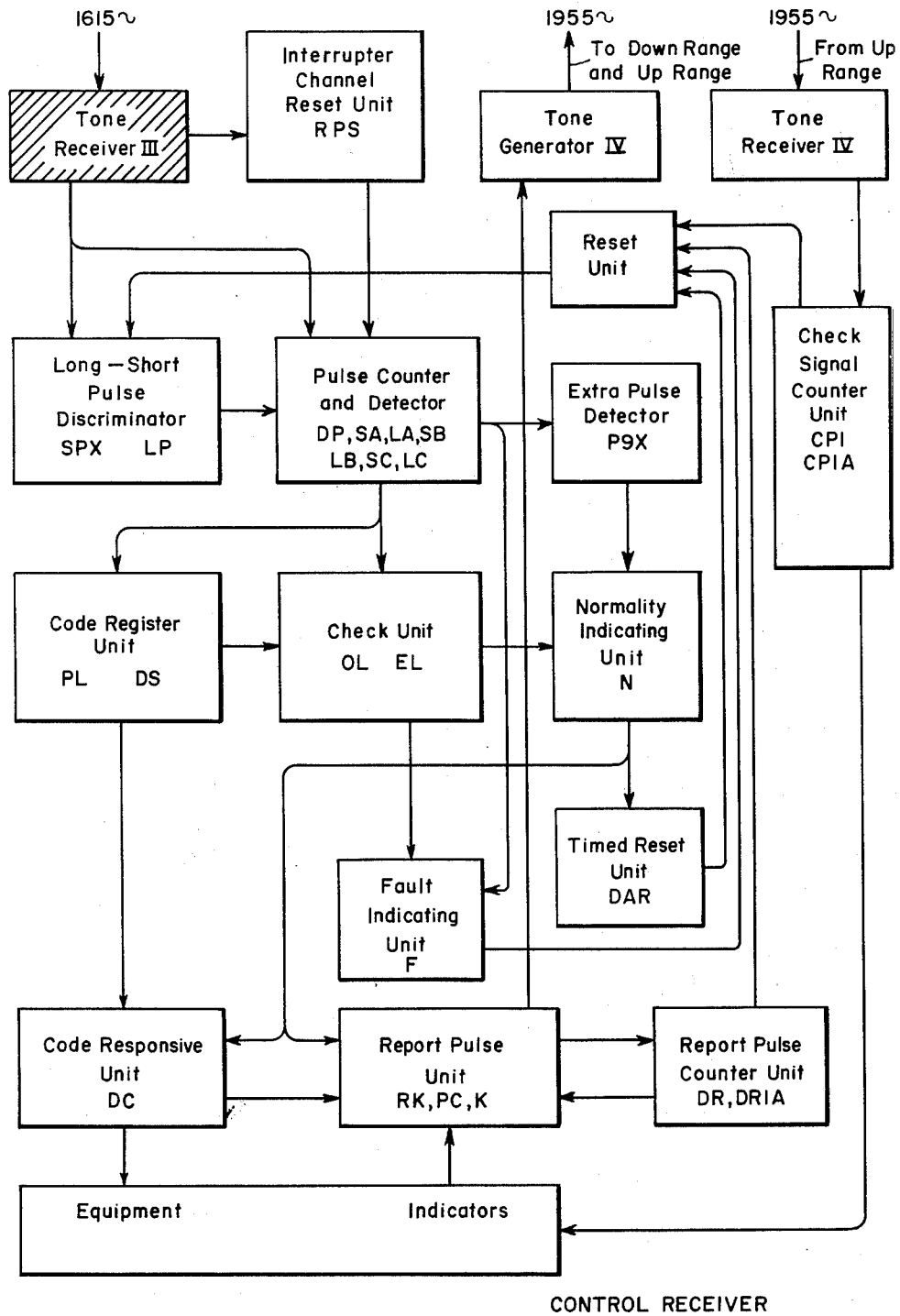
FIG. 2 is a block diagram showing a control receiver in accordance with this invention which is located at any controlled station.
Figure 3:
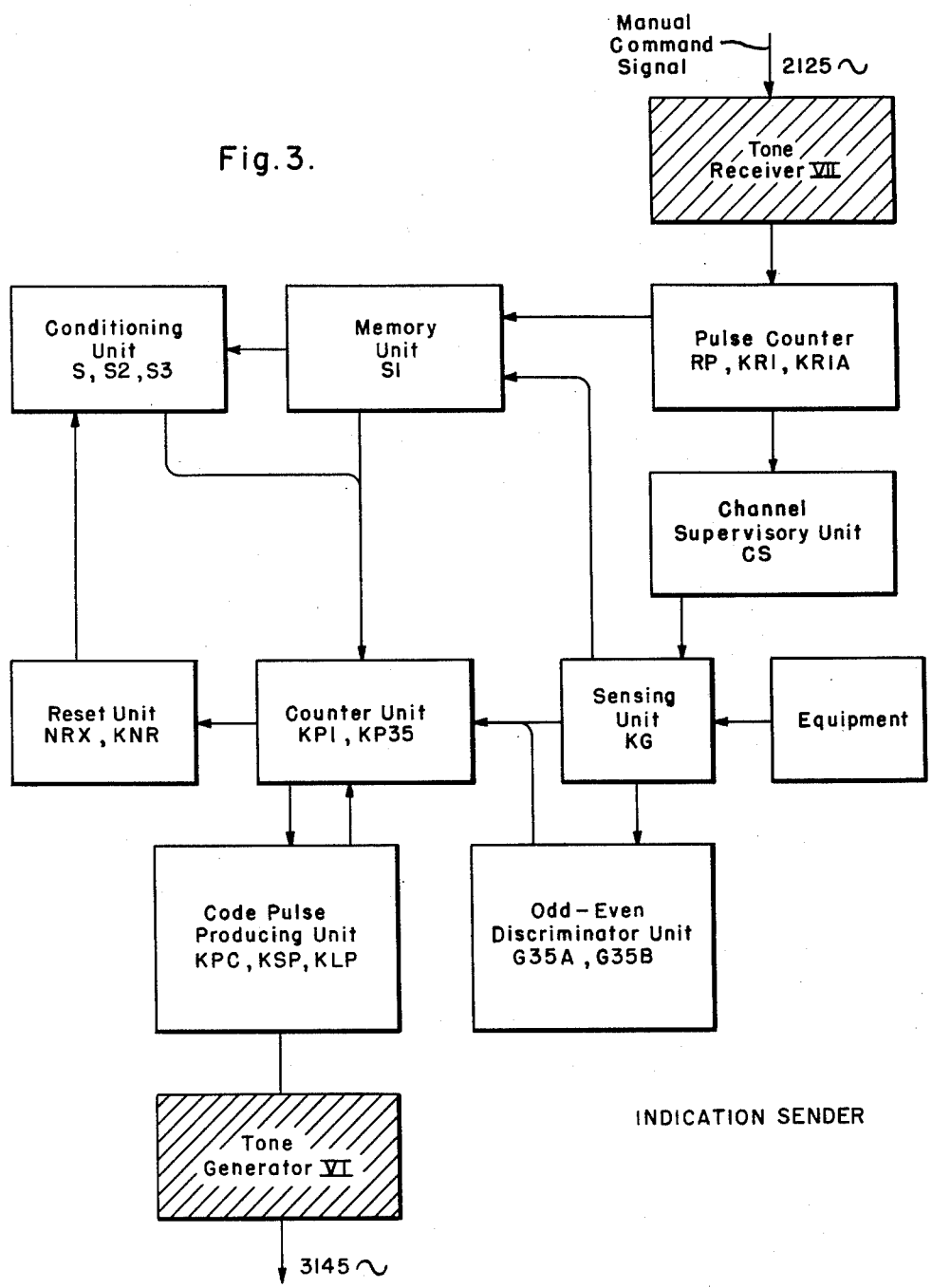
FIG. 3 is a block diagram showing an indication sender in accordance with this invention located at any controlled station.
Figure 4:
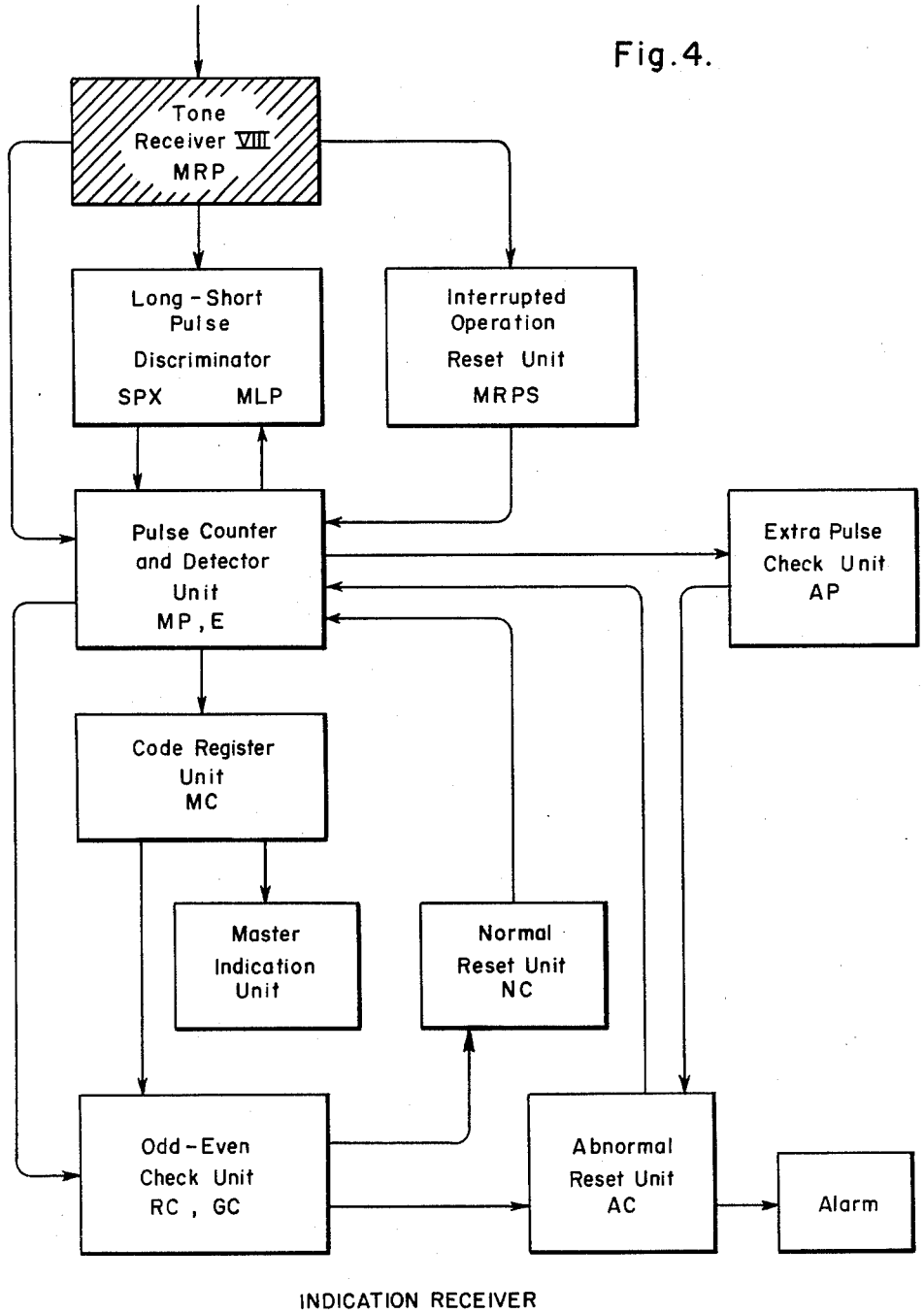
FIG. 4 is a block diagram showing an indication receiver in accordance with this invention located at the control station.
Figure 7:
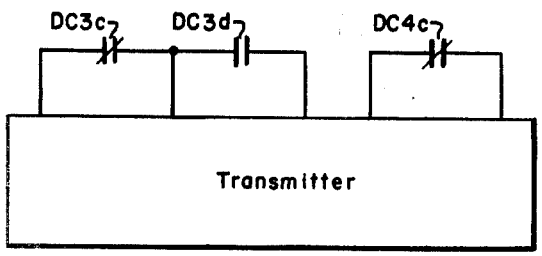
Figure 8:
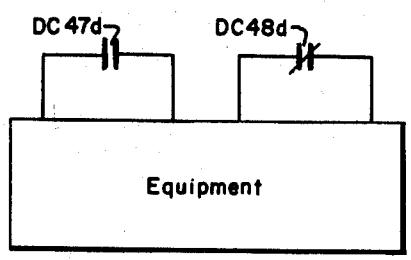
Figure 11A:
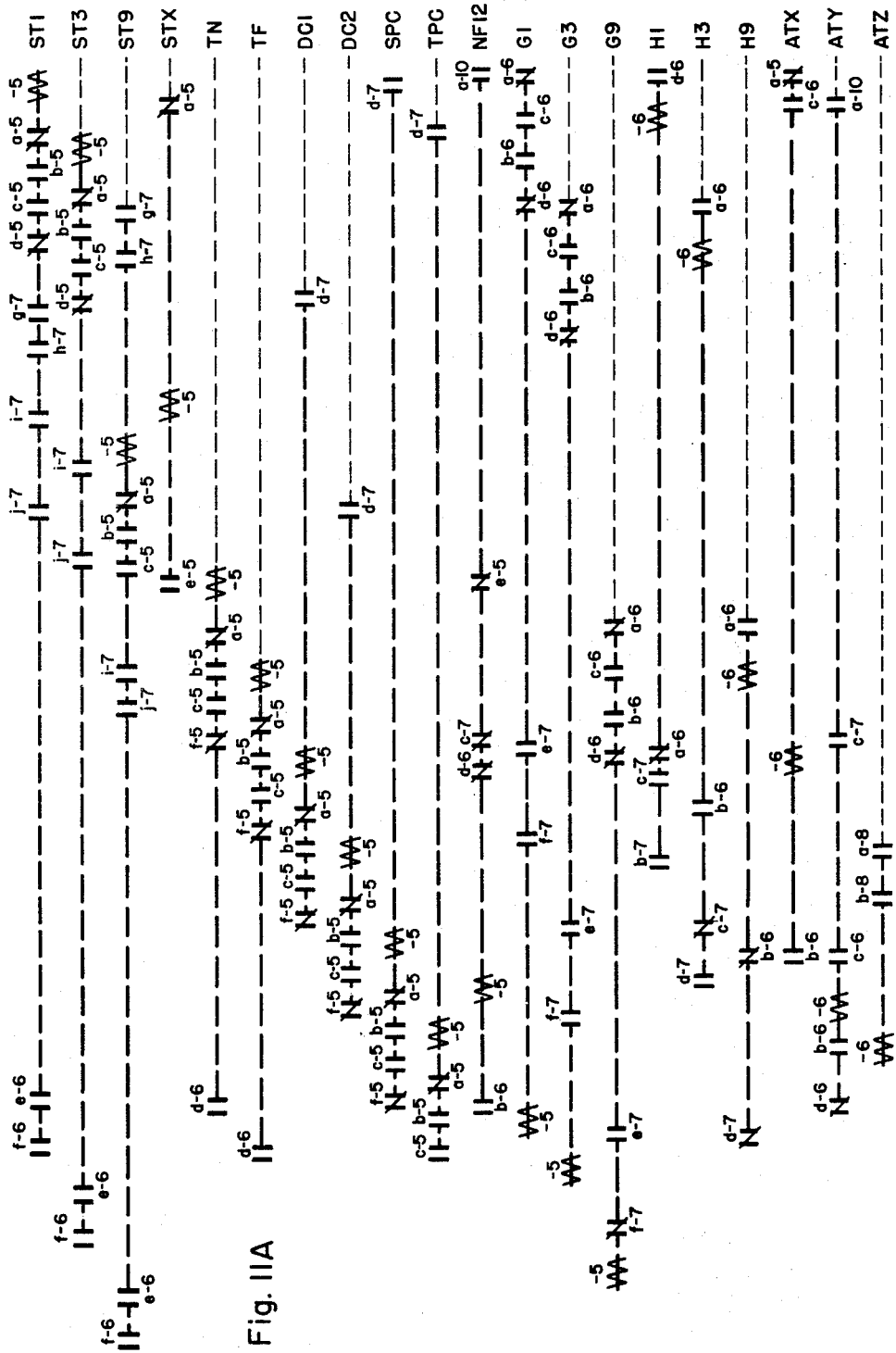
Figure 11B:
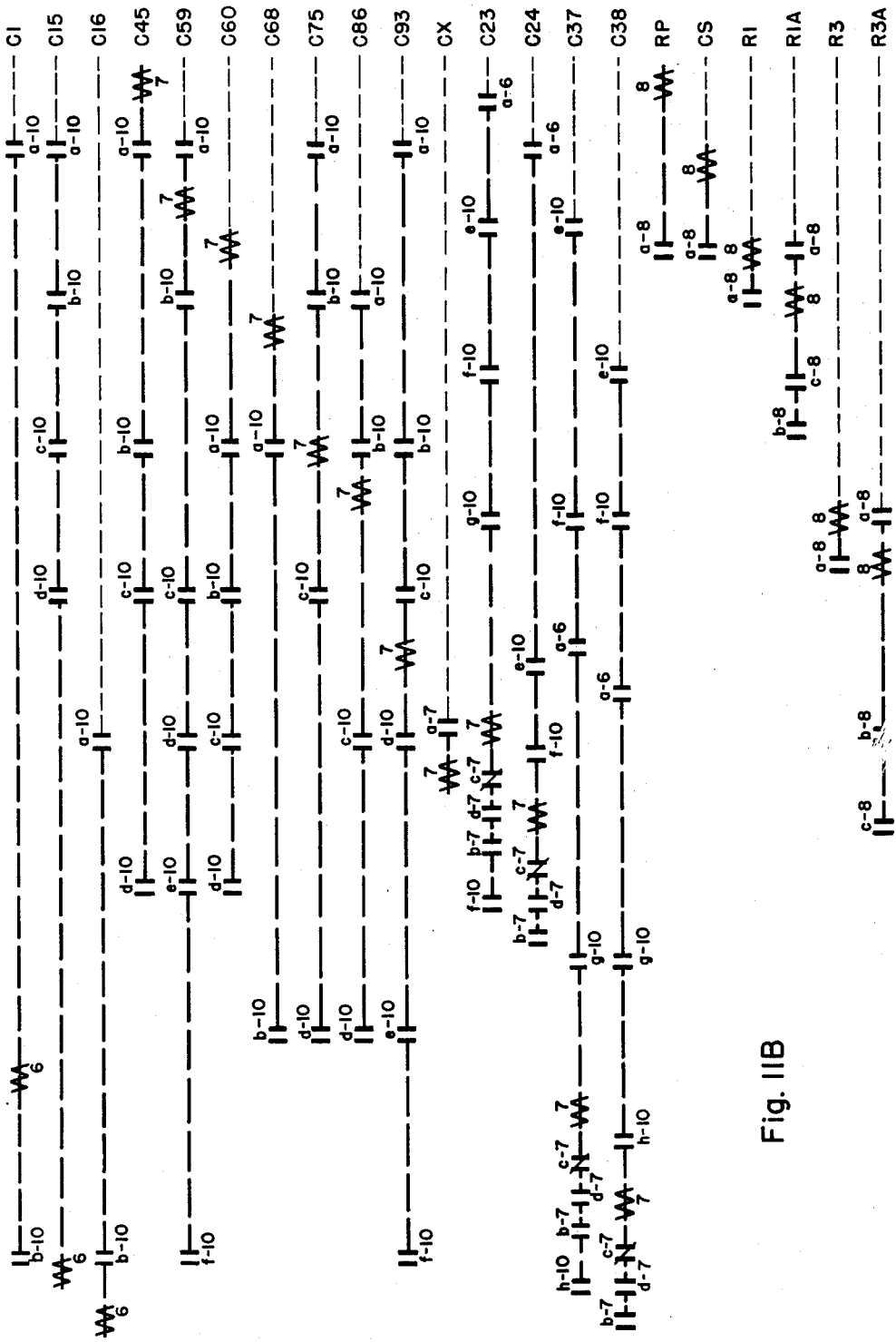
Figure 13A:
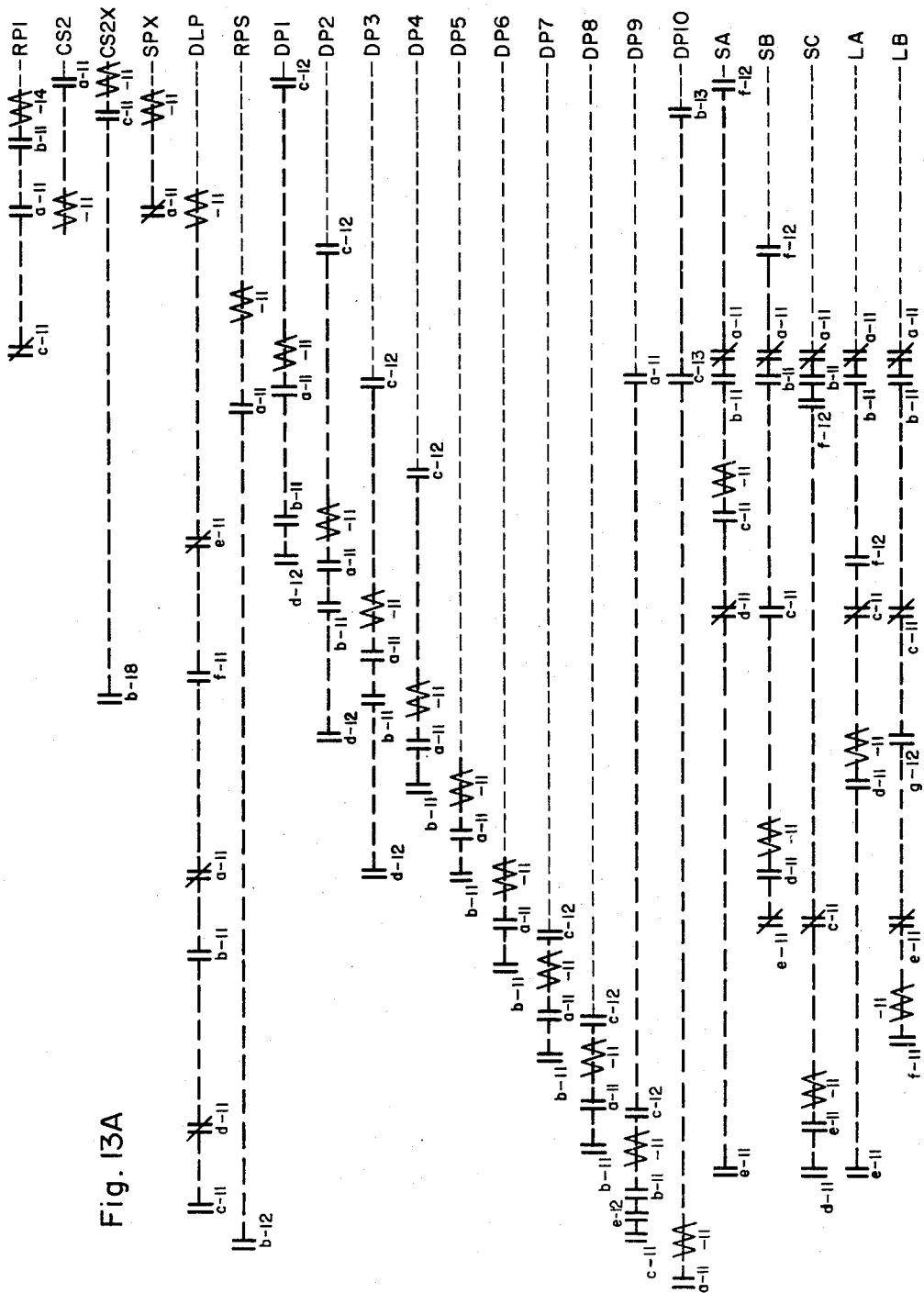
Figure 13B:
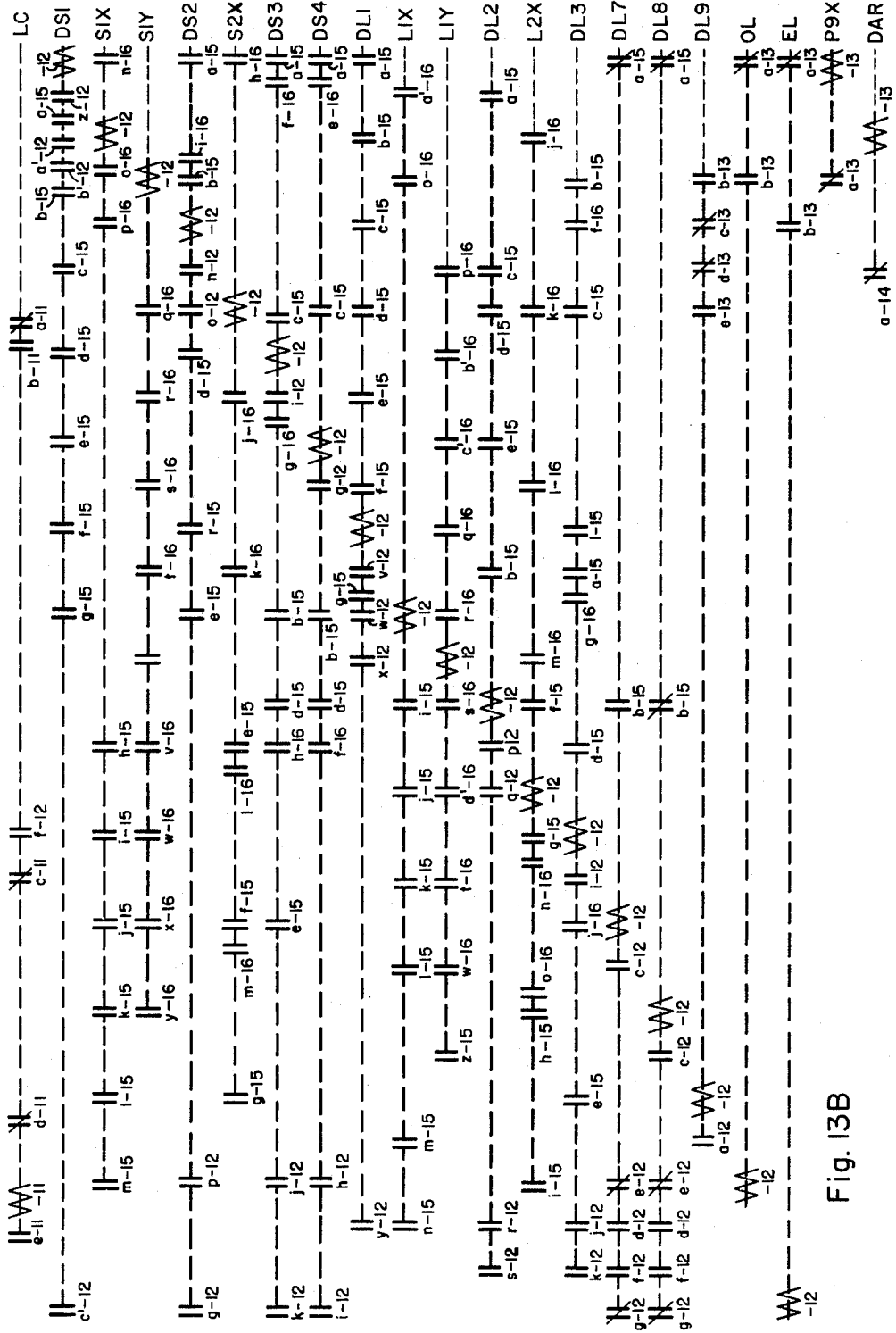
Figure 13C:
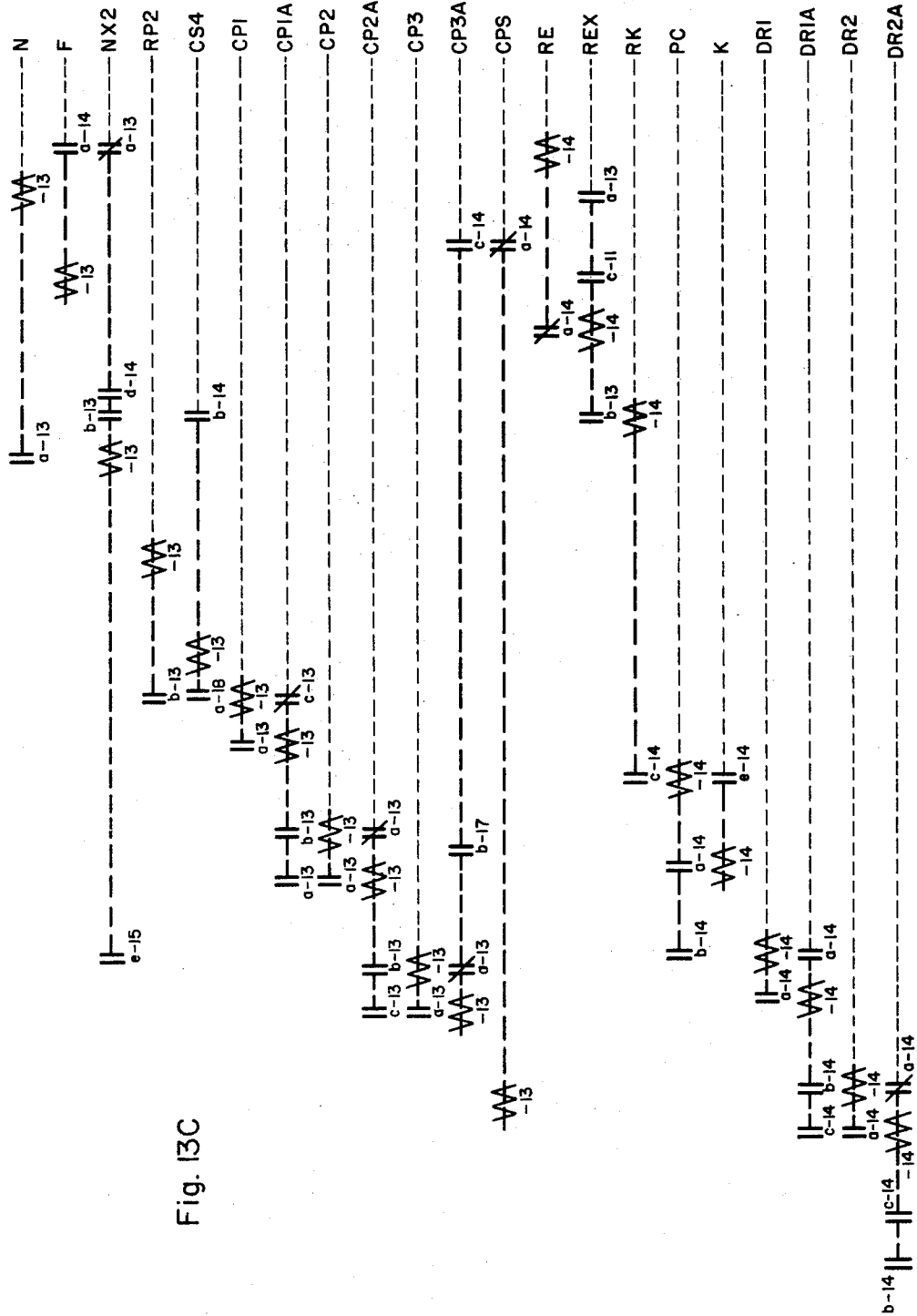
Figure 13D:
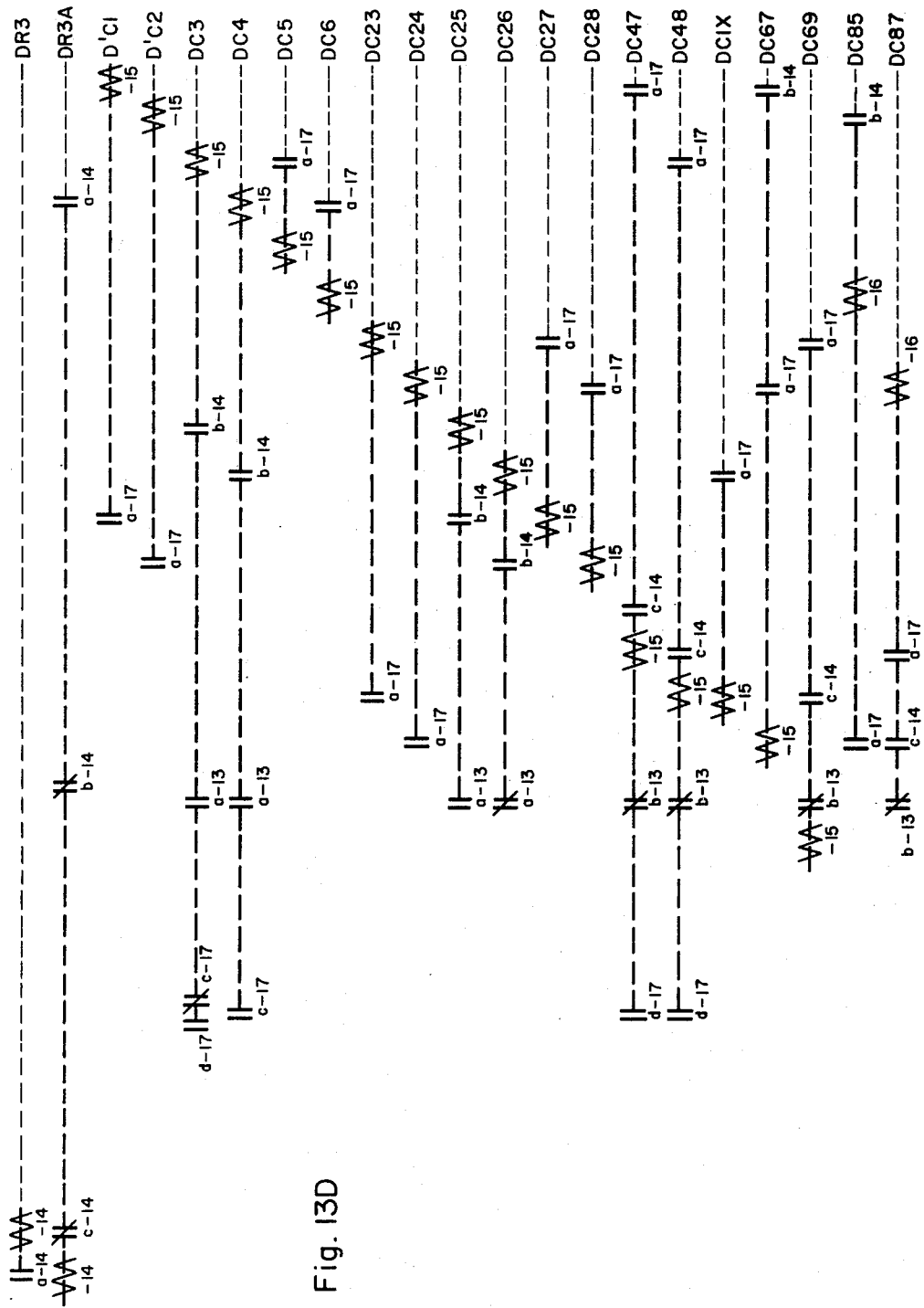
Figure 13E:
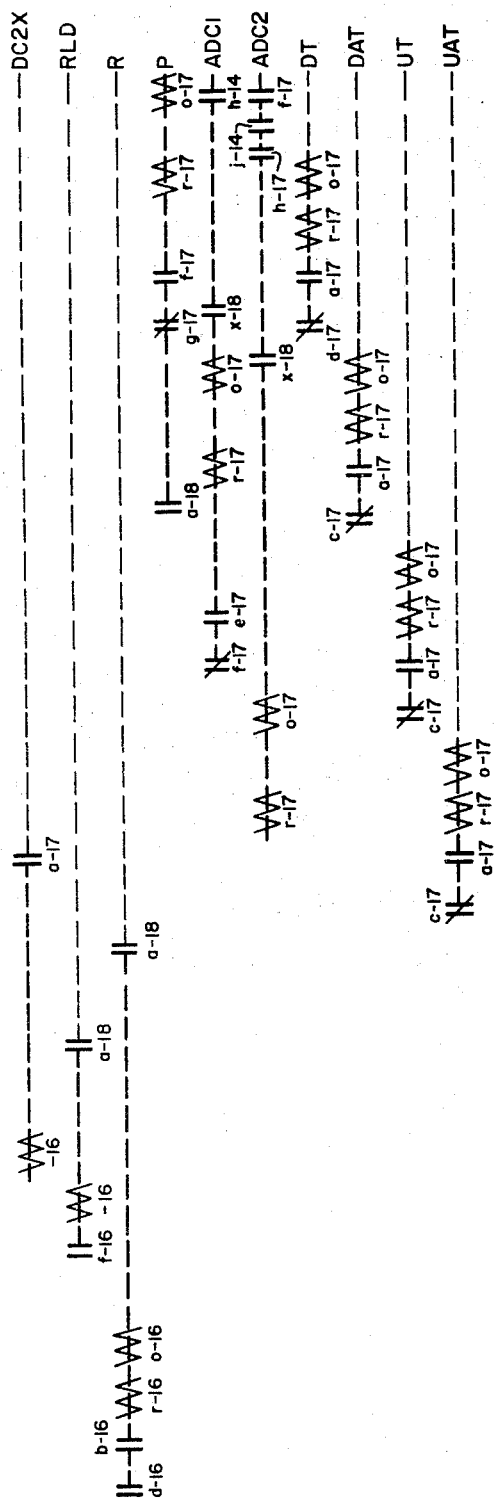
Figure 14A:
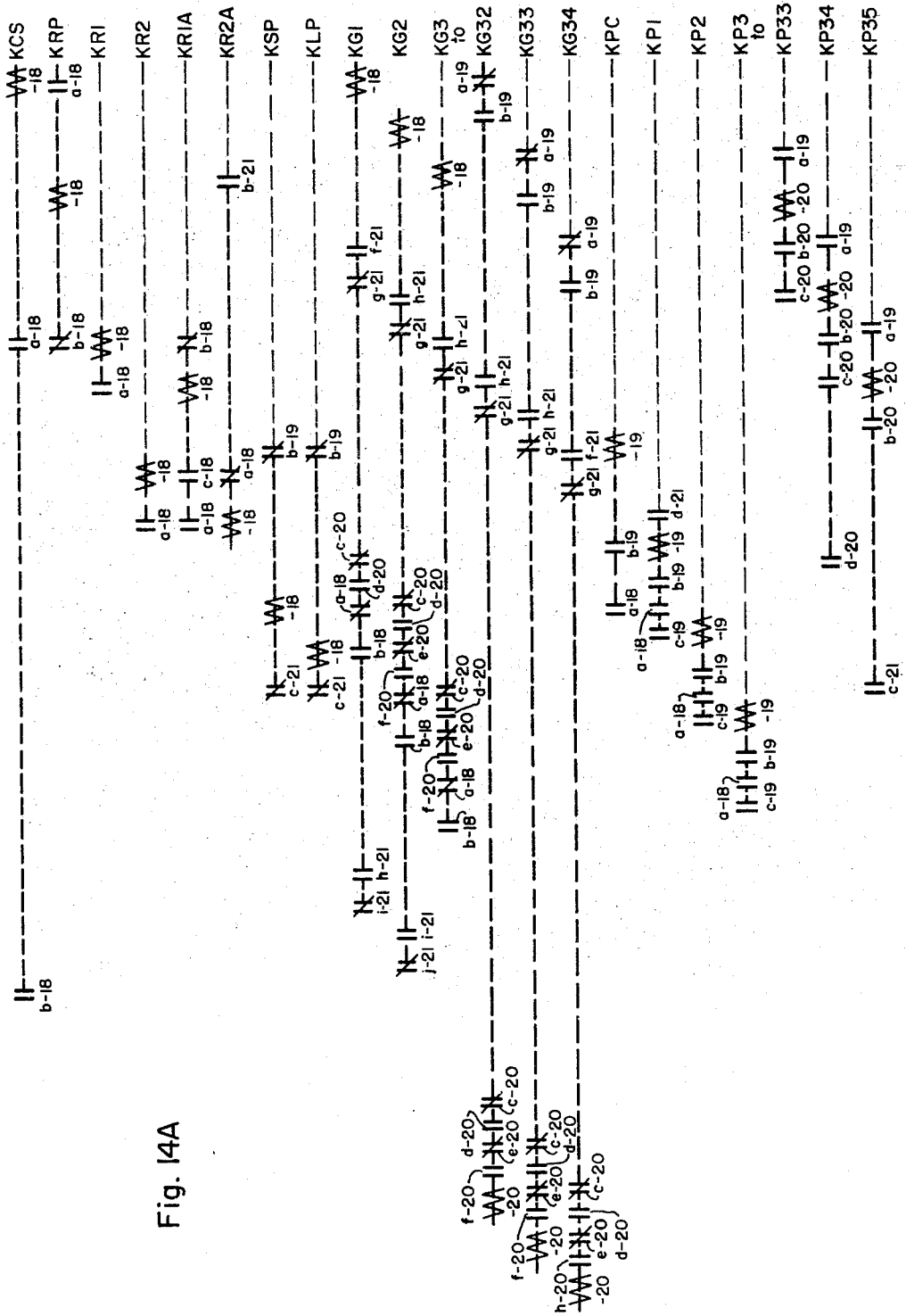
Figure 15B:
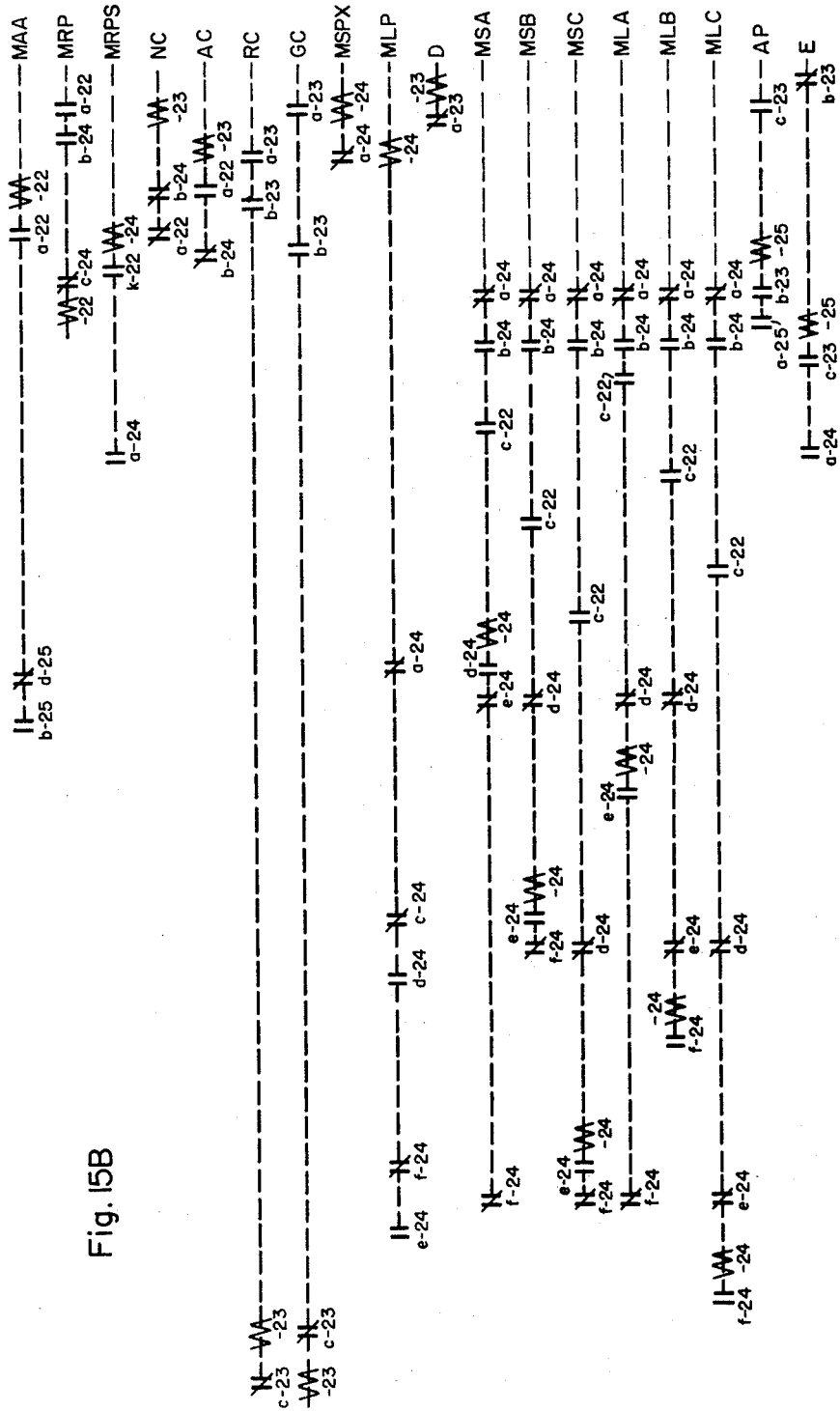

FIGS. 5A through 5F together constitute a circuit diagram of a control sender such as is shown in FIG. 1;

FIGS. 6A through 6F together constitute a circuit diagram of a control receiver such as is shown in FIG. 2;

FIGS. 7 and 8 are diagrammatic views showing the manner in which apparatus is controlled by the control receiver at a controlled station;

FIGS. 9A through 9D together constitute a circuit diagram of an indication sender such as is shown in FIG. 3;

FIGS. 10A through 10E together constitute a circuit diagram of an indication receiver such as is shown in FIG. 4;

FIGS. 11A through 11C are key representations of the relays in the control sender showing the positions of the coils and contacts of the relays in FIGS. 5A through 5F;

FIG. 12 is a diagrammatic view showing a portion of the apparatus of the control sender;

FIGS. 13A through 13E are key representations of the relays in the control receiver showing the positions of the coils and contacts of the relays in FIGS. 6A through 6F;

FIGS. 14A and 14B are analogous key representations for the indication sender; and FIGS. 15A and 15B are analogous key representations for the indication receiver.

*Introductory Comment*

In the practice of the invention shown in the drawings the signal components are long and short pulses. The invention is practiced by the selective operation of a plurality of digital components. In the practice of this invention digital components of different types such as thermionic tubes or thyratrons, magnetic amplifiers, transistors and flip-flop networks of various types may be used. But in the apparatus disclosed herein the digital operation is effected by electromagnetic relays.

The coils of the relays are each represented in the circuit diagrams by a small rectangle. A simple single-line rectangle represents a fast-acting relay except in cases where a capacitor of substantial capacity (say 30 microfarads) is connected across the coil. Such a relay is actuated immediately on being energized but drops out after a predetermined time delay on being deenergized. When the coil as shown is a rectangle with a double line along the length the relay is actuated immediately on being energized but drops out after a moderate time delay (say 30 to 50 milliseconds). A coil represented by a rectangle with a solid black line along the length is actuated immediately on being energized but drops out after a longer time delay (say 100 to 200 milliseconds).

The circuit diagrams are of the cross-the-line type. To help in recognizing the relationship of the contacts of each relay and its coil, FIGS. 11A through 11C, 13A through 13E, 14A and 14B and 15A and 15B are provided. In these figures each relay is shown with its coil and contacts arranged vertically, each item being in a vertical position corresponding to the position where the item appears on the cross-the-line diagram. A number appears after each item to indicate in what sheet of drawing the item may be found.

The relays are identified in the various figures of the drawings by combinations of letters and numbers. The capital letters are on the whole so selected as to have a significance with respect to the functions of the relays so that one glancing at the drawings will be able to determine in a general way the function of any relay in which he may be interested. It is believed at the outset desirable to present the following outline of the identifications of the relays and their functions.

*Control Sender*

ST1, ST3, ST4—Station selecting relays actuated when a station is to be selected.

TN, TF, DC1, DC2, SPC, TPC—Apparatus operation relays which are actuated to produce a predetermined operation at a station. TN and TF actuate to turn a radar transmitter at a station on and off; DC1 and DC2 actuate data channels; SPC and TPC produce single pulse and triple pulse transmissions.

H1, H2, H3—These relays produce the automatic coding operation.

G1, G2, G3—These relays control the operation of the H relay. On the operation of any G relay the associated H relay operates automatically to initiate a coding operation.

STX, ATX, ATY, ATZ, NF12—Relays controlling sequence of operations and preventing simultaneous operation. Relay NF12 blocks initiation of operation by automatic selection unit when manual selection unit is operating and ATX blocks initiation of operation by manual selection unit when automatic selection unit has initiated operation.

C1, C2, C3, C4—Coding relays. Each of these relays determines a different code to be sent.

L1, L2, L3, L4—Code registering relays. Each of these relays determines the characteristic of a code signal component. In one position of each of these L relays the code signal component is long and the other other position it is short. Each of the C relays is connected to actuate certain of the L relays.

SS—This relay is actuated when any L relay is actuated and starts the sending of a code.

PC, SP, LP—These relays produce the individual code signal components. The SP and LP relays are connected to be selectively actuated by contacts of the L relays to produce the desired code. Actuation of SP produces a short pulse and LP a long pulse.

P1, P2, P3—Counting relays. These relays operate in succession in counting the code pulses being produced and transmitted.

A, B, C—These relays cooperate with the P relays to cause them to be actuated in succession so that they may count.

RP—Keying relay. Controlled from tone receiver.

R1, R2, R3, R1A, R2A, R3A—These relays operate in succession to count received pulses to identify a report from the controlled station activated.

RX, TR—These relays are protective relays which are set to time out and produce reset in the event that normal operation does not take place or is interrupted.

NR1, NR2—Normal reset relays.

AR—Abnormal reset relays.

AA—Alarm relay.

CS, CSX—Channel supervisory relays. These relays operate when misoperation occurs in the channels.

*Control Receiver*

RP1, RP2—Keying relays.

SPX, DLP—Long-short pulse discriminating relays.

DP1, DP2, DP3, DP4—Counting relays.

SA, LA, SB, LB, SC, LC—These relays cooperate with the DP relays to identify the signal components as long or short. The relays are connected to operate as voltage responsive means and are during any signal component conditioned so that they identify the component.

RPS—This relay provides for resetting in situations in which the code transmission or reception may be interrupted before the complete code has been transmitted or received.

DL1, DL2, DL3, DS1, DS2, DS3—Code registering relays. These relays are actuated by the DP relays. The actuation is controled by SA, LA, SB, LB, SC, LC so that the proper pulse is selected by each relay. In referring to these DS and DL relays, DS indicates a short pulse and DL a long pulse. In the advanced stages of the coding where the number or contacts on the DL relays (for example DL5 through DL8) are adequate DL unactuated corresponds to a short pulse and DL actuated to a long pulse.

OL, EL—Odd-even check relays.

P9X—Prevents operation of Normality Indicating Units on the occurrence of an extra pulse.

DC1, DC2, DC3—Relays responsive to DL and DS relays to produce desired operation.

N—This relay is actuated when the operation is normal.

F—This relay is actuated when the operation is faulty.

DR1, DR2, DR3, DR1A, DR2A, DR3A—These relays cooperate to count the report pulses.

NX2—This relay sets code responsive unit for operation and report-pulse unit to send.

RE, REX—Reset relays.

DAR—Abnormal reset relay. This relay operates after a predetermined interval in the event of failure to operate of NX2, thus assuring reset in the event that the normal operation does not reset.

CP1, CP2, CP3, CP1A, CP2A, CP3A—Received pulses counting relays. These relays count the pulses received from the neighboring up-range or down-range stations to indicate operation at these stations.

CPS—Timing relay which operates in the event of failure of operation of the counting chain CP1, CP2, CP3.

PC, K—Keying relays. These relays are used for sending the report pulse.

*Indication Sender*

KG1, KG2, KG3—These relays set the indicator lamps green or red. These relays are closed by contacts in the control equipment on the turning on or turning off of the various components of equipment and are latched in the actuated condition.

G35A, G35B—Odd-even checking relays. These relays are connected in series with contacts of the KG relays and operate selectively if the number of lamps of one color, red or green, is odd or even.

S1—Memory relay. This relay operates instantaneously on the operation of any of the KG relays at any time to indicate that there has been a change in the indications so that a new indicator scanning cycle must be carried out at the end of the one in progress. This relay also operates on the receipt of a command signal from the control station indicating that a scanning cycle is desired.

S, S2, S3—These relays cooperate with S1 to set the apparatus for an indicator scanning cycle.

KPC, KSP, KLP—These relays produce the individual coding pulses. KSP producing short pulses and KLP long pulses. These relays are connected to be controlled by contacts of the KG relays in accordance with the setting of the latter.

KP1, KP2, KP3—Counting relays. These relays count the number of pulses being transmitted during a scanning cycle. One of these KP relays correspond to each indicator lamp and there is an additional KP relay for transmitting the checking pulse. The latter cooperates with the contacts of G35A and G35B and sends a checking pulse which is long or short depending on the check selected and on whether the number of pulses of the checked code is even or odd.

KNR, KNRX—Reset relays. These relays reset the S relays and the KPC and KP relays for a new cycle.

KRP—Keying relays for command pulses.

KR1, KR2, KR1A, KR2A—Command pulse counting relays. These relays are connected to count a plurality of pulses. If the number of pulses counted is as set, a scanning cycle of the indicator unit is started following the end of the cycle in progress.

*Indication Receiver*

ML1, ML2, ML3—These relays set the indicator lamps at the control station to correspond to the signals received. The lamps are of one color or another and each of the ML relays has two positions—one to correspond to one color and the other to the other.

MCS, MCSX—Channel supervisory relays.

MRP—Keying relay.

MSPX, MLP—These relays cooperate to discriminate between long and short pulses.

MP1, MP2, MP3—Pulse counting relays.

MSA, MLA, MSB, MLB, MSC, MLC—These relays cooperate with the MP relays and the MSPX and MLP relays to respond selectively to each pulse. The MSA, MSB, MSC relays respond for short pulses and the MLA, MLB, MLC relays respond for long pulses.

AP—This relay responds if there is a spurious pulse in addition to those transmitted.

RC, GC—Odd-even check relays. These relays operate selectively and respond depending on whether the number of a selected signal component is odd or even.

E, D—These relays respond to the check pulse to set the system for response.

MRPS—This relay resets the counting chain (NP relays) if for any reason the receiving of the pulses is interrupted before a complete set of pulses has been received. This relay drops out if the spacing between the signal components is longer than a predetermined interval.

NC—This relay operates at the end of a signalling cycle.

MAC—Abnormal reset relay.

MAA—Alarm relay.

The contacts of each relay are identified by lower case letters, a, b, c, etc. following the relay identification. In FIGS. 11A through 11C, 13A through 13E, 14A and 14B, 15A and 15B only the lower case letters appear near the contacts.

In the circuit diagrams provisions are made to indicate the state of the relays in the standby condition of the apparatus. Relays which are actuated in the standby condition are identified by a dot near the symbol. A dot also appears at each contact of an actuated relay. In the following discussion, the contacts of relays which are closed with the relay deenergized will be referred to as back contacts and the contacts which are open with the relay deenergized will be referred to as front contacts. Relays will be referred to as normally energized (and labeled by dots) if they are energized in the standby condition of the apparatus and as normally deenergized if they are deenergized in the standby condition of the apparatus. Contacts will be referred to as normally closed if closed in the standby condition of the apparatus, and normally open if they are open in the standby condition of the apparatus. Thus a front contact of a normally energized relay is normally closed and a back contact of such a relay is normally open.

*Control Sender—Description*

The CONTROL SENDER is at the control station and includes a Manual Selection Unit, and an Automatic Selection Unit. The Manual Selection Unit includes a Station Selector for selecting the station at which apparatus is to be operated and an Equipment Selector for selecting the equipment at the selected station to be operated. The Automatic Selection Unit is actuable by the Master Indicator Unit which produces an operation of the Automatic Selection Unit when it receives a signal indicating a change in the indicators of a controlled station.

The CONTROL SENDER also includes an Interlock Unit which interlocks the Manual Selection Unit and the Automatic Selection Unit so that these units cannot produce simultaneous operation. The Interlock Unit operates so that when the Manual and Automatic Selection Units are actuated simultaneously, the Automatic Selection Unit prevails. Responsive to the Manual Selection Unit, the Interlock Unit only becomes effective if the manual selection has reached the stage at which an equipment actuation has taken place. Only then is operation in response to actuation at the Automatic Selection Unit prevented.

The CONTROL SENDER also includes a Code Unit Manual responsive to the Manual Selection Unit and a Code Unit Automatic responsive to the Automatic Selection Unit. Both Code Units cooperate with a Code Register Unit which registers the selected code.

The CONTROL SENDER also includes a Code Pulse Producing Unit which responds to the Code Register Unit to produce long or short pulses in a code depending on the registration of the Code Register Unit. A Pulse Counter Unit cooperates with the Code Pulse Producing Unit to count the pulses produced so that there is a set of pulses for each complete code.

The Code Pulse Producing Unit cooperates with Tone Generator I which produces an audio tone. For the purpose of explanation, it will be assumed that the Tone Generator has a frequency of 1615 cycles. Tone Generator I is normally energized and the effect of the Code Pulse Producing Unit is to interrupt the audio note during the coding for long or short intervals depending on the individual pulses in the code. The code sent by the CONTROL SENDER consists of eight pulses. In addition a ninth checking pulse is sent. Tone Generator I cooperates with a transmitter (not shown) preferably to produce frequency shift keying of the transmitter thus transmitting the code.

The CONTROL SENDER also includes a Normal Reset Unit and an Abnormal Reset Unit. Both Units are conditioned to operate by the Pulse Counter Unit when the latter has completed counting the pulses of a complete code and has counted the additional checking pulse. One or the other of the Reset Units is operated while so conditioned on operation of a Report Pulse Counter Unit. This latter Unit is connected to respond to Tone Receiver II which is pulsed by a signal from the controlled station with which the CONTROL SENDER is communicating. Tone Receive II is of the audio type, and for example, may have an audio frequency of 1955 cycles. Receiver II is normally deenergized and its tone interrupted during the intervals when it is receiving pulses.

The pulses received by the Report Pulse Counter Unit are counted and if the correct number of pulses are received, the Normal Reset Unit is actuated to reset the apparatus. If the correct number of pulses is not received, the Abnormal Reset Unit is actuated, an alarm signal is energized and the apparatus is reset.

The CONTROL SENDER shown in FIGS. 5A through 5F is energized from conductors ZL1 and ZL2 of a direct current supply. The Station Selector of the Manual Selection Unit (FIG. 5A) includes a plurality of station selecting relays ST1, ST3, ST4, ST5, ST6, ST7, ST8, ST9. These relays are selectively actuable by push bottons RS1 through RS9. The coils of the relays ST1 through ST9 are adapted to be connected between conductors ZL1 and ZL2 through the associated push buttons RS1 through RS9 and the back contacts STXa and TXa of relays STX and ATX. The coil of the relay STX is adapted to be connected in series with the relays ST1 through ST9 through respective front contacts ST1b through ST9b of the latter. Once one of the relays ST1 through ST9 is actuated and closes the associated front contact, relay STX is also actuated. The back contact STXa of relay STX is then opened, opening the push button energizing circuit, but actuated relays ST1 through ST9 and the relay STX remain actuated in a lock-in circuit extending from conductor ZL1 through back contact NR1b, of normal reset relay NR1, a back contact ARb of abnormal reset relay AR, a front contact (ST1a through ST9a) of the actuated ST relay, the coil of the ST relay, the front contact (ST1b through ST9b) of the actuated relay, the coil of the STX relay to conductor ZL2.

Each of the relays ST1 through ST8 includes a back contact (ST1d through ST8d) which is connected in the lock-in circuit of the succeeding relay in series with the normally open contact of the succeeding relay. Thus, when one of the relays ST1 through ST9 is actuated and the associated back contact opened, it prevents actuation of any of the succeeding relays, once the push button is reopened and the actuated relay is locked in.

For example, assume that push button RS4 is closed. This actuates relay ST4 and opens the back contact ST4d of ST4 in series with ST5 through ST9. Also assume that at the same time RS5 is also closed. This initially actuates ST5. Now assume that the push buttons RS4 and RS5 are released. ST4 is now locked in through the coil of relay STX but ST5 becomes deenergized causing the lock-in circuit to open at the back contact ST4d of ST4. Thus, simultaneous actuation of two or more of the push buttons results in the actuation of the relay associated with the push button bearing the lowest order number.

The Equipment Selector of the Manual Selection Unit (FIG. 5A) includes a plurality of relays TN, TF, DC1, DC2, SPC and TPC. These relays may correspond to settings for various components of the apparatus at the stations. For example, relay TN may be actuable to turn the transmitter on, TF to turn the transmitter off, DC1 and DC2 to activate corresponding data channels and SPC and TPC to actuate radar pulsing systems. The coils of the relays TN, TF, TC1, TC2, SPC and TPC are adapted to be connected between conductors ZL1 and ZL2 by actuation of associated push buttons through respective back contacts TNa through TPCa of these relays, a front contact STXe of relay STX and a back contact NF12a of relay NF12. On the release of any associated push button, the actuated relay is adapted to be locked-in in series with the coil of relay NF12 in a circuit extending from conductor ZL1 through the back contacts NR1b and ARb of relays NR1 and AR, a front contact of the actuated relay, the coil of the actuated relay, a front contact TNc through TPCc of the actuated relay, the coil of relay NF12 to conductor ZL2. Each of the relays TN, TF, DC1, DC2 and SPC has a back contact TNf through SPCf in series with the coil of the succeeding relay in the chain so that once a relay in the chain is actuated and its associated back contact opens, the locking in of succeeding relays in the chain is prevented. Thus, on simultaneous actuation of two of the push buttons, the preceding one in the chain produces the operation.

The Automatic Selection Unit in the CONTROL SENDER is used in the practice of this invention in connection with an automatic tracking system of radar apparatus. When a radar at a controlled station picks up a target and begins to track it automatically, one of the indicators at the station is changed producing a change in an indicator of the master system at the control station, and this in turn actuates a contact which is latched in starting the operation of the Automatic Selection Unit.

Figure 5A:
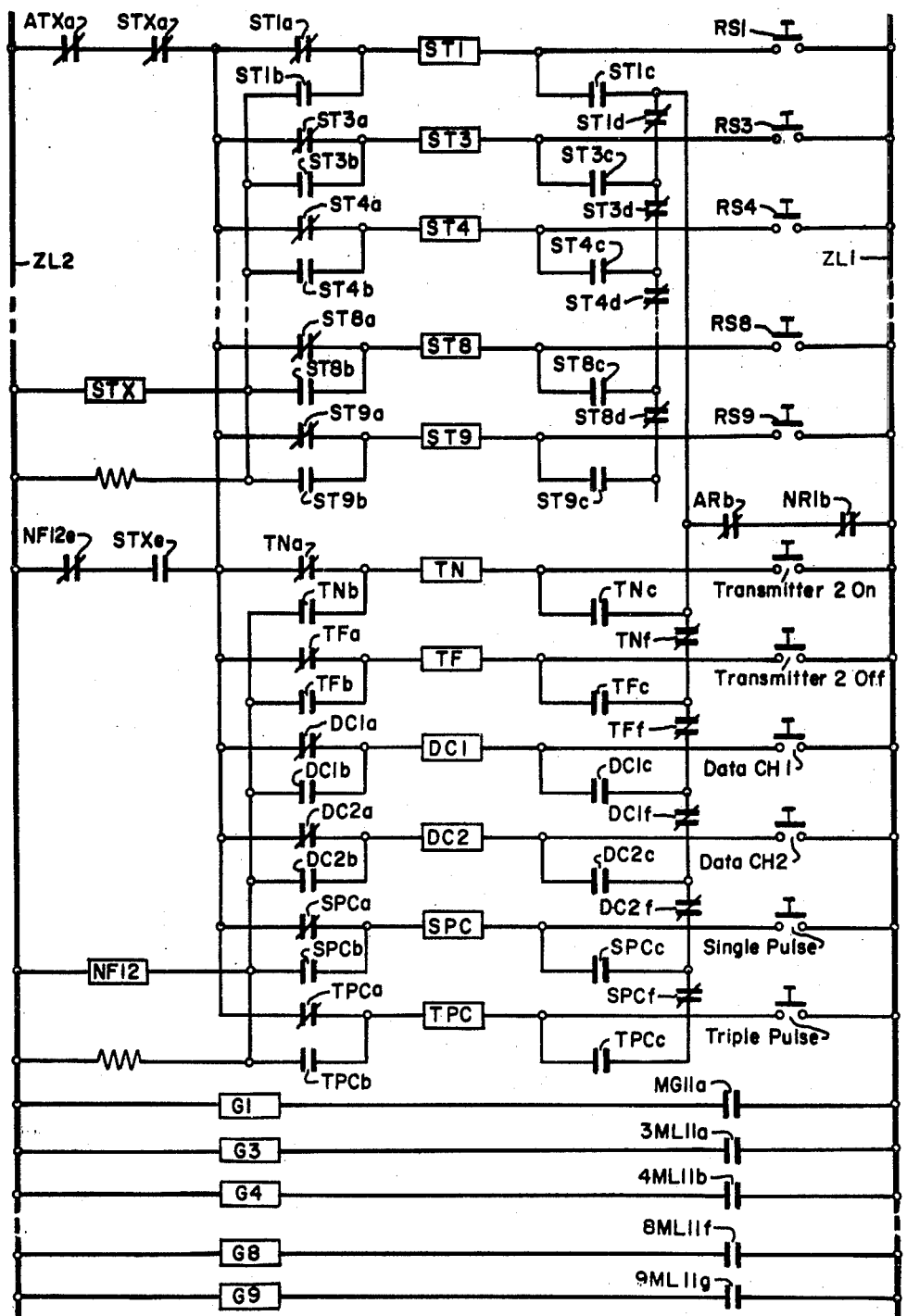

The Automatic Selection Unit shown in FIG. 5A includes a plurality of relays G1 through G9, the coil of each of which is adapted to be connected between conductors ZL1 and ZL2 through one of the contacts MG11a through ML11f. Each contact MG11a and ML11a through ML11f is a contact of a different relay in an INDICATION RECEIVER (FIGS. 4 and 10A through 10D). Each of the latter relays corresponds to a different indicator on the master indication panel at the control station, the latter indicators each corresponding to an indicator at the different controlled station. Thus when an indicator at any controlled station changes, the corresponding master indicator changes and the corresponding MG11 or ML11 relay is actuated and latched in energizing the corresponding G relay.

Figure 5B:
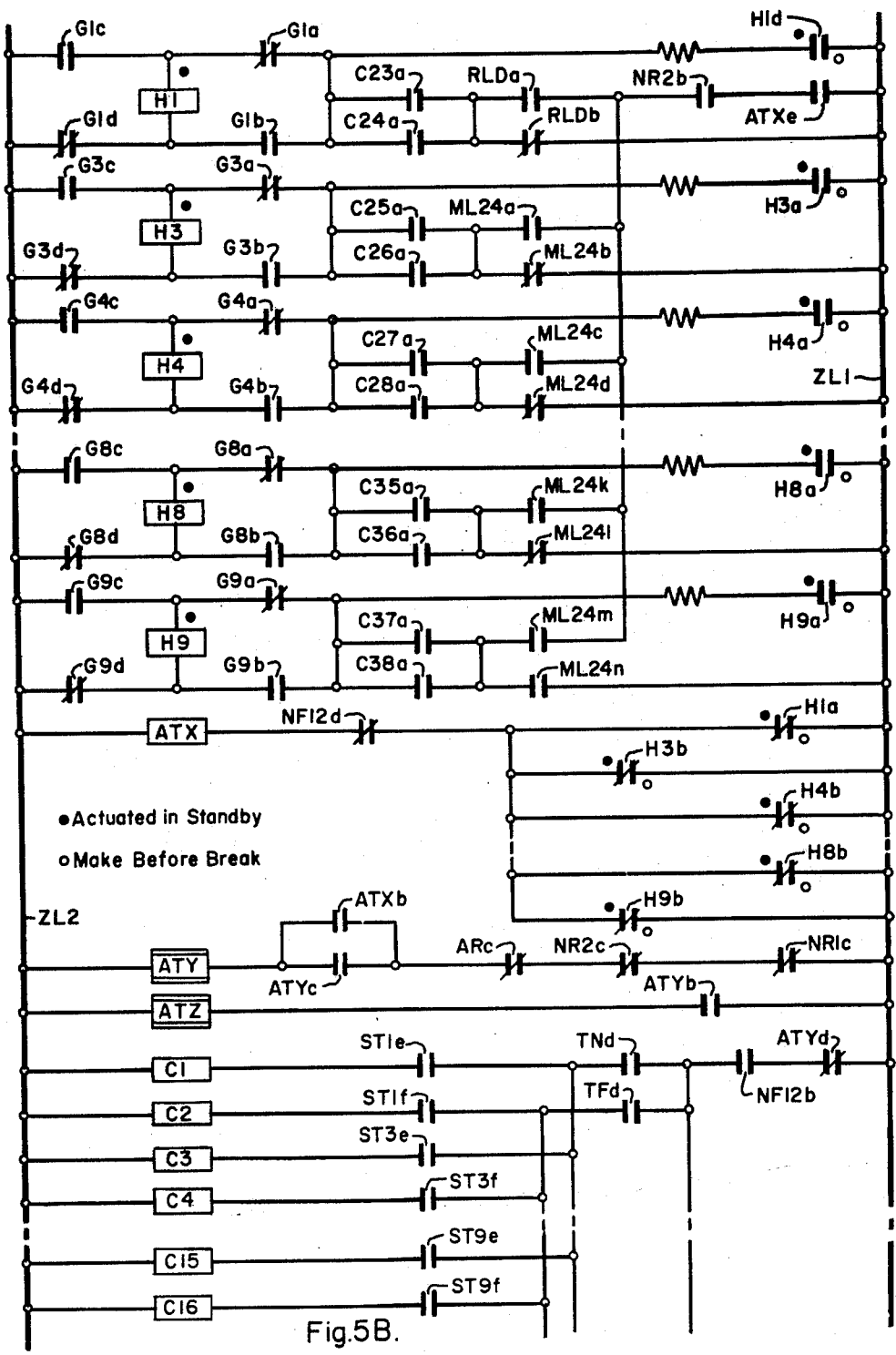

The Automatic Selection Unit also includes a plurality of relays H1 through H9 shown in FIG. 5B which respond to the actuation of the G relay. The coil of each of the H relays is adapted to be connected between conductors ZL1 and ZL2 through a plurality of alternative circuits. One of these circuits for each H relay respectively extends from conductor ZL1 through a back contact RLDb or ML24b, d, f, j, k or n of an associated relay RLD shown in FIG. 6F or ML24 indicated in FIG. 10A, the front contacts C23a through C37a and C24a through C38a of one or the other C23 through C37 and C24 through C38 respectively of a pair of C relays in the Code Unit, a back contact G1a through G9a of the associated G relay, the coil of the H relay, another back contact G1d through G9d of the associated G relay to conductor ZL2. The RLD and ML24 relays each correspond to a different controlled station and respond to the setting of the corresponding controlled station for local control. The other circuit for each H relay respectively extends from the conductor ZL1 through front contacts ATXe and NR2b of the ATX and NR2 relays, a front contact RLDa or ML24a, c, e, g, i, k, m of the RLD or ML24 (corresponding to each station) relay respectively responsive to the setting of the associated remote station for local control, the contact of the selected C relay C23 through C37 or C24 through C38, the back contact G1a through G9a of the associated G relay, the coil of the H relay, the back contact G1d through G8d of the associated G relay to the conductor ZL2.

Any relay RLD and ML24 is actuated when the controlled station associated with it is on supervisory control but is unactuated when the corresponding controlled station is on local control. Thus, when the controlled station is on local control, each of the H relays may be actuated through the back contact of the associated RLD or ML24 relay. When actuated, each H relay may be locked in through a front contact H1d and H3a through H9a connected in series with the contacts G1a through G9a and G1d through G9d of the G relay.

Each H relay is also adapted to be connected in the above traced circuits through front contacts G1b through G9b and G1c through G9c of the associated G relay when this relay is actuated. The front and back contacts 'b and 'c and 'a and 'd of the G relays are so connected to the coils of the associated H relays as to reverse the current through the H relay on actuation of an associated G relay. This reversing of the current has the effect of promptly dropping out an H relay when the associated G relay is actuated. The actuation of the associated G relay prepares the H relay to be actuated again on the closing of the selected contacts 'a of the associated C relays (C23 through C38).

The Interlock Unit shown in FIG. 5A includes the relay NF12 which is responsive to the Equipment Selector of the Manual Selection Unit and the relays ATX, ATY and ATZ shown in FIG. 5B. The coil of the relay ATX is adapted to be connected between conductors ZL1 and ZL2 through a back contact H1b through H9b of any one of the H relays. The coil of the relay ATY is adapted to be connected between conductors ZL1 and ZL2 through a back contact NR1c of relay NR1, a back ontact NR2c of relay NR2, a back contact ARc of relay AR and a front contact ATXf of relay ATX. The coil of relay ATY may be locked in through a front contact ATYc of the relay ATY which shunts the front contact ATXf of relay ATX. The coil of relay ATZ is adapted to be connected between conductors ZL1 and ZL2 through a front contact ATYb of relay ATY. When actuated, relay NF12 prevents operation through the Automatic Selection Unit and relay ATX when actuated prevents operation through the Manual Selection Unit.

The Code Unit shown in FIGS. 5B and 5C for manual operation includes the relays C1 through C16, C45 through C60, C68 through C75 and C86 through C93. Relays C1 through C16 are associated with the transmitter at the different stations. Relays C1, C3, C5, C7, C9, C11, C13 and C15 are actuated to turn the corresponding transmitter on and the intervening even numbered C's are actuated to turn the transmitter off. The coil of any one of the odd numbered C relays, for example, C9 is adapted to be connected between conductors ZL1 and ZL2 through the front contact ST6e of the associated relay ST6, through a front contact TNd of the TN relay, a front contact NF12b of NF12, and a back contact ATYd of the ATY relay. The coil of the corresponding even C relay, C10, is adapted to be connected between conductors ZL1 and ZL2 through the front contact ST6f of relay ST6, the front contact TFd of relay TF, the front contact NF12b of relay NF12, and the back contact ATYd. Code relays C45 through C60 concern themselves with the pulsing and their coils are similarly connected to conductors ZL1 and ZL2 through front contacts SPCd and TPCd of the SPC and TPC relays, respectively. The coils of relays C68 through C75 and C86 through C93 are similarly adapted to be connected between conductors ZL1 and ZL2 through the front contacts DC1d and DC2d of the relays DC1 and DC2, respectively.

The Code Unit Automatic shown in FIG. 1 includes relays C23 through C38 and relay CX shown in FIG. 5C. In the operation of these C relays a selected C relay of a selected pair, C23 and C24, C25 and C26, C27 and C28, is actuated. The pair to be actuated is selected by an associated H relay and the selection of one of the pairs depends on the setting of the associated G relay. The coil of each of these C relays is adapted to be connected between conductors ZL1 and ZL2 through a front contact ATYc of the ATY relay, a back contact NF12c of the NF12 relay, a front contact H1b, H3d, or H4c through H8c of the H relay preceding the one corresponding to the pair selected in the H chain, a back contact H1c, H3c or H4d through H9d of the associated H relay, a front or back contact G1e or G1f, G3e or G3f, G4e or G4f, G5c or G5d and G6e through G9e or G6f through G9f of the associated G relay depending on its setting, the coil of the selected C relay of the pair, a back contact C23c through C38c of the selected C relay, a back contact CXa of the CX relay to conductor ZL2. Once actuated, the selected relay is locked in a circuit extending from conductor ZL1 through the front contact ATYe, the back contact NF12c, a front lock-in contact C23b through C38b of the selected C relay, a front lock-in contact C23d through C38d of the selected C relay, the coil of the CX relay. The CX relay is then actuated preventing further actuation of any other relay of the chain C23 through C38 until the coding is completed.

For example, assume that the H5 relay has been actuated. This relay selects the pair C29 and C30 for operation. Now assume that the G5 relay has been actuated. Relay C29 is then selected for operation. This relay is actuated in the following circuit: ZL1, ATYe, NF12c, H1b, H3d, H4c, H5d, G5c, C29 coil, C29c, CXa, ZL2. C29 is locked in the following circuit: ZL1, ATYe, NF12c, C29b, C29 coil, C29d, CX coil, ZL2.

Figure 5D:
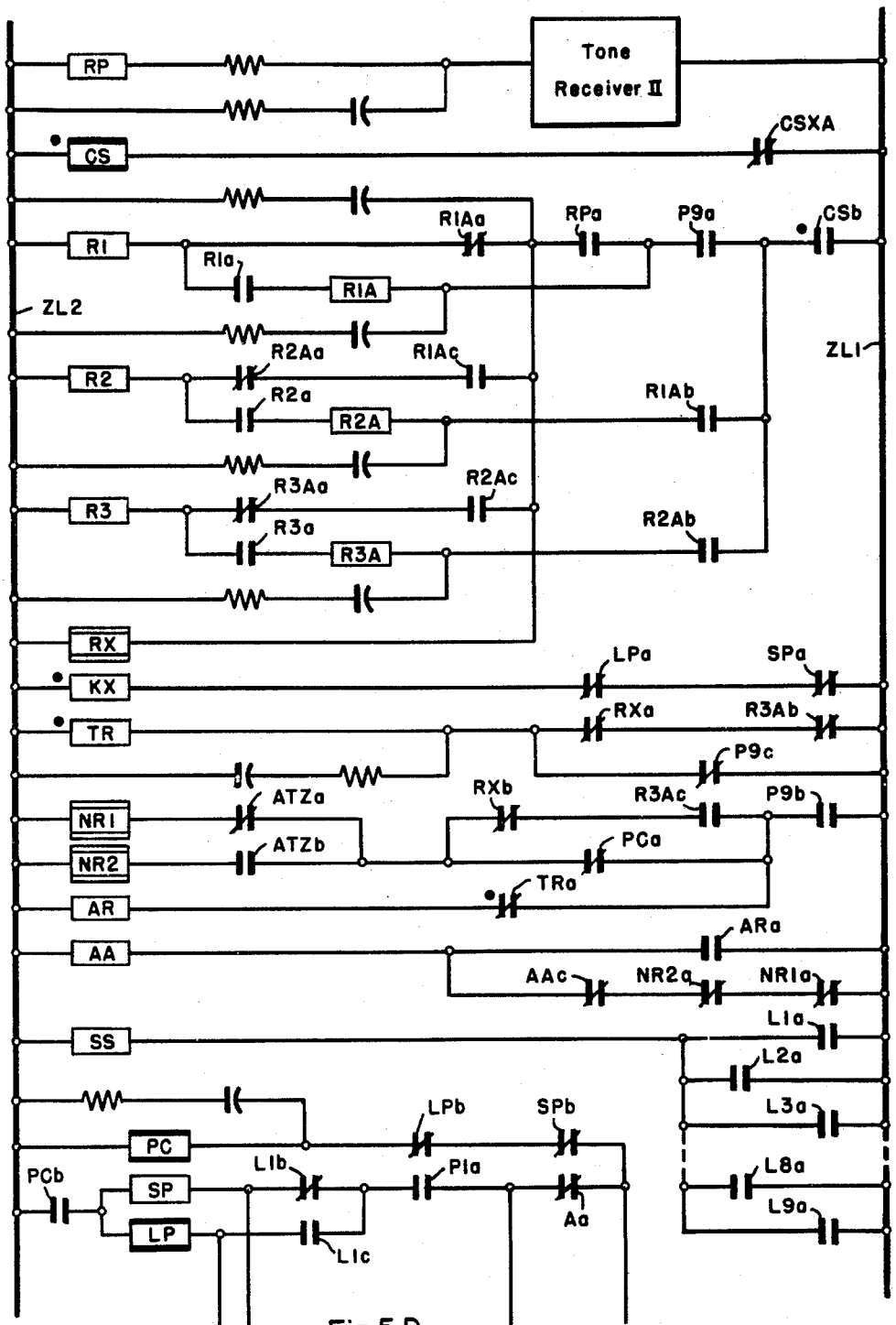
Figure 5E:
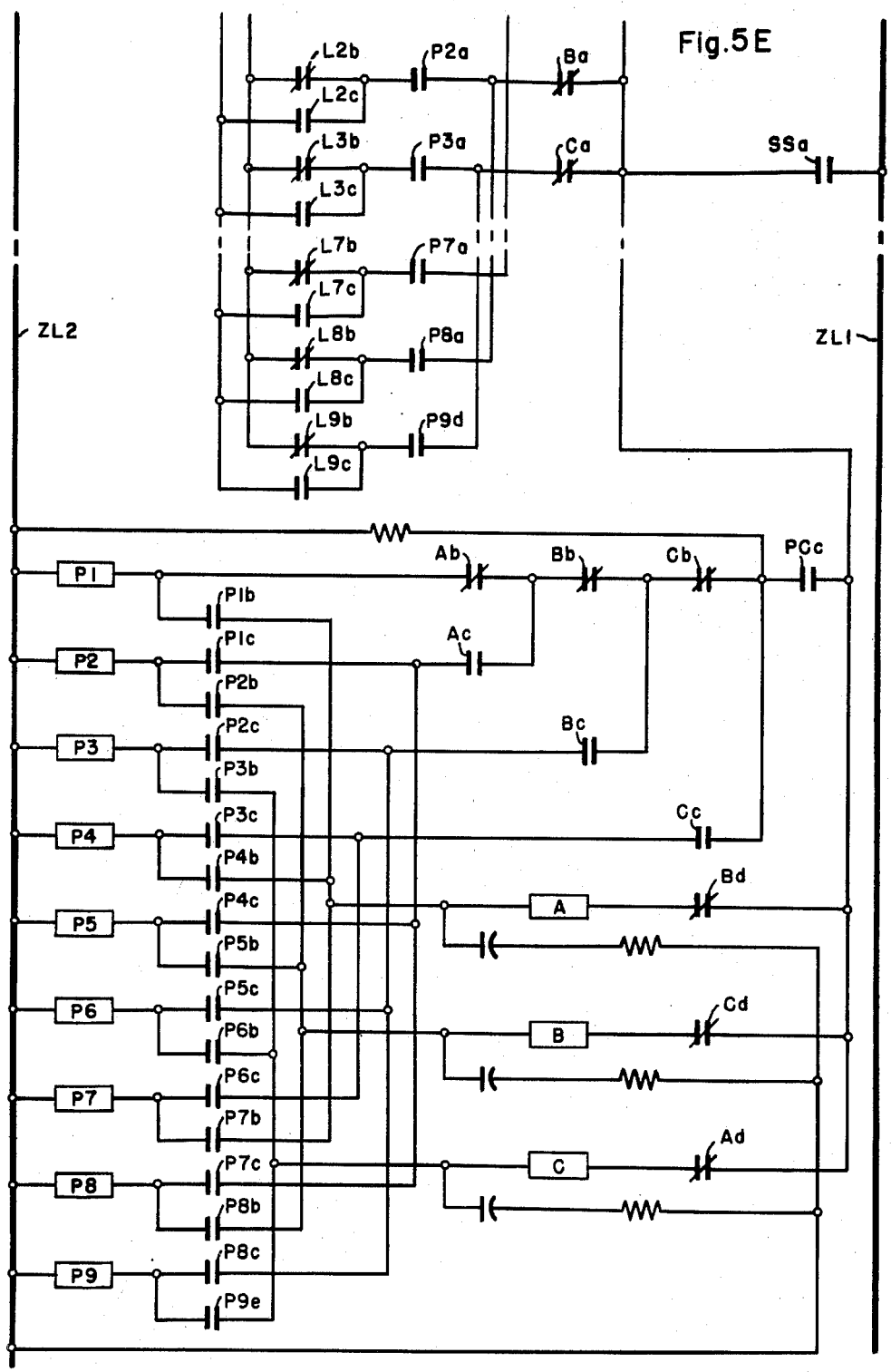
Figure 5F:
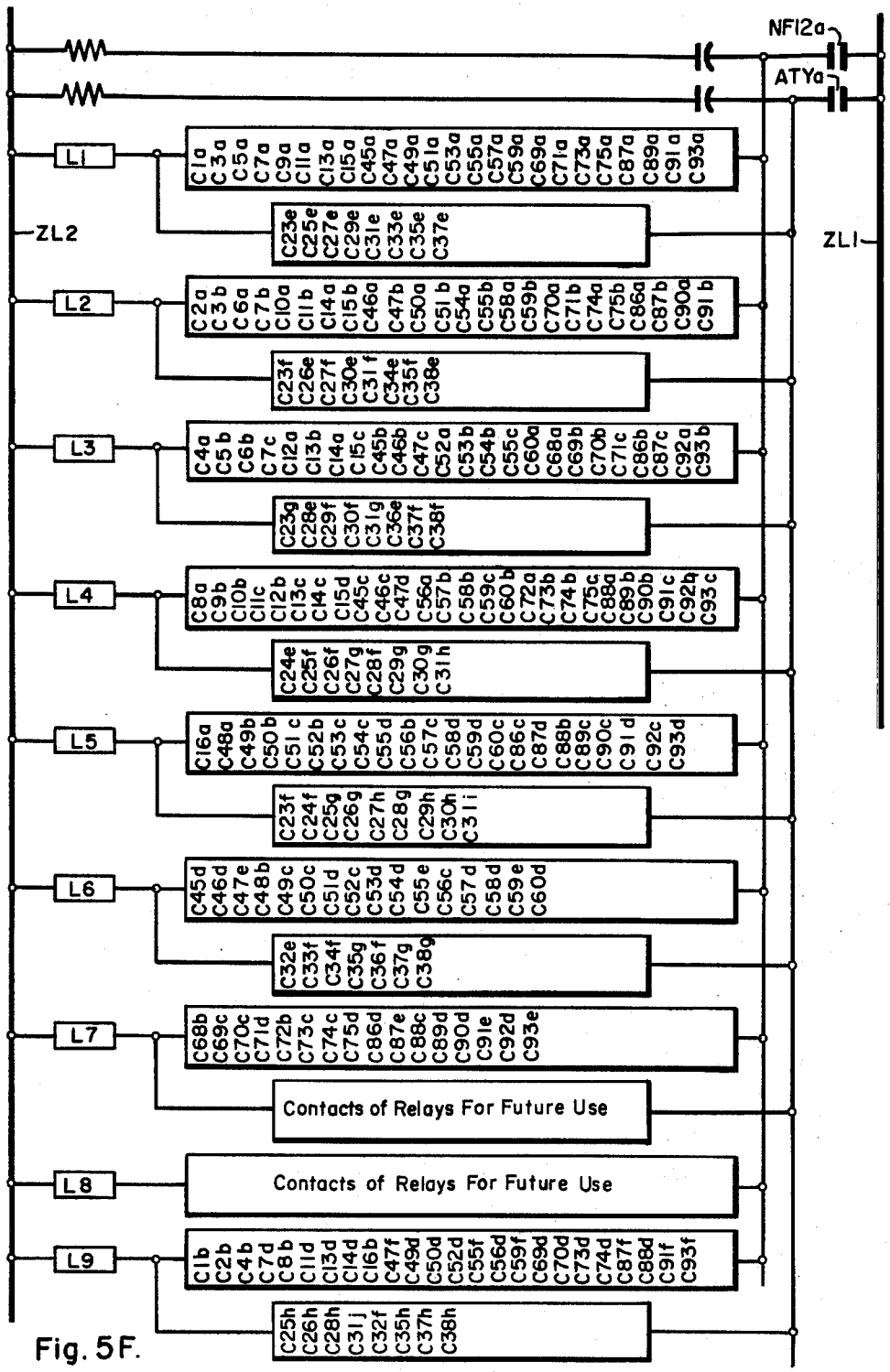

The Code Register Unit shown in FIG. 5F includes relays L1, L2, L3, L4, L5, L6, L7, L8 and L9. Each of the coils of the relays L1 through L9 are adapted to be connected between conductors ZL1 and ZL2 through a front contact NF12a of the NF12 relay, or alternatively through a front contact ATYa of the ATY relay, and any one of selected front contacts of the C relays of the Code Units which are connected in parallel. To facilitate the understanding of the relationship between the Code Units and the Code Register Unit the selected front contacts in parallel of C relays are represented by a block for each L relay and the associated C relays whose contacts are connected in parallel are indicated in each block. A different combination of the L relays is thus actuated when each different C relay is actuated. Since there are available 256 combinations of the relays L1 through L8, these relays provide facilities for transmitting 256 codes by 256 different C relays. Relay L9 provides for the transmission of a checking signal.

The Code Pulse Producing Unit shown in FIG. 5D includes relays SS, SP, LP and PC. The coil of relays SS is adapted to be energized from conductors ZL1 and ZL2 on the actuation of any one of the L relays through front contacts L1a through L9a of each of the relays which are connected in parallel. The actuation of the relays SS starts the coding. The coil of the relay PC is adapted to be connected between conductors ZL1 and ZL2 through a front contact SSa of the SS relay and back contacts SPa and LPb of the SP and LP relays. The PC relay may have a timing interval, for example, of approximately 35 milliseconds. The coils SP and LP relays are adapted to be selectively connected between conductors ZL1 and ZL2 nine times to produce the code. The selection is effected by the L relays and depends on their actuation. Thus, the coils of SP and LP are adapted to be connected between conductors ZL1 and ZL2 through the front contact SSa, back contact Aa, front contact P1a, contacts L1b or L1c of the L1 relay and a front contact PCb of the PC relay. They are similarly adapted to be connected between conductors ZL1 and ZL2 through the front contact SSa, the back contact Aa, front contacts P4a and P7a of relays P4 and P7, respectively, and selected contacts L4b or L4c and L7b or L7c of relay L4 and L7 relays, respectively. In addition, the coils of relays SP and LP are adapted to be similarly connected through the front contact SSa, a back contact Ba of the B relay, front contacts of P2a, P5a and P8a of relays P2, P5 and P8, respectively, and selected contacts L2f, L2c, L5f, L5c, L8f, L8c of relays L2, L5 and L8, respectively. A similar connection is effected through a back contact Ca of the C relay, front contacts P3a, P6a, P9a of the P3, P6 and P9 relays, respectively, and selected contacts L3b, L3c, L6b, L6c, L9b, L9c of the L3, L6, and L9 relays, respectively. The LP relay is a timing relay. Typically, it may have an interval of the order of 175 milliseconds.

The Pulse Counter Unit shown in FIG. 5E includes relays P1, P2, P3, P4, P5, P6, P7, P8 and P9 and relays A, B and C. This Counter Unit is also actuated when the SS relays is actuated, and when so actuated produces nine counts to count the eight pulses of the code and the checking pulse.

The coil of relay P1 is adapted to be connected between conductors ZL1 and ZL2 through the front contact SSa, a front contact PCc of the relay and back contacts Cb, Bb, Ab of the C, B and A relays. The coil of the P1 relay is adapted to be locked in through the coil of the A relay in a circuit extending from the conductor ZL1, the front contact SSa, a back contact Bd of the B relay, the coil of the A relay, a front contact P1b of the P1 relay, the coil of the P1 relay to conductor ZL2. The coil of the A relay in this circuit is short circuited when the PC relay is actuated by the front contact PCc of the PC relay and back contacts Cb, Bb and Ab; the A relay is only actuated when the front contact PCc opens.

The coil of the P2 relay is adapted to be connected between conductors ZL1 and ZL2 through the front contact SSa, the front contact PCc, the back contacts Cb and Bb, a front contact Ac of the A relay and a front contact P1c of the P1 relay. The coil of the P2 relay may be locked in through the coil of the B relay, a back contact Cd of the C relay and a front contact P2f of the P2 relay. The coil of the P3 relay may be similarly connected in a circuit including ZL1, front contact SSa, front contact PCc, back contact Cb, front contact Bc of B, front contact P2c of P2, coil P2, ZL1. This coil may be locked in through a back contact Ad of A coil of C and front contact P3b of P3. The coil of P4 is adapted to be connected similarly to P1, P2, and P3 through the front contact SSa, the front contact PC, a front contact of Cc, a front contact P3c of P3. The coils of relays P5 and P8 are connected analogously to P2. The coils of relays P6 and P9 are connected analogously to P3. P7 is connected analogously to P4.

Tone Generator I is controlled by contacts SPa and LPa of the SP and LP relays (FIG. 5D). These contacts are connected in series with the coil of KX which is maintained energized and maintains Tone Generator I energized. Actuation of either SP or LP interrupts the tone of Generator I.

For receiving a report as to the transmitted code, the CONTROL SENDER includes a receiver including Tone Receiver II (FIG. 5D). The report back apparatus also includes a relay RP which is adapted to be connected between conductors ZL1 and ZL2 through Receiver II. Receiver II is normally deenergized maintaining RP unactuated.

The Report Pulse Counter shown in FIG. 5D includes relays R1, R2, R3, R1A, R2A, R3A and a supervisory timing relay RX. The coil of relay R1 is adapted to be connected between conductors ZL1 and ZL2 through a front contact CSb of a channel supervisory relay CS, a front contact P9a of relay P9, a back contact RPa of relay RP and a back contact R1Aa of relay R1A. The coil of relay R1 is adapted to be locked in independently of RP through front contacts CSb and P9a, a front contact R1a of R1 and the coil of R1A. The coil of relay R2 is similarly adapted to be connected between conductors ZL1 and ZL2 through front contacts CSb and P9a, a front contact P1Ab of relay R1A and a back contact R2Aa of relay R2A. Relay R2A is connected similarly to relay R1A through a front contact R1Ab of relay R1A and a front contact R2a of relay R2. Relay R3 is connected similarly to R1 and R2 through a front contact R2Ab of R2A and a back contact R3Aa of R3A. Relay R3A is connected similarly to R2A through front contact R2Ab of R2A and a front contact R3a of R3. Relay RX is adapted to be connected between conductors ZL1 and ZL2 through the front contact CSb, the front contact R9a and the back contact RPa.

The Normal Reset Unit shown in FIG. 5D includes the relays NR1 and NR2. The coil of relay NR1 is adapted to be connected between conductors ZL1 and ZL2 through a reset push button (not shown). The coil of relay NR1 is also adapted to be connected between conductors ZL1 and ZL2 through a front contact P9b of P9, a front contact R3Ac of R3A and a back contact RXb of RX and a back contact ATZa of ATZ. The coil of relay NR1 is also adapted to be connected between conductors ZL1 and ZL2 through the front contact P9b, a back contact PCa of PC, and the back contact ATZa.

The coil of relay NR2 is adapted to be connected between ZL1 and ZL2 through the front contacts P9b, R3Ac, RXb and a front contact ATZb of ATZ and also through the front contacts P9b, and ATZb and back contact PCa.

The Abnormal Reset Unit shown in FIG. 5D includes relays TR, AR and AA. The coil of relay TR is adapted to be connected between conductors ZL1 and ZL2 through a front contact R3Ab of R3A and a back contact RXa of RX and alternatively through a back contact P9c of P9. The coil of relay AR is adapted to be connected between conductors ZL1 and ZL2 through front contact P9b and a back contact TRa of TR. Relay AA is adapted to be connected between conductors ZL1 and ZL2 through a front contact ARa of AR and to be locked in through back contacts NR1a and NR2a of NR1 and NR2 and a front contact AAc of AA. Relay AA actuates an alarm.

*Control Sender-Standby*

In the standby condition of the CONTROL SENDER conductors ZL1 and ZL2, and Tone Generator I are energized. Tone Receiver II and relay RP are conditioned to be energized when a signal is received by Receiver II. CSX is energized and CS is energized through CSXa. KX is energized through SPa and LPa. TR is energized through P9c.

Further it is a property of the CONTROL SENDER that before reaching its standby condition the CONTROL SENDER passes through a cycle of operation during which the Automatic Selection Unit causes code signals to be sent out which are dependent on the settings of the indicators in the Master Indicator Unit at the control station and on the associated MG11 and ML11 relays.

The relays MG11 and the various relays 3ML11 through 9ML11 through the contacts of which the relays G1 through G9 are actuable are latched in when actuated. When the power to the Master Indicator Unit is turned off, any of the actuated relays MG11 or ML11 remain in the latched condition. When the power is turned on, selected ones of the relays G1 through G9 are energized by the MG11 or ML11 contacts in series with the coils of the G relays (FIG. 5A). Assume that the G3 relay is so actuated. The front contacts G3b and G3c in series with the H3 relay (FIG. 5B) are then closed and the back contacts G3a and G3d opened. Similarly, the contact G3 in series with coil or relay C25 is closed and G3f in series with the coil of C26 is opened.

Also assume that the controlled stations are set for supervisory control. The front contact RLDa of the RLD relay and the front contacts ML24a, c, e, g, i, k, m of the ML24 relays are then closed and the back contacts RLDb, ML24b, d, f, h, j, l, n opened. The H relays are at this stage deenergized because contacts NR2b and ATXe of the NR2 relay and the ATX relay are open. Since the back contacts H1a and H3b through H9b of the H relays are closed, the relay ATX in the Interlock Unit is actuated. This actuates and locks in the ATY relay in turn actuating the ATZ relay.

The actuation of the ATX relay shown in FIG. 5B opens its back contact ATXa and prevents actuation of the ST relays and this in turn prevents actuation of the TN, TF, DC1, DC2, SPC and TPC relays, since the front contact STXe of relay STX in series with the coils of the former is open.

Since relay ATY shown in FIG. 5B is actuated, relay C24 in the Code Unit responsive to the Automatic Selection Unit is actuated locking itself in independently of the H1 back contact H1c through C24b, C24d and coil of CX. The actuation of CX prevents actuation of relays C25 through CXa. The actuation of relay C24 causes relays L4 and L5 in the Code Register Unit to be actuated. This actuates the SS relay and now a code is transmitted.

The actuation of the SS relay shown in FIG. 5D actuates the PC relay. The actuation of the PC relay actuates the P1 relay. This in turn actuates the SP relay through the L1 back contact. The actuation of the SP relay causes the SP back contact SPa in series with the PC relay to drop out immediately. The PC relay then times out dropping out in about 35 milliseconds. The actuation of the SP relay also opens the back contact SPa in series with the KX relay causing the latter to drop out and then interrupt Tone Generator I a time interval corresponding to the interval during which the KX relay remains dropped out.

As long as the PC relay shown in FIG. 5D remains actuated, the actuation of the A relay is prevented. Once the PC relay drops out, the A relay is actuated and then its front contact Ac, the P2 relay is actuated. In addition, when the PC relay drops out, its front contact PCb in series with the SP relay opens, and the SP relay drops out. When SP drops out, KX is again energized, and the interrupter of the tone of Generator I is at an end. A short pulse having a duration of about 65 to 70 milliseconds has now been transmitted. The PC relay is then again energized.

Since the P2 relay shown in FIG. 5E is now actuated, the SP relay is again actuated through the back contact of the L2 relay and the above-described process is again repeated.

In this case again the energization of Tone Generator I is interrupted and another short pulse is transmitted. The above-described process is repeated for P3 and another short pulse is transmitted. The actuation of P4 causes the relay LP shown in FIG. 5D to be actuated through the front contact L4c of L4. The actuation of the relay LP starts the transmission of a pulse by the deenergization of relay KX. In addition, the actuation of the relay LP deenergizes the relay PC so that the latter starts to time out. PC times out in an interval of about 35 milliseconds eventually opening its front contact PCb in series with LP and starting the timing out of LP. LP times out in about 175 milliseconds. When PC drops out, relay A in the Pulse Counting Unit is actuated setting the Counting Unit for the next count, but P4 also remains actuated through its own front contact and thus the operation of the Code Pulse Producing Unit remains continuous. This operation continues until LP times out in an interval of the order of 175 milliseconds. At this point the relay KX is actuated and the transmission of the pulse is interrupted. A pulse of about 230 milliseconds has now been transmitted. This pulse is several times the duration of the short pulse and is readily distinguishable from the short pulse.

After LP drops out, PC is again actuated now actuating LP again through the front contact L5c of L5 and through the front contact P5a of P5. The above-described process is again repeated and a long pulse is again transmitted. Thereafter, additional counts are produced by the actuators P6, P7 and P8 shown in FIG. 5E and three short pulses are transmitted. It is seen that the code which has been transmitted is as follows: a short pulse, a short pulse, a short pulse, a long pulse, a long pulse, a short pulse, a short pulse.

After P8 is actuated and the short pulse which it counts is transmitted, P9 is actuated. The actuation of P9 causes a check pulse to be transmitted. The checking is effected by verifying whether the code actually sent includes an even or an odd number of long pulses. The ninth pulse is short if the number of long pulses in the code is even and long if the number of long pulses in the code is odd. The total number of long pulses in any group of nine pulses transmitted must then be even. Since in the situation being described the actual code being transmitted has two long pulses, the ninth pulse is short.

The relay P9 performs a conditioning function in addition to counting the ninth pulse. When relay P9 is actuated, its front contact P9a is closed to condition the Report Pulse Counter Unit to count the report pulses. At a back contact P9c of the P9 relay, the energizing circuit through the TR relay is opened and the TR relay begins to time out. At another front contact P9b, the Reset relay NR2 is conditioned to operate through a front contact ATZb of ATZ.

After the remote equipment is actuated, three check pulses are transmitted. These check pulses cause Tone Receiver II and relay RP shown in FIG. 5D to be energized three times. When the RP relay is energized the first time, the R1 relay is actuated through the back contact RPa of the RP relay. The R1 relay is then locked in through the coil of R1A. This conditions the R2 relay to be actuated. The second pulse actuates the R2 relay which is locked in through the coil of the R2A relay and a front contact R1Ab of R1A. The R2A relay conditions R3 to be actuated responsive to the third pulse, and the R3A relay is actuated. In addition, the pulsing of the RP relay causes the RX relay to be actuated.

The actuation of the R3A relay shown in FIG. 5D indicates that three report pulses have been received. The front contact R3Ac in series with the coil of the NR2 relay is then closed conditioning the NR2 relay to be actuated. In addition, once the three pulses have been received, the RX relay is deenergized and resets after a predetermined time interval. Thus, when the RX relay resets the NR2 relay is actuated through the back contact RXb and the front contacts of the R3Ac and P9b. The actuation of the NR2 relay causes its front contact NR2b in the H chain to close actuating the H1 relay which is then locked in through its front contact H1d. The ATX relay remains actuated because of the back contacts H3b through H9b of the other H relays. But the back contact NR2c of the NR2 relay in series with the coil of the ATY relay is opened and the ATY relay is deenergized in turn deenergizing the ATZ relay. The deenergization of the ATY relay opens the front contact ATYc in series with the relays C23 and C24 and relay CX are deenergized. Since relay H1 is now actuated, a circuit is prepared through the front contact H1b of H1 and the back contact H3c of H3 for relays C25 and C26. Since relay C24 is deenergized, relays L4 and L5 are reset. This resets the SS relay in turn resetting the PC relay and the counting chain including relays P1 through P9. When relay P9 is deenergized, the Report Pulse Counter Unit is reset and in addition relay NR2 is deenergized and relay TR is reenergized. The deenergization of relay NR2 reenergizes relay ATY and relay ATZ and now depending on the setting of relay G3 relays C25 or C26 of the Code Unit are actuated.

In the situation assumed, relay C25 is actuated. This results in the actuation of relays L1, L4, L5 and L9 and in the transmission of a second code signal. After the second code signal is transmitted and the report received, relay H3 is actuated and locked in through its front contact H3a and the above-described process repeated. In the same manner relays H5, H6, H7, H8 and H9 are actuated and the corresponding codes transmitted. On the actuation of relay H9 its back contact H9b in series with the coil of ATX is opened and the signalling process is interrupted. The apparatus is now set with relays H1 through H9 actuated as indicated.

The above description assumes that there has been no misoperation in the signalling. Now the situation will be considered in which a misoperation occurs. For example, assume that after P9 is actuated a report signal is not received. Under such circumstances the relay TR shown in FIG. 5D times out closing its back contact TRa and actuating relay AR. The actuation of relay AR actuates relay AA producing an alarm. If a report signal is received, but, for example, it includes only one or two pulses rather than three, relay R3A fails to operate and TR is again actuated producing the alarm.

At the end of the initial operation just described assuming that it has been carried out properly, relays H1 through H9 and G7 are actuated. In addition, in the standby condition of the apparatus relays RP, CS, KX and TR are actuated. The other relays are deenergized.

*Control Sender—Automatic Operation*

The Automatic Operation of the CONTROL SENDER is initiated by a change in the signals which produces a change in the setting of the relays G1 through G9 shown in FIG. 5A. Let it be assumed that there has been such a change and G3 has been deenergized. This change occurs when the relay 3ML11a is unlatched from the energized condition. The deenergization of relay G3 opens the front contacts G3b and G3c in series with H3 and recloses the back contacts G3a and G3d. The effect of this change is to reverse the current flow through H3 causing H3 to be deenergized. The lock-in front contact H3a of H3 now opens preventing H3 from being reenergized. The back contact H3b of H3 in series with the coil of ATX shown in FIG. 5B is now closed actuating ATX, thus in turn actuating ATY and ATZ. Since at this time the front contact H1b is closed and H3c is closed, and since relay G3 is now deenergized, relay C26 is actuated. Relay H3 is now reenergized but with the current through its coil flowing in the opposite direction to the initial current. This causes relays L2 and L4 to be actuated and the operation described in connection with the standby condition of the CONTROL SENDER is repeated transmitting a code consisting of second and fourth long pulses and the remainder short. The resetting operation as described above is then repeated after the code has been transmitted. This results in the ultimate de-energization of relays ATY and C26. H3 remains energized. The apparatus is now in condition to operate again.

*Operation—Control Sender—Manual*

Let it be assumed that it is desirable to turn on the transmitter at the controlled station 5. For this purpose, push button RS5 is actuated, actuating relay ST5 and locking it in through the coil of ralay STX (shown in FIG. 5A) which is also actuated. The actuation of STX prevents further actuation of any ST relays. In addition, the actuation of STX conditions the Equipment Selector to be operated. Since the transmitter is to be turned on the corresponding push button is actuated, actuating relay TN through the front contact STXe of STX and the back contact NF12a of NF12. The coil of NF12 is then connected in the lock-in circuit with the coil of TN and is actuated. The actuation of NF12 prevents actuation of any of the relays TF, DC1, DC2, SPC or TPC. In addition, the actuation of NF12 opens the back contact NF12c in series with the coil of relays C23 through C38 and prevents operation of any of the relays responsive to the Automatic Selection Unit. Further, the operation of NF12 closes a front contact NF12b in series with relays C1 through C16 and relay C7 is energized through the back contact ATYd of ATY, the front contact NF12b, the front contact TNd of TN, the front contact ST5e of ST5. The actuation of C7 causes relays L1, L2, L3 and L9 to be energized and a code consisting of first, second and third long pulses and the remainder short pulses and the check pulse, a long pulse, is transmitted. The transmitting and resetting operation is the same as described above.

*Control Receiver—Description*

Figure 6A:
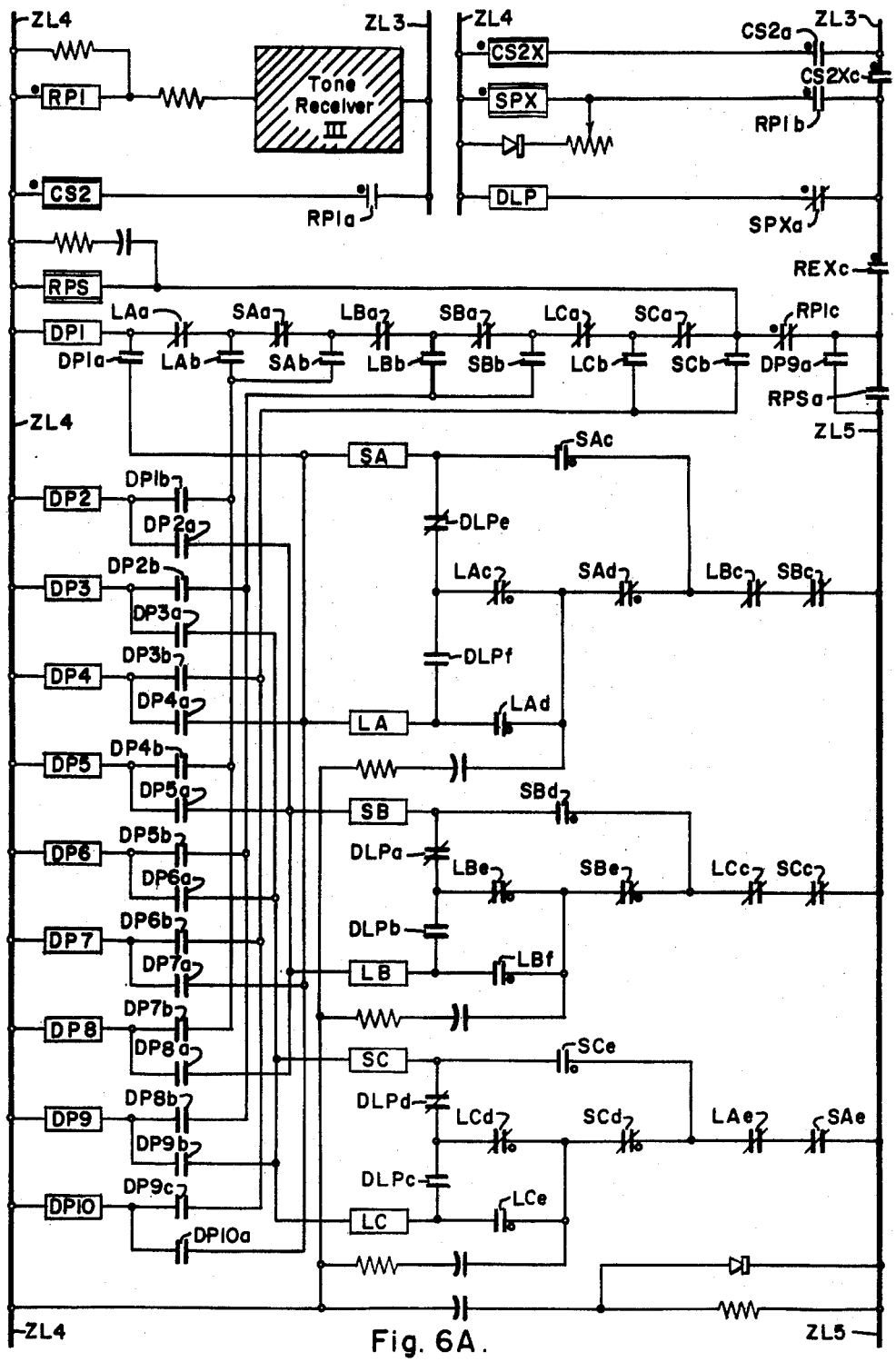

The CONTROL RECEIVER includes Tone Receiver III shown in FIG. 6A, a Long-Short Pulse Discriminator which is connected to Tone Receiver III to discriminate between the pulses which is produces. The CONTROL RECEIVER also includes a Pulse Counter and Detector which receives the pulses from the Discriminator, counts the pulses and responds to the pulses in accordance with whether they are long or short. In addition there is a Code Register Unit which receives the pulses from the Detector and registers the long and short pulses. The Code Register Unit is connected to a Check Unit which verifies that the long pulses in any code are odd or even. If the check is correct, this Unit actuates a Normality Indicating Unit which in turn conditions a Code Responsive Unit to operate responsive to the codes and actuate the equipment. The Code Responsive Unit is actuated by the Code Register Unit.

The apparatus also includes a Report Pulse Unit and a Report Pulse Counter Unit which cooperate with Tone Generator IV to transmit the three report pulses to the CONTROL SENDER.

The apparatus also includes a Fault Indicating Unit which operates if the odd-even check is incorrect or if a spurious pulse is received. This Unit and the Report Pulse Counter Unit cooperate with a Reset Unit to reset the apparatus. The apparatus is also reset in the eventuality that the Report Pulse Counting Unit fails to operate. In addition, the apparatus is reset on receiving three pulses from the CONTROL SENDER or from neighboring stations.

Tone Receiver III, for example, may have a tone of frequency of 1615 cycles and is normally energized. When a pulse is received Tone Receiver III is deenergized for the duration of the pulse. The CONTROL RECEIVER includes a relay RP1 which is maintained energized by the Tone Receiver so long as the Tone Receiver is energized. The relay is denergized during the intervals during which pulses are received.

The CONTROL RECEIVER is supplied from conductors ZL3 and ZL4.

The Long-Short Pulse Discriminator shown in FIG. 6A includes relays SPX and DLP. The coil of relay SPX is adapted to be connected between conductors ZL3 and ZL4 through a front contact CS2Xc of channel supervision relay CS2X and a front contact RP1b of relay RP1. Relay DLP is adapted to be connected between conductors ZL3 and ZL4 through the front contact CS2c and a back contact SPXa of relay SPX. The Pulse Counter and Detector includes relays DP1, DP2, DP3, DP4, DP5, DP6, DP7, DP8, DP9 and DP10, relays SA and LA, SB and LB, and SC and LC and a supervisory time delay relay RPS. The relays of the counter are adapted to be connected to conductor ZL3 through the front contact CS2Xc and a front contact REXc of reset relay REX and either through front contact RPSa of RPS or front contact DP9a of DP9. For convenience it may be assumed that a conductor ZL5 is energized from conductor ZL3 through contacts CS2Xc, REXc and RPSa or DR9a.

The coils of the DP relays are connected directly to ZL4. The coil of relay DP1 shown in FIG. 6A is adapted to be connected to ZL5 through RPSa or DP9a and back contacts RP1c, SCa, LCa, SBa, LBa, SAa, LAa, of relays RP1, SC, LC, SB, LB, SA and LA. The coil of relay SA is adapted to be connected across the above-listed back contacts through a front contact DP1a of DP1 and through additional back contacts SBc LBc, SAd, LAe, DLPe, of SB, LB, SA, LA and DLP. Thus, the coil of SA is in series with the coil of DP1 but so long as the back contact RP1c is closed, the coil of SA is short circuited. The back contacts SAd, LAc, and DLPe, in series with the coil of SA are adapted to be short circuited by a front contact SAc of SA. The coil of relay LA is adapted to be connected in series with the coil DPI alternatively to SA through back contacts SBc, LBc, SAd, LAc, DLPb of SB, LB, SA, LA and DLP. The coil of relay DP2 is adapted to be connected between conductors ZL5 and ZL4 through RPSa or DP9a and back contacts RP1c, SCa, LCa, SBa, LBa, and front contacts SAb and DP1b or back contact SAa and front contacts LAb and DP1b. The coil of relays SB and LB are related to the coil of DP2 in the same manner as the coils of relays SA and LA are related to the coil of DP1. The coil of relay DP3 is adapted to be connected between conductors ZL5 and ZL4 through front contacts SBb or LBb of SB, or LB analogously to the coil of relay DP2. The coils of relays SC and LC are adapted to be connected in series with the coil of relay DP3 analogously to the coils of relays SA and LA and DP1 and SB and LB and DP2. The coils of DA4, SA and LA and the coils of DPS, SA and LA and the coils of DP10, SA and LA are connected analogously to the coils of DP1, SA and LA. The coils of DP5, SB, and LB and DP8, SB and LB are connected analogously to the coil of DP2. The coils of DP6, SC and LC and DP9, SC and LC are connected analogously to the coils of DP3, SC and LC.

The coil of relay RPS is adapted to be connected between ZL5 and ZL4 through RPSa or DP9a and RP1c. The time delay of the RP1 relay is such that this relay remains actuated during the whole of the coding interval, thus the coils of relays SA, LA, SB, LB, SC, LC, are connected as described above to be energized through the coils of the DP relays so long as the pulses are being received. If the pulsing is interrupted before the entire code has been received the RPS relay drops out resetting the Pulse Counter and Detector.

Figure 6B:
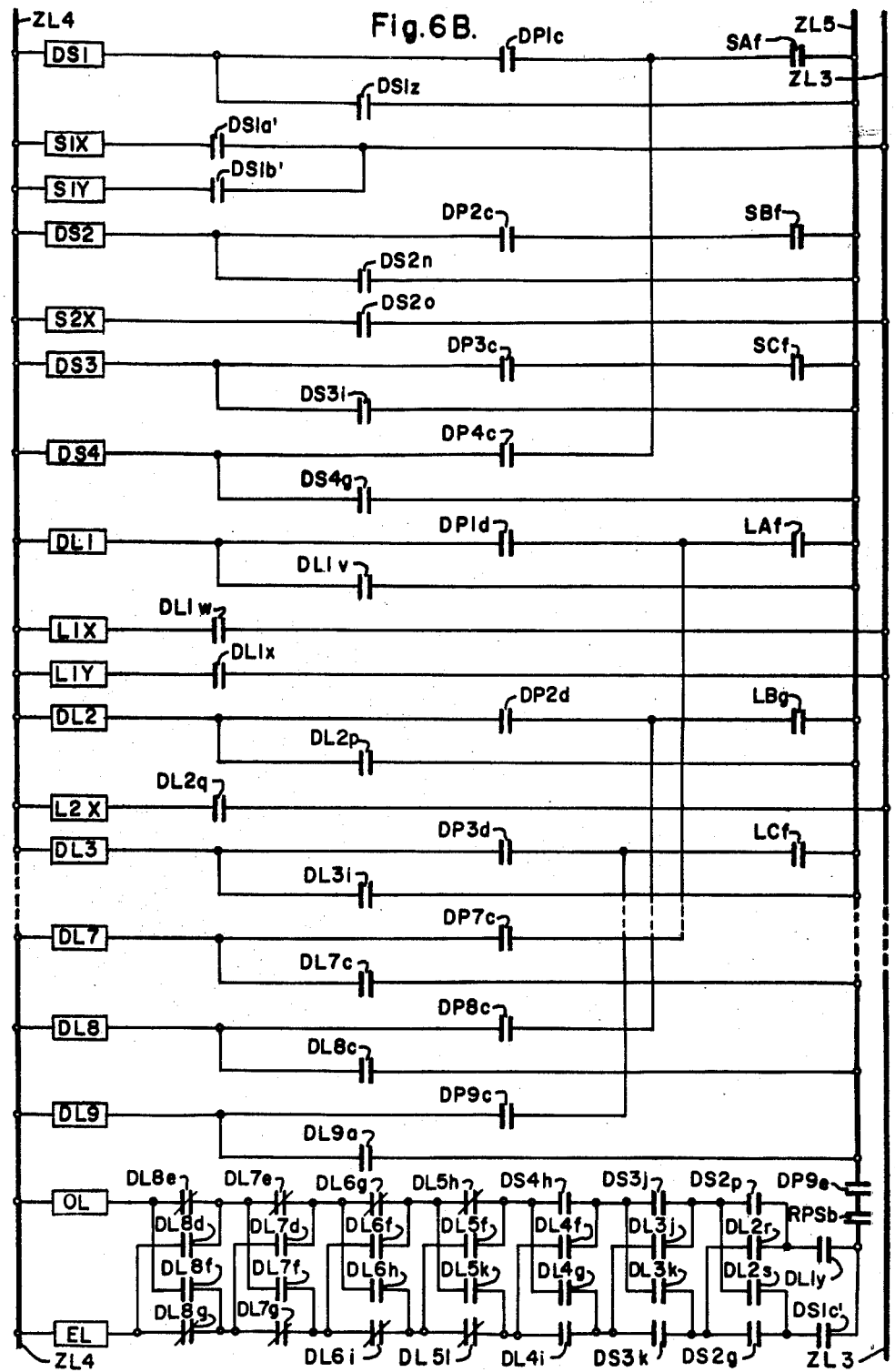

The Code Register Unit includes a plurality of DS relays shown in FIG. 6B which are actuable when short pulses are impressed and a plurality of DL relays actuable when long pulses are impressed. Where the number of contacts on the DL relays are adequate the back contacts of the DL relays correspond to short pulses and the front contacts to long pulses.

The coil of relay DS1 is adapted to be connected between conductors ZL5 and ZL4 through a front contact SAf of the SA relay and a front contact DP1c of the DP1 relay and is adapted to be locked in through its own front contact DS1z. The coils of relays S1X and S1Y are adapted to be connected between conductors ZL3 and ZL4 through front contacts DS1a' and DS1b' of DS1. Relay DS2 is adapted to be connected between conductors ZL5 and ZL4 through front contacts SBf and DP2c of the SB and DP2 relays and to be locked in through its own front contact DS2n. Relay S2X is adapted to be connected between conductors ZL3 and ZL4 through a front contact DS2o of DS2. The coil of relay DS3 is adapted to be connected between conductors ZL5 and ZL4 through front contacts SCf and DP3c of SC and DP3 and to be locked in through its own front contact DS3c'. The coil of DS4 is adapted to be connected between conductors ZL5 and ZL4 through front contacts SAf and DP4c and to be locked in through its own front contact DS4g. The coil of DL1 is adapted to be connected between conductors ZL5 and ZL4 through the front contacts LAf and DP1d of LA and DP1 and to be locked in through its own front contact DL1v. The coils of L1X and L1Y are to be connected between conductors ZL3 and ZL4 through front contacts DL1w and DL1x of DL1. The coil of DL2 is adapted to be connected between conductors ZL5 and ZL4 through front contacts LBf and DP2d of LB and DL2 and to be locked in through its front contact DL2p. The coil of L2X is adapted to be connected between conductors ZL3 and ZL4 through a front contact DL2q of DL2. The coils of DL3, DL4, DL5, DL6, DL7, DL8 and DL9 are adapted to be connected between conductors ZL5 and ZL4 similarly to DL1 and DL2 through front contacts LAf, LBf and LCf, respectively, and through associated front contacts DP3d, DP4d, DP5c, DP6c, DP7c, DP8c, DP9c, of DP3 through DP9.

The Check Unit includes relays OL and EL shown in FIG. 6B and serves to check the code to determine if it is correct. The coils of relays OL and EL are adapted to be selectively connected between conductors ZL5 and ZL4 through a front contact DP9e of DP9, a back contact RPSb of RPS and selected contacts of DL1 through DL8 and DS1 through DS4, depending on the selected code. The contacts are so connected to the coils of OL and EL that if the code has an even number of long pulses and is properly received, the coil of EL is energized, and if it has an odd number of long pulses and is properly received, OL is energized. The energization of EL for an odd number of long pulses in the code or OL for an even number of long pulses in the code indicates an error, and the proper relays for signalling the error are actuated.

The failure of either of the relays OL or EL to be actuated at the end of a coding interval indicates a fault and again the proper signalling apparatus is actuated.

Figure 6C:
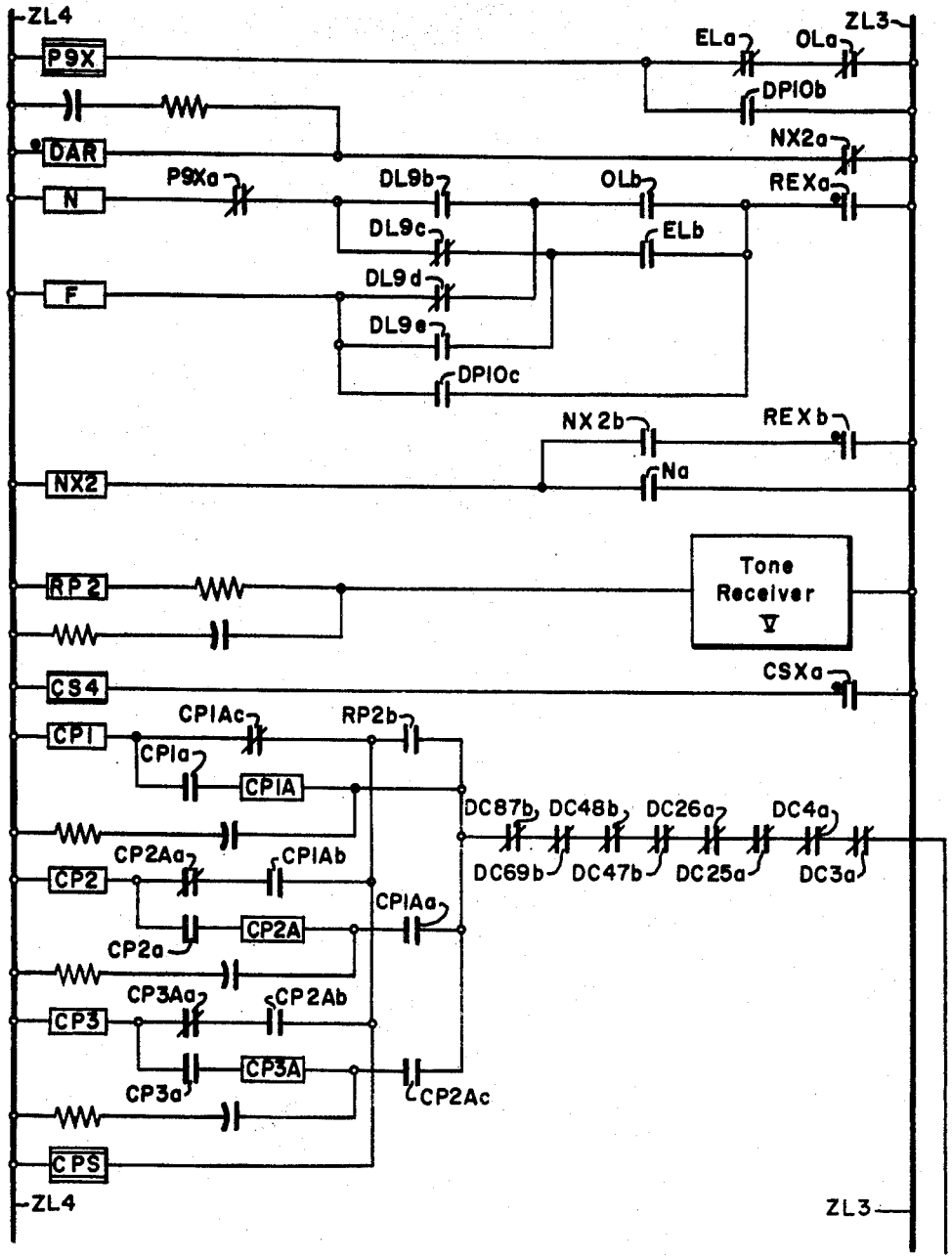

The Normality Indicating Unit includes a relay N and a relay NX2 shown in FIG. 6C. The coil of relay N is adapted to be connected between ZL3 and ZL4, through a front contact REXa of relay REX in the Reset Unit and, alternatively, through a front contact OLb of OL, a front contact DL9b of DL9, and the back contact P9Xa of P9X or through a front contact ELb of EL, a back contact DL9c of DL9 and the back contact P9Xa. The relay N is then actuated through a front contact of EL and the back contact of DL9 in the event of an even number of long pulses in the code and through the back contacts of OL and DL9 in the event of an odd number of pulses in the code.

The coil of relay NX2 shown in FIG. 6C is adapted to be connected between conductors ZL3 and ZL4 through a front contact Na of relay N and to be locked in between ZL3 and ZL4 through a front contact REXb of REX and a front contact NX2b of NX2. The actuation of relay NX2 closes a front contact NX2e between conductor ZL3 and a conductor ZL6, the latter conductor provides potential for the Code Responsive Unit.

Figure 6D:
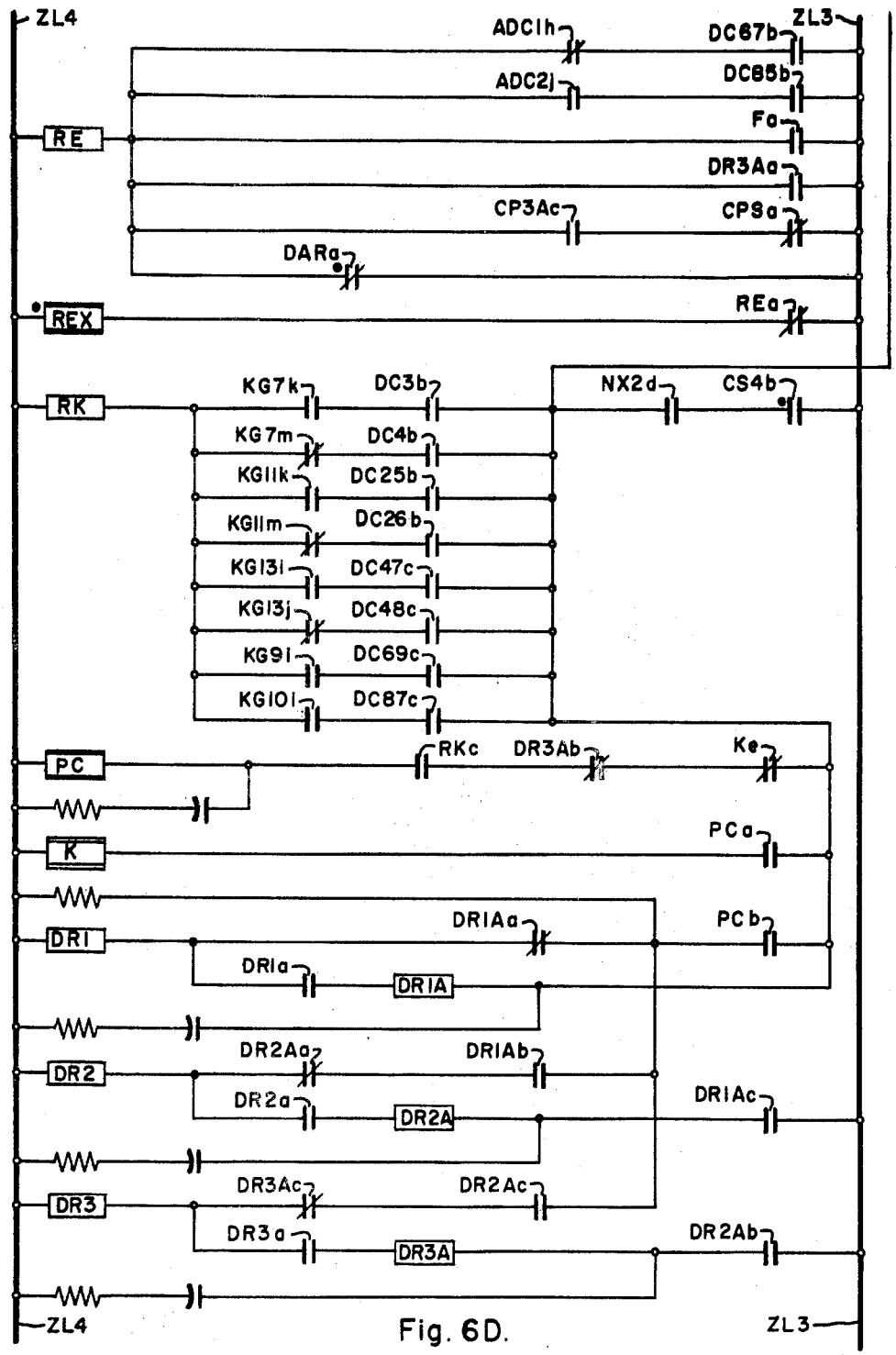
Figure 6E:
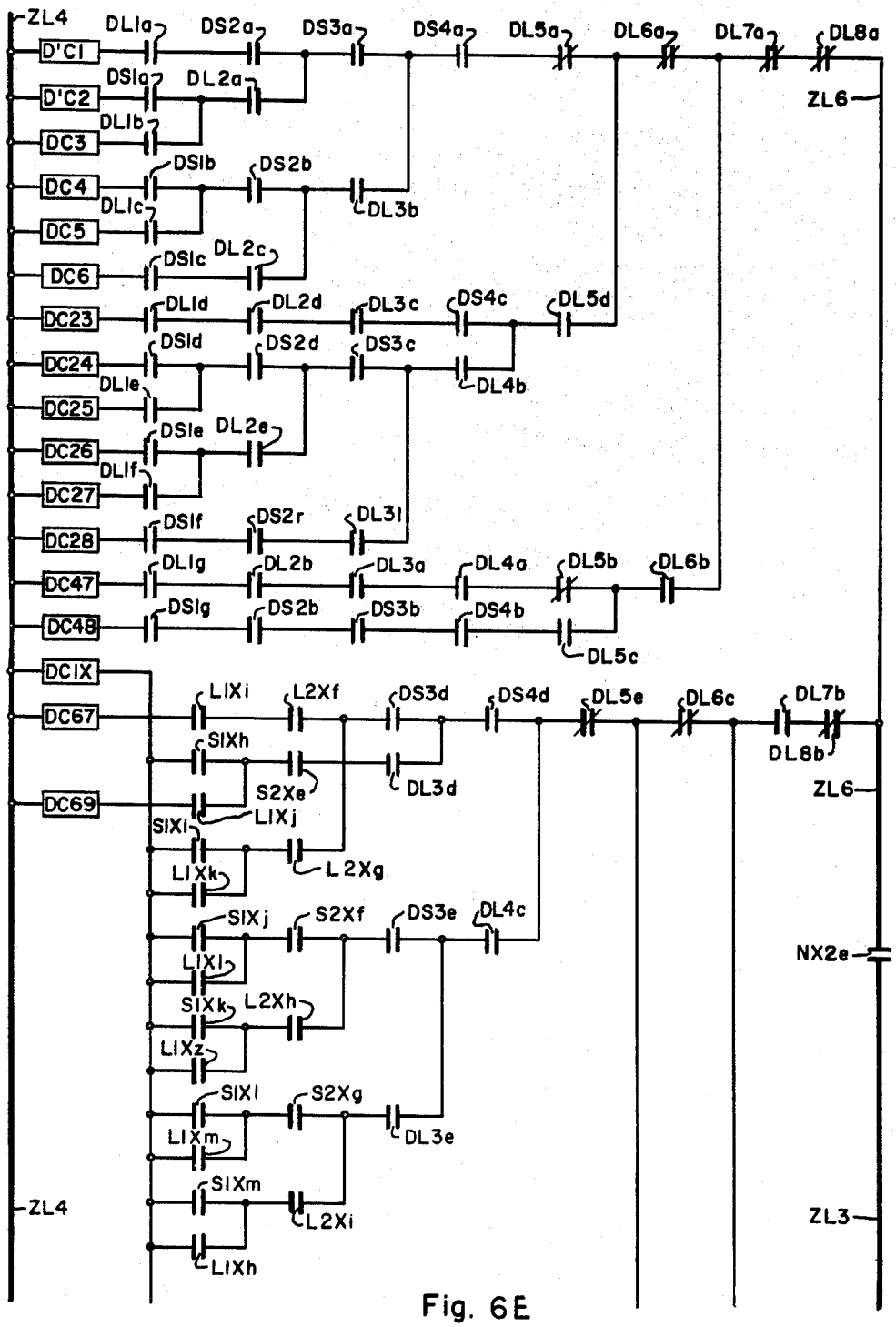
Figure 6F:
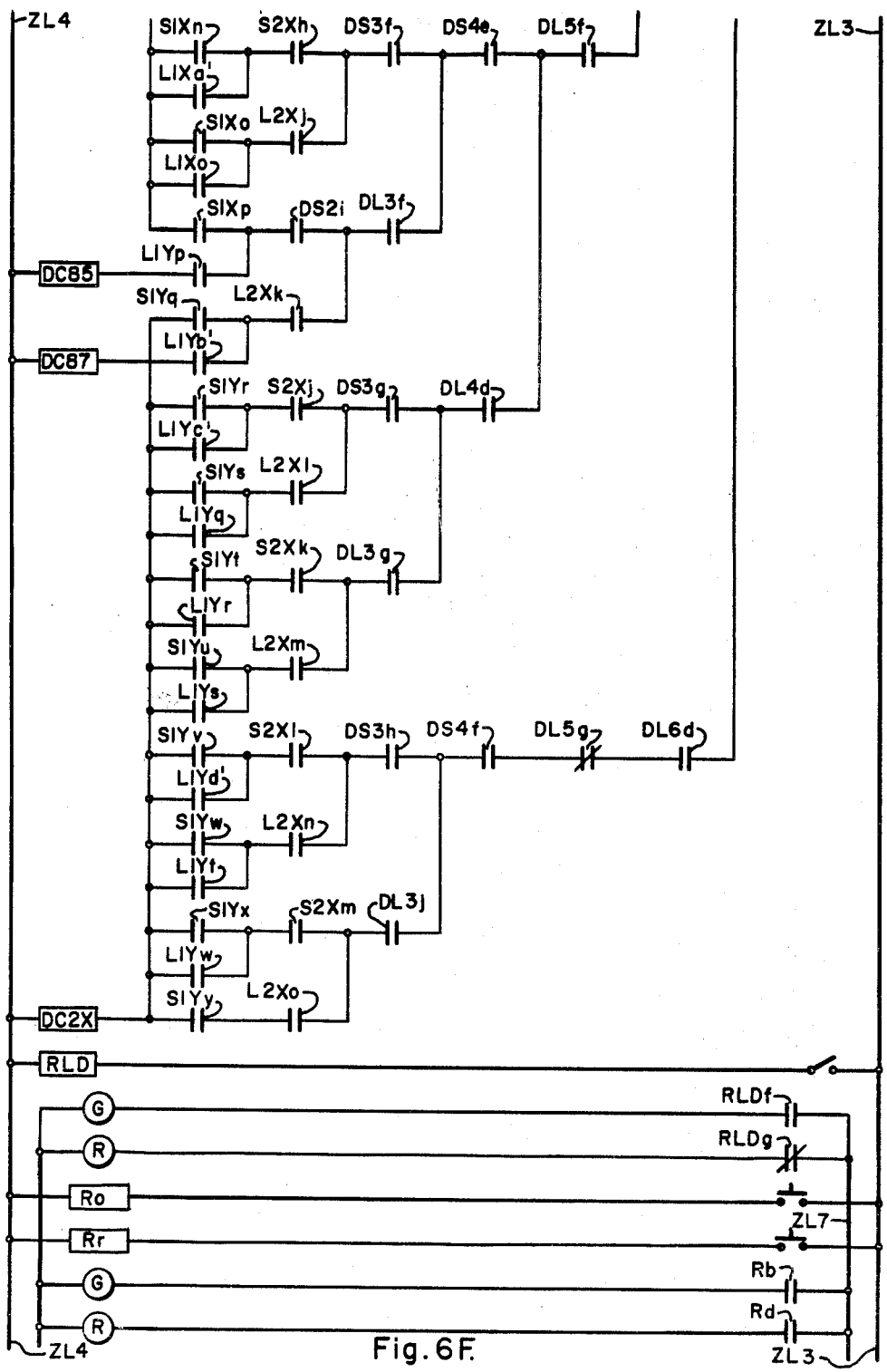

The Code Responsive Unit shown in FIG. 6E includes relays D'C1, D'C2, DC3 through DC6, DC23 through DC28, DC47, DC48, DC67, DC69, DC85 and DC87. The numbers following the C in each of the identifications correspond to the numbers following the C in the CONTROL SENDER and identify the number of the code to which DC relay corresponds. Thus relay DC85 corresponds to the 85th code. Not all codes are represented by DC relays because the CONTROL RECEIVER is only one of a group of controlled stations which is controlled by the CONTROL SENDER.

The coils of the DC relays are adapted to be selectively connected between conductors ZL6 and ZL4 in dependence upon the operation of DL relays and DS relays. The latter are the code register relays and are operated in dependence upon the code received. Thus, the coil of relay D'C1 is adapted to be connected between conductors ZL6 through back contacts DL5a through DL8a of relays DL5 through DL8 and front contacts DL1a and DS2a through DS4a of relays DL1 and DS2 through DS4. Similarly, the coil of relay DC23 is adapted to be connected between ZL6 and ZL4 through back contacts, DL6a through DL8a and front contacts DL1d, DL2d, DL3e, DS4c, DL5d. The manner in which the various DC relays are selectively connected and the contacts through which they are connected can be determined from the circuit diagram. The actuation of a DC relay results in actuation of the associated equipment or of an indicator light to indicate that equipment in another controlled station is being put into operation.

For indicating purposes, certain of the DC relays control the supply of power between a conductor ZL7 and ZL4. The conductor ZL7 is adapted to be energized from conductor ZL3 through a normally open contact CP3Ab of relay CP3A shown in FIG. 6C. This relay operates when pulses are received from a neighboring controlled station to indicate that apparatus is in operation. Thus, the operate or reset coils (UTo or UTr) of relay UT indicating operation of a neighboring transmitter are adapted to be connected between conductors ZL7 and ZL4 through front contacts of relays D'C1 or D'C2. Relay UT is connected to actuate green or red light signals depending on its setting. Similarly, the operate or reset coils (DTo or DTr) of a DT relay indicating the condition of another neighboring transmitter are controlled from front contacts, DC5a and DC6a, of relays DC5 and DC6. Relay DC2X performs a similar function with respect to the reset coil of a data channel relay ADC1. Relays DC23, DC24, DC27 and DC28 perform similar functions. Relays DC3 and DC4 control the radar transmitter at the CONTROL RECEIVER, the former turning the radar transmitter on and the other off. Relays DC67 and DC69 control the signalling for the turning on and off of one of the data channels and relays DC85 and DC87 control the signalling for the turning on and off of the other. DC47 and DC48 control the single pulse and triple pulse transmission and also the indication of this transmission. DC25 and DC26 are responsive to the Automatic Selection Unit of the CONTROL SENDER and are tied in to the automatic tracking by the transmitter of the CONTROL RECEIVER.

The Report Pulse Unit shown in FIG. 6D includes an RK relay, a PC relay and a K relay. The coil of the RK relay is adapted to be connected between conductors ZL3 and ZL4 through the front contacts CS4b and NX2d, and front contacts DC3b, DC4b, DC25b, DC26b, DC47c, DC48c, DC69c, DC87c of certain of the code responsive relays and front or back contacts KG7k, KG7m, KG11k, KG11m, KG13i, KG13j, KG9i, KG10i of their associated relays in the indicator apparatus which are actuable when the indicator corresponding to the code responsive relay is set. Each of the just mentioned DC relays actuates apparatus at the CONTROL RECEIVER and the corresponding KG relay energizes the corresponding lamp signal. The coil of the PC relay is adapted to be connected between ZL3 and ZL4 through CS4b, NX2d, Ke, DR3Ab and RKc.

Typical of the contacts in the coil circuit of the RX relay are the front contact DC3b and the front contact KG7k, the front contact DC4b and the back contact KG7m. Operation of the DC3 relay turns the transmitter on and operation of the DC4 relay turns it off. The KG7 relay would be actuated with the transmitter on and deenergized with the transmitter off. Thus, the coil of the PC relay is connected in the above-described circuit either when the DC3 relay is actuated to turn the transmitter on or the DC4 relay to turn it off. The other pairs of contacts are similar.

The coil of the K relay is adapted to be connected between conductors ZL3 or ZL4 through contacts CS4b, NX2d and PCa.

The Report Pulse Counter Unit shown in FIG. 6D is similar to the analogous Counter Unit in the CONTROL SENDER. It includes the relays DR1, DR2, DR3, DR1A, DR2A, DR3A connected in the same manner as the corresponding unit in the SENDER.

With the NX2 relay and any of the DC relays actuated and the contacts of their respective associated indicator KG relays closed, the K relay is energized and deenergized three times. The three actuations of the K relay interrupts the tone of the Tone Generator IV, to which it is connected causing the Tone Generator to send out three pulses. In addition, the DR3A relay is actuated and operates to reset the CONTROL RECEIVER.

The apparatus also includes a Check Signal Counter Unit shown in FIG. 6C for receiving signals from neighboring stations to indicate operation of certain apparatus at the neighboring stations. The Check Signal Counter Unit includes the relays CP1, CP2, CP3, CP1A, CP2A, CP3A, and, in addition, a supervisory relay CPS. The above listed relays are connected in a counter for counting three pulses similar to the DR and the DRA relays just described. The counting is effected by the actuation of an RP2 relay. The coil of the RP2 relay is connected to Tone Receiver V which receives pulse signals from the neighboring stations. This Tone Receiver is normally deenergized and is energized so long as it receives the pulses. When Tone Receiver V is energized, the RP2 relay is actuated. When the Tone Receiver receives three pulses, it actuates the RP2 relay three times and the counter is enabled to count three, actuating the CP3A relay at the end of the count. The CP counting chain just described is adapted to be supplied with power from conductor ZL3 through contacts CS4b, NX2d and back contacts DC3a, DC4a, DC25a, DC26a, DC47b, DC48b, DC69b, DC87b of the DC3, DC4, DC25, DC26, DC47, DC48, DC69 and DC87 relays. Thus, if one of the latter relays is actuated to produce operation of the CONTROL RECEIVER, the CP counting chain is disabled to receive signals.

The actuation of the CP3A relay actuates the Reset Unit and also causes the energization of conductor ZL7 to energize the indicator relays to indicate operational functions at the neighboring controlled stations.

The Extra Pulse Detector includes a P9X relay (FIG. 6C). The coil of this relay is adapted to be connected between conductors ZL3 and ZL4 alternatively through back contacts OLa and ELa of the OL and EL relays or through a front contact DP10b of DP10. The P9X relay has a back contact P9Xa in series with the N relay, preventing normality indication in the event of a spurious pulse.

The Fault Indicator Unit includes an F relay. The F relay is adapted to be connected between conductors ZL3 and ZL4, through a front contact REXa of the REX relay and, alternatively, through a front contact OLb of the OL relay and front contact DL9b of DL9, front contact ELb of the EL relay, and back contact DL9c of DL9, or a front contact DP10c of DP10. Thus, the fault relay is actuated if the count of long pulses is incorrect, or if there is a spurious pulse.

The Timed Reset Unit includes a relay DAR. This relay is of the time delay type and is connected between conductors ZL3 and ZL4 through a back contact NX2a of NX2. The relay DAR has a long timing interval and times out if NX2 remains actuated during this long interval and the N relay is not actuated. The DAR relay then operates to reset the apparatus.

The Reset Unit (FIG. 6D) includes an RE relay and an REX relay. The coil of the RE relay is adapted to be connected between conductors ZL3 and ZL4 alternatively through a front contact of DC67 and a back contact ADC1h of ADC1, a front contact DC85b of DC85 and a front contact ADC2j of ADC2, a front contact Fa of F, a front contact DR3Aa of DR3A, a back contact CPSa of CPS, and a front contact CP3Ac of CP3A and a back contact DARa of DAR. The coil of the REX relay is connected between conductors ZL3 and ZL4 through a back contact REa of the RE relay. Actuation of the RE relay thus causes the REX relay to drop out and reset the apparatus.

Control Receiver—Standby

In the standby condition of the CONTROL RECEIVER, Tone Receiver III shown in FIG. 6A is normally energized and the RP1 relay is actuated. The CS2 and CS2X relays are then actuated and the SPX relay is actuated. The DLP relay is then deenergized. Relays RPS and DP1 through DP10 are deenergized because RP1 is unactuated. Conductor ZL5 is then deenergized. The DL and DS relays of the Code Register Unit are deenergized as are also the OL, EL, P9X, N, F and NX2. The DAR relay is actuated. The CS4 relay is actuated as is also the REX relay. Since the NX2 relay is unactuated, the CP chain and the DR chain are deenergized as are also the RK and PC relays. The RKX relay is actuated and the K relay is deenergized. The RE relay is also deenergized. Since the CP3A relay is deenergized, the ZL7 conductor is deenergized. Since the code register relays DL and DS are deenergized, the DC coding relays and their associated relays are deenergized.

Control Receiver Operation

The operation of the CONTROL RECEIVER will be described in two situations; one in which it receives an indication of an operation taking place at a neighboring station and the other where it receives a control producing operation at the CONTROL RECEIVER.

For this purpose, it will be assumed that first code relay C2 at the CONTROL SENDER is actuated and at a later time C3 is actuated. An examination of the Code Register Unit at the CONTROL SENDER reveals that code 2 produced by the C2 relay consists of a short pulse, a long pulse, six short pulses and a long checking pulse, and code 3 consists of a long pulse, a long pulse, six short pulses and a short checking pulse.

Consider first the operation when code 2 is received. When the first pulse of code 2 is received, the actuation of the RP1 relay is interrupted for the duration of the short pulse. The circuit for the SPX relay is then opened but the SPX relay remains actuated. The time interval of the SPX relay is longer than the duration of the short pulse so that the SPX relay is unaffected by the short pulse. The DLP relay then remains unactuated. The actuation of the RP1 relay also closes the circuit to the coil of the DP1 relay, actuating this relay. The SA relay is then conditioned to be actuated through the front contact of the DP1 relay, but its actuation is prevented so long as the RP1 relay remains deenergized, that is, for the duration of the short pulse. At the end of the short pulse, the SA relay is actuated. The actuation of the SA and DP1 relays causes the DS1 relay to be actuated and locked in.

The pulsing apparatus is now reset and ready for a second pulse. The second pulse is a long pulse. The deenergization of the RP1 relay shown in FIG. 6A for the duration of the long pulse causes the circuit through the coil of the SPX relay to be opened and since a long pulse is being impressed, the duration of which is longer than the timing interval of the SPX relay, the latter drops out and the DLP relay is actuated. In the coder, the DP2 relay is actuated when the RP1 relay becomes deenergized through the front contact SAb of the SA relay and a front contact DP1b of the DP1 relay. The SB relay is conditioned to be actuated through a front contact DP2a of the DP2 relay, but its actuation is prevented by the back contact RP1c of the RP1 relay and while this back contact remains closed. The DLP relay is actuated when SPX times out opening the circuit through the SB relay and closing the front contact DLPb in series with the coil of the LB relay, thus conditioning the latter to be actuated after the long pulse when the RP1 back contact opens. The LB relay is then actuated and the DL2 relay is actuated through the front contacts LBg, of and DP2b of the LB and DP2 relays and locked in. The remaining pulses of code 2 are short and in their turn SC and DP3, SA and DP4, SB and DP5, SC and DP6, SA and DP7, SB and DP8 are actuated. This actuates, respectively, DS3, DS4, while DL5, DL6, DL7 and DL8 remain unactuated. The D'C2 relay is then conditioned to be actuated through the back contacts DL5a, DL6a, DL7a and DL8a of DL5 through DL8 and the front contacts DS1a, DL2a, DS3a, DS4a of DS1, DL2, DS3, DS4 and DL2. Now, the checking pulse, which is a long pulse, is received. When the checking pulse is initially received, DP9 is actuated through a front contact DP8b of DP8 and SC is conditioned to be actuated, but the conditioning circuit is opened and a conditioning circuit for LC is closed by the actuation of DLP, DP9 and LC are then actuated after the ninth pulse is interrupted and this results in the actuation of DL9.

During the receiving of the pulses, the relay RPS shown in FIG. 6A is actuated. This relay has a timing interval which is longer than the duration between pulses and remains actuated during the receipt of the code and the check pulse. Thus conductor ZL5 remains energized during the receipt of the code. When the check pulse is received, conductor ZL5 is locked in through the contact DP9a of DP9, so that ZL5 remains energized even after RPS drops out. If the coding should be interrupted before it is completed, the RPS relay would drop out, deenergizing any actuated DP relays or any actuated SA, LA, SB, LB, SC or LC relays, thus resetting the counter.

If the code has been received properly, the RPS relay shown in FIG. 6A drops out after the coding and the OL relay is actuated through a front contact DP9e of the DP9 relay, a back contact RPSb of RPS, a front contact DS1c' of DS1, a front contact DL2s of DL2, front contact DS3j and DS4h of DS3 and DS4 and back contacts DL5h, DL6g, DL7e and DL8e of DL5 through DL8. The circuit through P9X is opened through a back contact OLa of OL, and P9X is deenergized and drops out. The circuit through the coil of the N relay is closed through the front contacts REXa, OLb, DL9b of REX, OL, DL9, and the back contact P9Xa of P9X. The actuation of the N relay causes NX2 to be actuated through a front contact Na of N to be locked in through front contacts NX2b and of NX2 and REXb. The actuation of NX2 causes the DC2 relay to be actuated through NX2e and ZL6 (FIG. 6E). This conditions the reset coil UTr of the UT relay to be actuated. In addition, the actuation of the NX2 relay conditions the counting chain CP to operate.

The code transmitted to the CONTROL RECEIVER was also transmitted to a neighboring controlled station which, on being set in accordance with the code, transmits three pulses. The three pulses actuate the RP2 relay of the CONTROL RECEIVER, resulting in the operation of the counting chain and the ultimate operation of relay CP3A. This causes conductor ZL7 to be energized through CP3Ab (FIG. 6G) and the reset coil of the UT relay to be actuated. The UT relay then is set to produce an indication which informs the operator of the CONTROL RECEIVER that the transmitter up range from the CONTROL RECEIVER is being set in operation. Since none of the DC relays which control the Report Pulse Unit are actuated, the Report Pulse Unit remains quiescent.

After the actuation of the CP3A relay, the pulsing of the RP2 relay is interrupted and the CPS relay drops out. The RE relay is then actuated through the back contact CPSa of the CPS relay and front contact CP3Ac of CP3A permitting the REX relay to drop out. The deenergization of the REX relay resets the Pulse Counter and Detector, the Code Register Unit and the Check Unit. The Normality Indicating Unit and the Code Responsive Unit are also reset and the apparatus is set for another operation.

Now assume that code 3 is received. Code 3 consists of first and second long pulses followed by six short pulses which is followed by a short checking pulse. The following relays in the Pulse Counter and Detector are actuated:

LA and DP1; LB and DP2; SC and DP3
SA and DP4; SB and DP5; SC and DP6
SA and DP7; SB and DP8; SC and DP9

DL1, DL2, DS3 and DS4 in the Code Register Unit are then actuated and DL5 through DL9 remain unactuated. DC3 is then conditioned to be actuated through back contacts DL5a through DL8a and the front contacts DS3a, DS4a, DL2a, DL1b. The actuation of DP9 locks in ZL5 independently of RPS and RPS drops out. EL is now actuated through the front contact DP9e, the back contact RPSb, the front contact DL1y, DL2r, DS3k and DS4i, and back contacts DL5f, DL6i, DL7g, DL8g. The actuation of EL opens the circuit through P9X and actuates N through the front contact REXa, the front contact ELb of EL, the front contact DL9e of DL9 and the back contact P9Xa. The actuation of N actuates NX2 which, in turn, actuates DC3. The actuation of DC3 turns on the transmitter. In addition, a back contact DC3a of DC3 in series with the Check Signal Counter Unit is opened, preventing this unit from operating. The actuation of DC3 and the turning on of the transmitter operates KG7 in the Indicator Unit.

In addition, the actuation of NX2 operates RK through the front contacts DC3b and KG7a of DC3 and KG7 and PC is energized through the front contact CS4b of CS4, the back contact NX2d of NX2, the back contact Ke of K, the back contact DR3Ab of DR3A, and the front contact RKc of RX.

The actuation of PC actuates the Report Pulse Unit. This produces three actuations of the relay K shown in FIG. 6D, transmitting three pulses to the CONTROL SENDER, which indicate that the station is in operation as coded. When the three pulses are transmitted, relay DR3A of the Report Pulse Counter Unit is actuated and relay RE is actuated to deenergize relay REX and reset the apparatus.

Several different types of misoperation may occur and these will now be considered. If the code signal is interrupted before it is completed, Tone Receiver III is energized at the point where the coding stops and relay RP1 is actuated. Relay RPS is then deenergized and, after a predetermined time interval, drops out. Since at this point DP9 has not been actuated, conductor ZL5 is deenergized and the Pulse Counter and Detector, Code Register Unit, and the Check Unit are reset. If the CONTROL SENDER has transmitted a code to produce an operation at the CONTROL RECEIVER, no report pulses are under such circumstances received at the CONTROL SENDER and an alarm is actuated at the CON- TROL SENDER to indicate improper operation and the CONTROL SENDER is reset.

Another misoperation would be the receipt of an improper code including an even or an odd number of long pulses rather than an odd or an even number of pulses, respectively, as set. For example, an even number of long pulses might be received on the transmission of code 1. Under such circumstances, the actuation of DP9 shown in FIG. 6A on the receipt of the ninth pulse would actuate EL shown in FIG. 6B instead of OL. Relay F would then be actuated through the front contact REX$a$, the front contact EL$b$ and the front contact DL9$e$. NX2 would then fail to operate to set one of the DC relays in the Code Responsive Unit. In addition, actuation of F would cause the operation of RE and the dropping out of REX to reset the apparatus. Again, an alarm would be sounded if the CONTROL SENDER is set to code apparatus at the CONTROL RECEIVER.

Another misoperation is the receipt of a spurious tenth pulse at the CONTROL RECEIVER. Relay DP10 shown in FIG. 6A would then be actuated and locked in through its front contact DP10$a$. The actuation of DP10 would cause P9X to be actuated. The back contact P9X$a$ in series with relay N would then be opened preventing actuation of relay N. In addition, relay F would be actuated through front contact REX$a$ and a front contact DP10$c$ of DP10 and the apparatus would again be reset and under the proper circumstances in an alarm would be sounded at the CONTROL SENDER.

Another misoperation could occur after relay NX2 is actuated and actuates the Code Responsive Unit. Under such circumstances, the circuit through the coil of relay DAR is opened at a back contact NX2$a$ of NX2 and DAR times out. If the operation coded does not now take place, for example, if the transmitter is not set into operation and KG7 actuated, the Report Pulse Counter Unit is not actuated and DR3A does not become energized. After a predetermined time interval relay DAR times out, actuating RE, dropping out REX and resetting the apparatus.

*Indication Sender*

The INDICATION SENDER functions to send complete reports as to the status of the thirty-four dual indicators at each of the controlled stations. Each of the thirty-four indicators includes two lamp signals of different colors, for example, a green signal to indicate that certain apparatus is in operation and a red signal to indicate that it is not. Each of the signals is set by a relay which is latched in. Contacts of these latched in relays are connected to control the actuation of a plurality of relays in a Sensing Unit. A binary coding system is used to transmit the status of the signals; a long pulse corresponding to one of the dual indicators, for example the green lamp, and a short pulse corresponding to the other.

In addition to the Sensing Unit, the INDICATION SENDER includes a Memory Unit. This Unit is set to respond to a change in any one of the relays of the Sensing Unit and to initiate a scanning cycle during which the status of each of the indicators is signaled.

The INDICATION SENDER also includes a Conditioning Unit which conditions the apparatus to produce a scanning cycle. The Conditioning Unit cooperates with a Counter Unit, the latter controlling a Code Pulse Producing Unit. By the cooperation of the Counter Unit and the Code Pulse Producing Unit short or long pulses, corresponding to the status of the indicators are produced. The Code Pulse Producing Unit acts on Tone Generator VI causing the latter to modulate a transmitter to transmit a code of long and short pulses to correspond to the thirty-four indicators.

In addition, a thirty-fifth checking pulse is transmitted. The duration of the checking pulse is set by an Odd-Even Determination Unit. The latter is responsive to the Sensing Unit setting the thirty-fifth pulse to correspond to the state of the Sensing Unit at the instant when the thirty-fifth pulse is initiated and not the state at the beginning of the signalling cycle. Thus the Check Pulse not only checks the correctness of a code being transmitted in the event that there is no change in the Sensing Unit but also checks the correctness of the code as applied to the Sensing Unit at the end of the coding interval.

The INDICATION SENDER also includes a Reset Unit which is actuable by the thirty-fifth pulse to reset the Conditioning Unit for another operation. Further, the INDICATION SENDER includes facilities for receiving a Manual Command Signal from the control station. This includes Tone Receiver VII and a pulse counter. The pulse counter is connected to the Memory Unit and sets the Memory Unit for a scanning cycle when a command signal consisting of several pulses is received.

The INDICATION SENDER includes a Channel Supervisory Unit. This Unit responds to Tone Receiver VII. If the latter is disabled the Channel Supervisory Unit sets a KG relay in the Sensing Unit to indicate disabled Receiver VII and the signals are scanned to transmit the information to the control station.

Figure 6G:
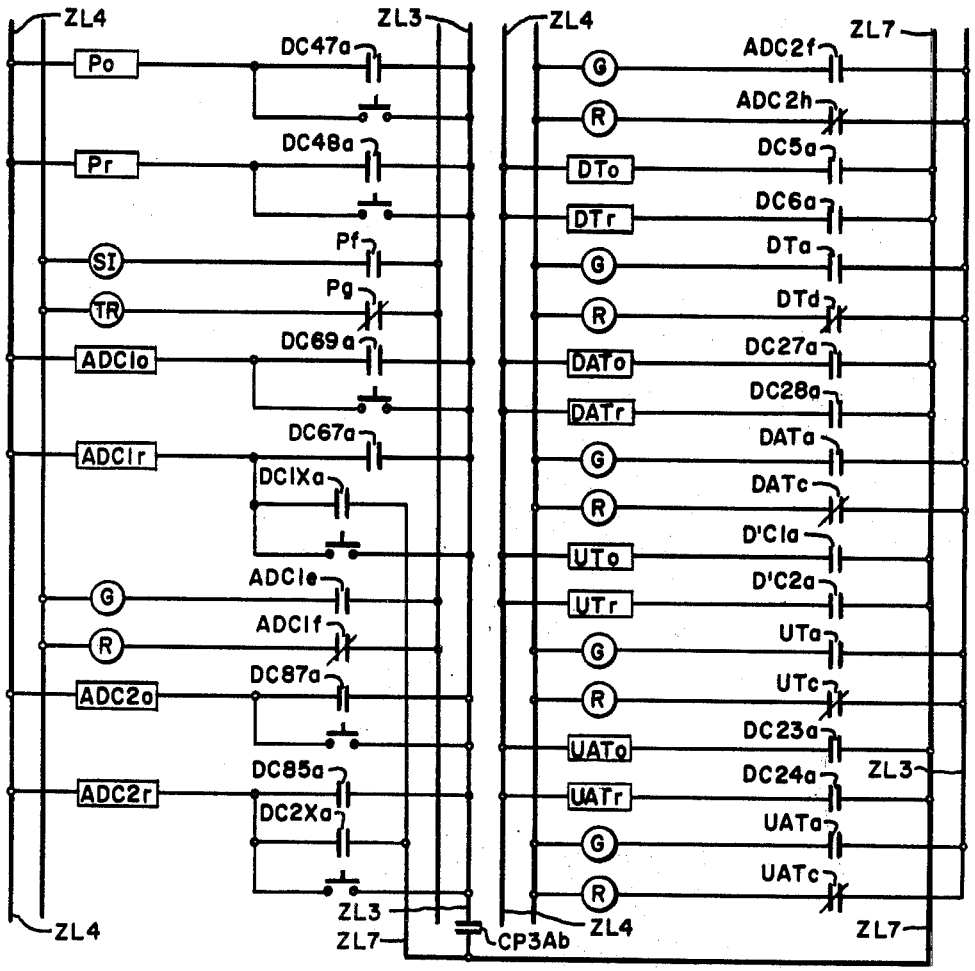
Figure 9A:
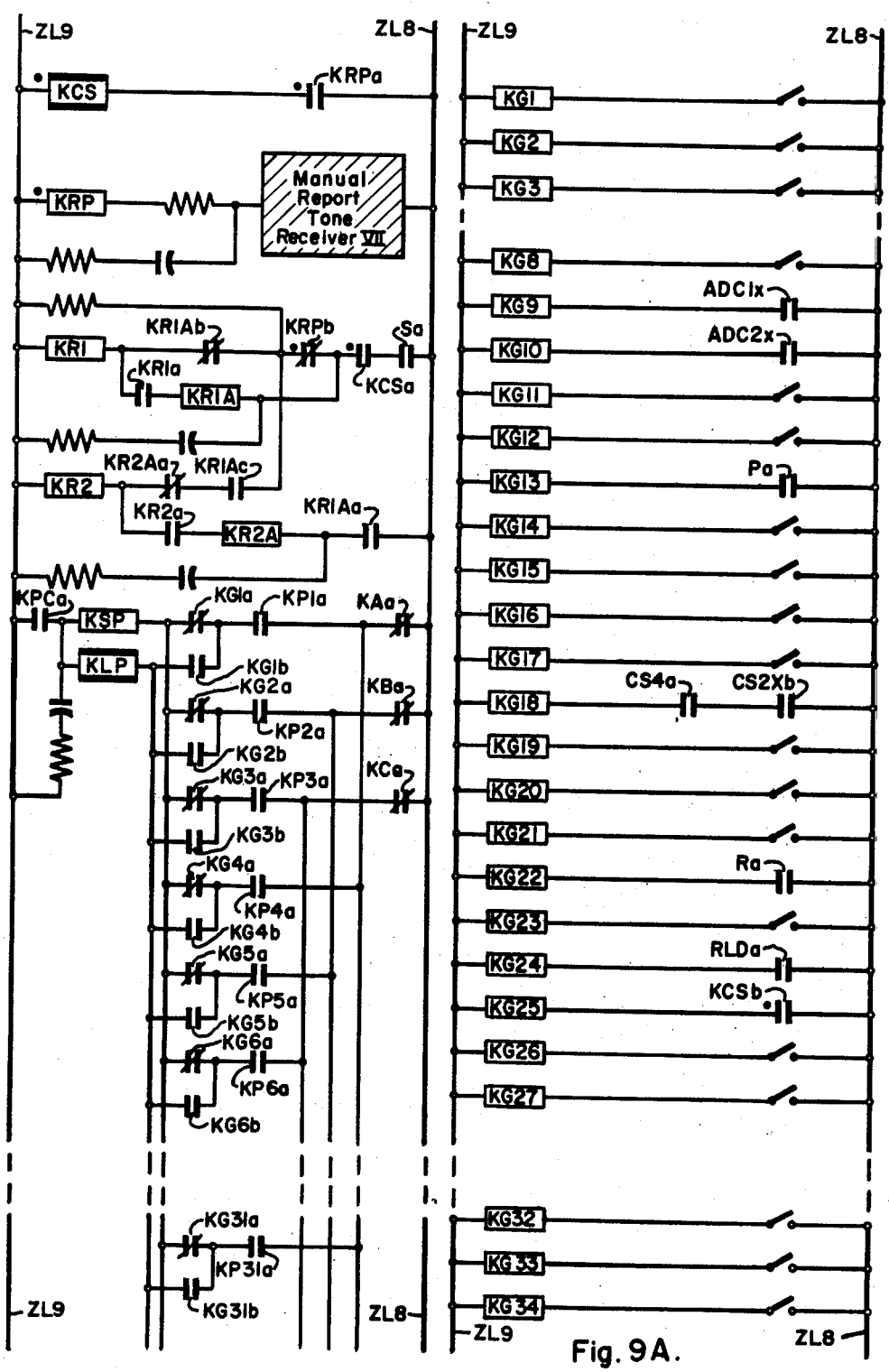
Figure 9B:
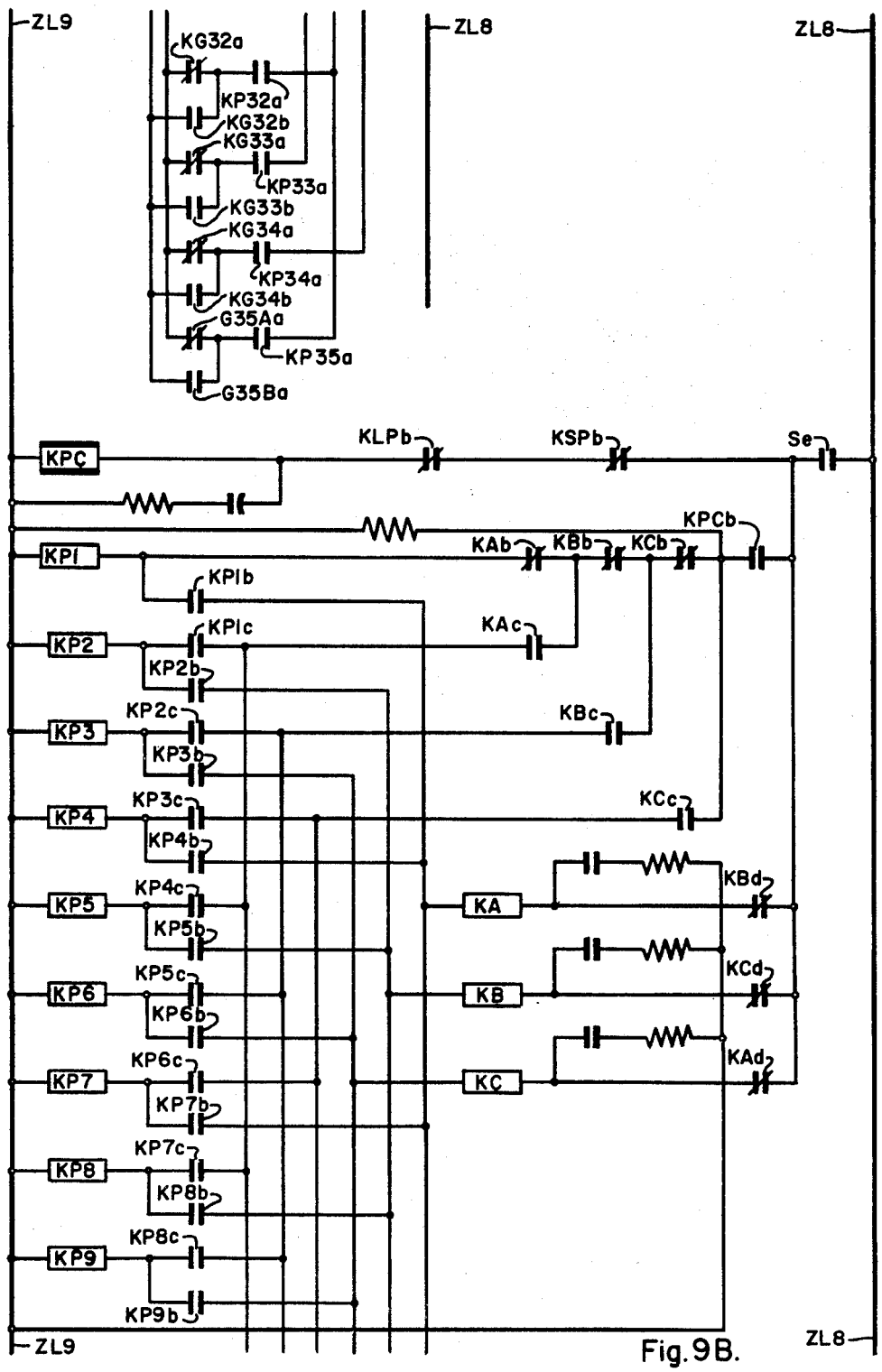

The Sensing Unit includes a plurality of KG relays (FIG. 9A). For the system assumed, in which there are thirty-four dual indicators, there are thirty-four KG relays, KG1 through KG34. Each of these relays is connected between supply conductors ZL8 and ZL9 through the contacts of the indicator relays which are latched in to correspond to the setting of any indicator. Among these contacts are D'C1$a$ and D'C2$a$ (FIG. 6G). These are contacts of D'C1 and D'C2 in the CONTROL RECEIVER which are latched in.

The Memory Unit includes a relay S1 (FIG. 9D). The coil of relay S1 is adapted to be connected between conductors ZL8 and ZL9 through a resistor R$z$ and a capacitor C$z$. When power is first applied to the apparatus, the coil of S1 conducts the charging current of the capacitor C$z$ and is actuated. The relay S1 is locked in through its own front contact S1$b$ and a back contact S3$a$ of a relay S3. The relay S1 is also adapted to be connected between conductors ZL8 and ZL9 through a front contact KR2A$f$ of a KR2A relay and a back contact SD of an S relay, and also on actuation of any of the KG relays through a front contact KG$f$ (for example KG1$f$) of the KG relay and a back contact KG$g$ (for example KG1$g$) of the same relay. These contacts are so arranged that the front contact KG$f$ closes before the back contact KG$g$ opens.

The Conditioning Unit includes the S relay, an S2 relay and an S3 relay. The coil of the S relay is adapted to be connected between conductors ZL8 and ZL9 through a back contact KNR$a$ of a KNR reset relay and a front contact S1$a$ of the S1 relay. The S relay once actuated is locked in through its own contact S$c$ and the back contact KNR$a$. The coil of the S2 relay is adapted to be connected between conductors ZL8 and ZL9 through a front contact S$f$ of the S relay and a front contact KP1$d$ of the KP1 relay, the first relay of the Counter Unit. The S2 relay is adapted to be locked in through its own contact S2$a$. The coil of the S3 relay is adapted to be connected between conductors ZL8 and ZL9 through front contact S$f$ and a back contact S2$b$ of S2.

The Counter Unit includes a plurality of relays KP1 through KP35 (FIG. 9B) and KA, KB and KC and is similar to the Counter Unit of the CONTROL SENDER.

The Code Pulse Producing Unit includes the relays KSP, KLP and KPC. The coils of the relays KSP and KLP are adapted to be connected between conductors ZL8 and ZL9 through back contacts KA$a$, KB$a$, KC$a$ of relays KA, KB and KC, front contacts KP1$a$ through KP35$a$ of the KP relays and selectively through back or front contacts KG1$a$ through KG35$a$ or KG1$b$ through KG35$f$, respectively, of the KG relays, depending on whether a KG relay is actuated or unactuated. The coil of the KPC relay is adapted to be connected between conductors ZL8 and ZL9, through a front contact S$e$ of the S relay and back contacts KSP*b* and KLP*b* of the KSP and KLP relays. A front contact KPC*b* of the KPC relay is connected in circuit with the front contact S*e* and contacts and coils of the KP relays and relays KA, KB, KC in such manner that the Counter Unit counts a set of pulses. The specific connection of the KP and KA, KB and KC relays of the Counter Relay Unit, the KPC and the KSP and KLP relays need not be described in detail since the description of like circuits is included in connection with the CONTROL SENDER. Back contacts (not shown) of the KSP and KLP relays are connected in series to Tone Generator VI (FIG. 3) in such manner that on actuation of either of the relays, the tone of Generator VI is interrupted. The generator is connected to a transmitter to transmit a signal which is modulated to produce a long pulse or a short pulse, depending on whether KLP or KSP is actuated.

Figure 9C:
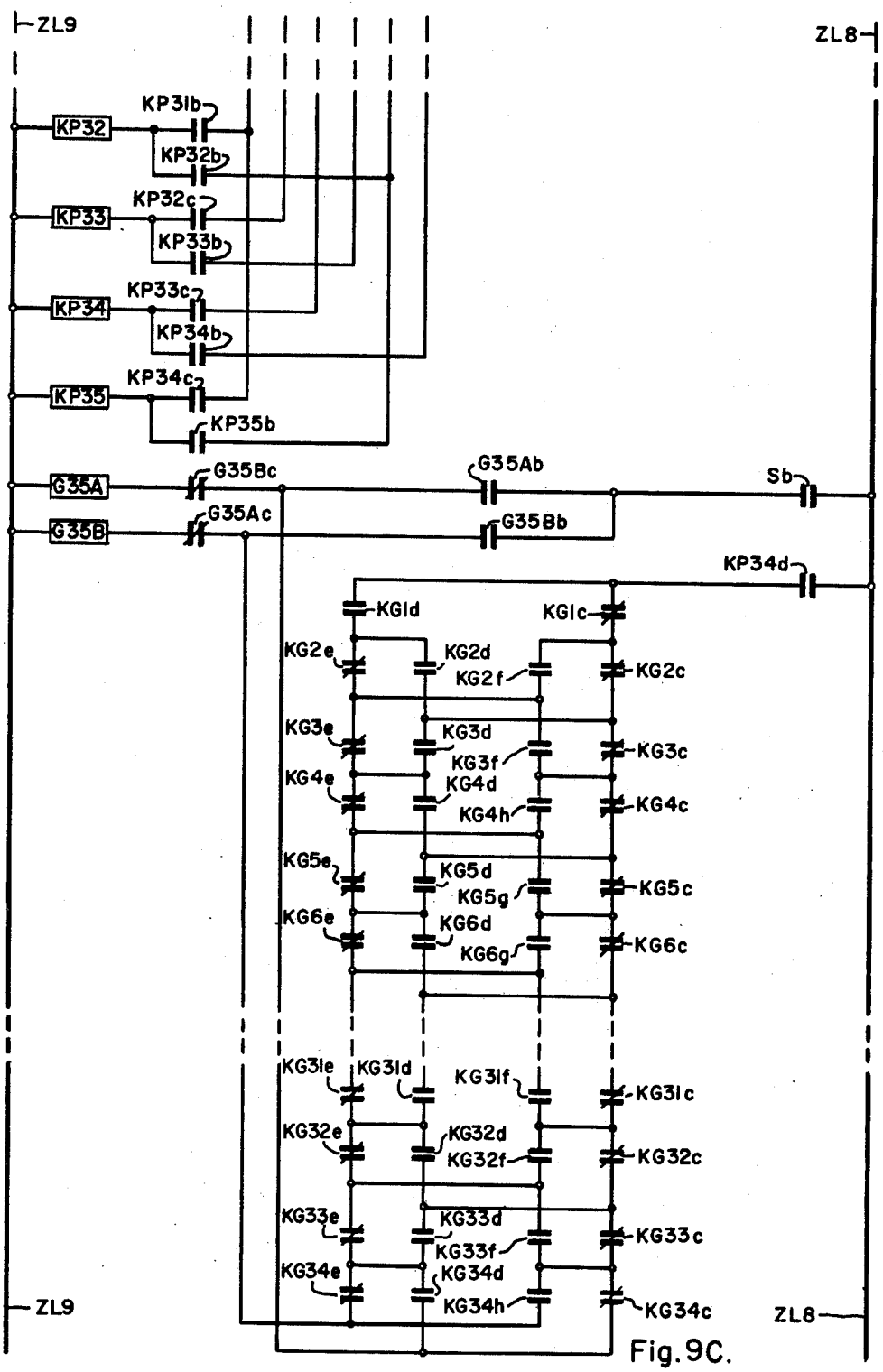

The Odd-Even Determination Unit includes relays G35A and G35B (FIG. 9C).

The respective coils of the G35A and G35B relays are adapted to be connected selectively between conductors ZL8 and ZL9 through a front contact KP34*a* of KP34 and through contacts of the KG relays which are actuated or unactuated, depending on the setting of the indicators to which they correspond. If an odd number of indicators are set so that the corresponding KG relays are actuated, G35B is actuated. If an even number of the indicators are set so that the corresponding KG relays are actuated, G35A is actuated. The coil of G35A is adapted to be locked in between conductors ZL8 and ZL9 through a front contact S*b* of the S relay, a front contact G35A*b* of of G35A and a back contact G35B*c* of G35B. The coil of G35B is adapted to be locked in between conductors ZL8 and ZL9, through the front contact S*b*, a front contact G35B*b* of G35B and a back contact G35A*c* of G35A.

The Reset Unit includes a KNR relay (FIG. 9D) and an NRX relay. The coil of the NRX relay is adapted to be connected between conductors ZL8 and ZL9, through a front contact S*f* of S, a front contact KP35*c* of KP35 and back contacts KLP*c* and KSP*c* of KLP and KSP. The coil of the KNR relay is adapted to be connected between conductors ZL8 and ZL9, through a front contact NRX*a* of NRX. The KNR relay has a back contact KNR*a* in the energizing circuit for the S relay and through the S relay operates to reset the apparatus.

The Manual Command Signal is received by Tone Receiver VII (FIG. 9A) Relay KRP is connected to this Tone Generator. Tone Receiver VII is energized in the standby condition and maintains relay KRP actuated. When a pulse is received, the tone is interrupted and relay KRP is deenergized.

The Pulse Counter associated with the Manual Command Signal is similar to the pulse counters of the CONTROL RECEIVER. It includes the relays KR1, KR2, KR1A and KR2A (FIG. 9A) and counts two pulses. A front contact KR2A*b* of relay KR2A is connected in the energizing circuit for relay S1 so that relay S1 is actuated when a manual command signal is received from the control station. Relay S1 functions as a memory element to start an indicator scanning cycle at the appropriate time on receipt of manual command signal.

*Indication Sender—Standby*

In the standby condition of the apparatus, conductors ZL8 and ZL9 are energized. A pulse is then transmitted through the capacitor and through the coil of S1 (FIG. 9D), actuating S1. Temporarily, relay S1 is locked in through the back contact S3*a* of S3 and its own front contact S1*b*. The actuation of S1 actuates relay S which is locked in through its own front contact SC and the KNR back contact KNR*a*. The actuation of S actuates relay S3 in the Conditioning Unit through the back contact S2*b* of S2 and a front contact S*f* of S. Actuation of relay S3 resets relay S1.

Actuation of S also actuates relay KPC through a front contact S*e* of S (FIG. 9B) and this starts a counting cycle of the Counter Unit during which relays KP1 through KP35 are actuated in succession. Actuation of relay KP1 actuates S2 which resets S3. The lock-in circuit for relay S1 is now in its initial condition and thus is responsive to the actuation of any of the KG relays. The Memory function is thus carried out. If any KG relay is actuated, for example KG1, the S1 relay is actuated and locked in through its front contact S1*b* and back contact S3*a*. The front contact remains locked in until the end of the scanning cycle and at that time relay S is actuated to start another cycle. Relay KP1 remains actuated from the first count until the Counter Unit is reset. Thus renewed starting of a scanning cycle is prevented until after the scanning cycle in progress has been completed and the apparatus reset.

In addition to actuating the Counter Unit, the actuation of relay KPC also starts the actuation of the relays KSP and KLP. As the KP relays of the Counter Unit are actuated, short and long pulses are transmitted in dependence upon the settings of the KG contacts in series with the KSP and KLP relays. For example, if the KG1 relay is unactuated and the KG2 relay actuated, a short pulse will be transmitted by the actuation of KSP through KG1*a* contact when the front contact KP1*a* of KP1 closes and a long pulse will be transmitted through the actuation of relay KLP, through the front contact KP2*a* of KP2 and the front contact KG2*f* of DG2 when relay KP2 is actuated following KP1.

At the completion of a counting cycle, relay KP35 is actuated and relay NRX is actuated through the front contact S*f* of S and a front contact KP35*c* of KP35 and back contacts KLP*c* and KSP*c*. Actuation of relay NRX actuates relay KR and when the latter drops out, relay S is deenergized, resetting the Counter Unit and the Code Pulse Producing Unit for another operation.

In the standby condition of the apparatus, the channel supervisory relay KCS is actuated through a front contact of KRP.

*Indication Sender—Operation*

Operation of the INDICATION SENDER is produced by actuation of the S relay as described above. Such actuation is produced by actuation of the S1 relay. The S1 relay may be actuated when any one of the KG relays are actuated, and the S1 relay is locked in actuating condition until the end of the counting cycle of the Counter Unit and then produces a succeeding counting cycle of the Counter Unit and a succeeding scanning cycle of the indicators. The S1 relay may also be actuated at any time by actuation of the KR2A relay when a manual command signal is received. In this case, the INDICATOR SENDER also passes through a scanning cycle.

*Indication Receiver—Description*

The INDICATION RECEIVER is located at the control station and sets the indicators on the Master Indicator Unit (see CONTROL SENDER) to correspond to the indicators at selected controlled stations. The INDICATION RECEIVER includes Tone Receiver VIII which is connected to receive the signals transmitted by the INDICATION SENDER. Tone Receiver VIII is normally energized, the tone being interrupted for the duration of the pulses received from the INDICATION SENDER.

Tone Receiver VIII controls a Long-Short Pulse Discriminator which distinguishes between the long pulses and the short pulses received at the INDICATION RECEIVER. The Discriminator cooperates with a Pulse Counter and Detector Counter Unit which counts the pulses received.

The INDICATION RECEIVER also includes a Code Register Unit which registers each of the pulses. This Unit is set so as to register long and short pulses corresponding to each count of the Counter Unit. The Code Register Unit controls the Master Indicator Unit which sets indicator lamps to correspond to the registration of the Code Registration Unit.

The INDICATION SENDER transmits thirty-four pulses corresponding to the thirty-four dual indicators and a thirty-fifth check pulse. The INDICATION RECEIVER includes an Odd-Even Check Unit for checking purposes. This Unit is connected to the Counter Unit and to the Code Register Unit to check the correctness of the code. If the code is correct, a Normal Reset Unit is actuated. If the code checks incorrect, an Abnormal Reset Unit is actuated. In either event, the Counter and Detector and the other apparatus are reset, but when the Abnormal Reset Unit is actuated, an alarm is energized to indicate improper operation.

There is also an extra Pulse Check Unit which is actuated in the event that a spurious thirty-sixth pulse is received. This unit actuates the Abnormal Reset Unit to produce resetting and energizes an alarm. In addition, there is an Interrupted Operation Reset Unit which operates to reset the apparatus in the event of incomplete or interrupted operation.

Tone Receiver VIII is connected to maintain a keying relay MRP (FIG. 10A) actuated so long as it is energized.

Figure 10A:
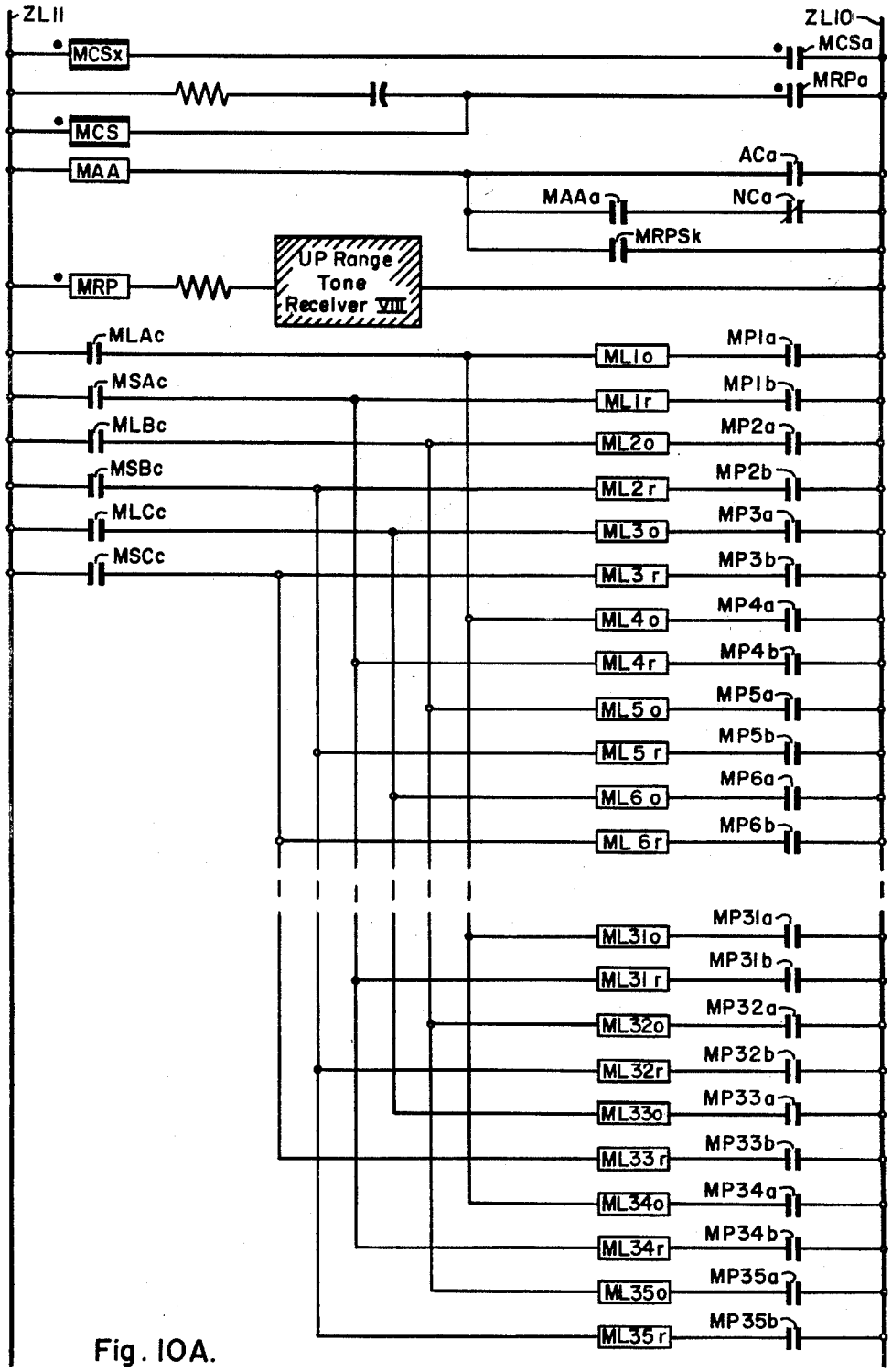
Figure 10B:
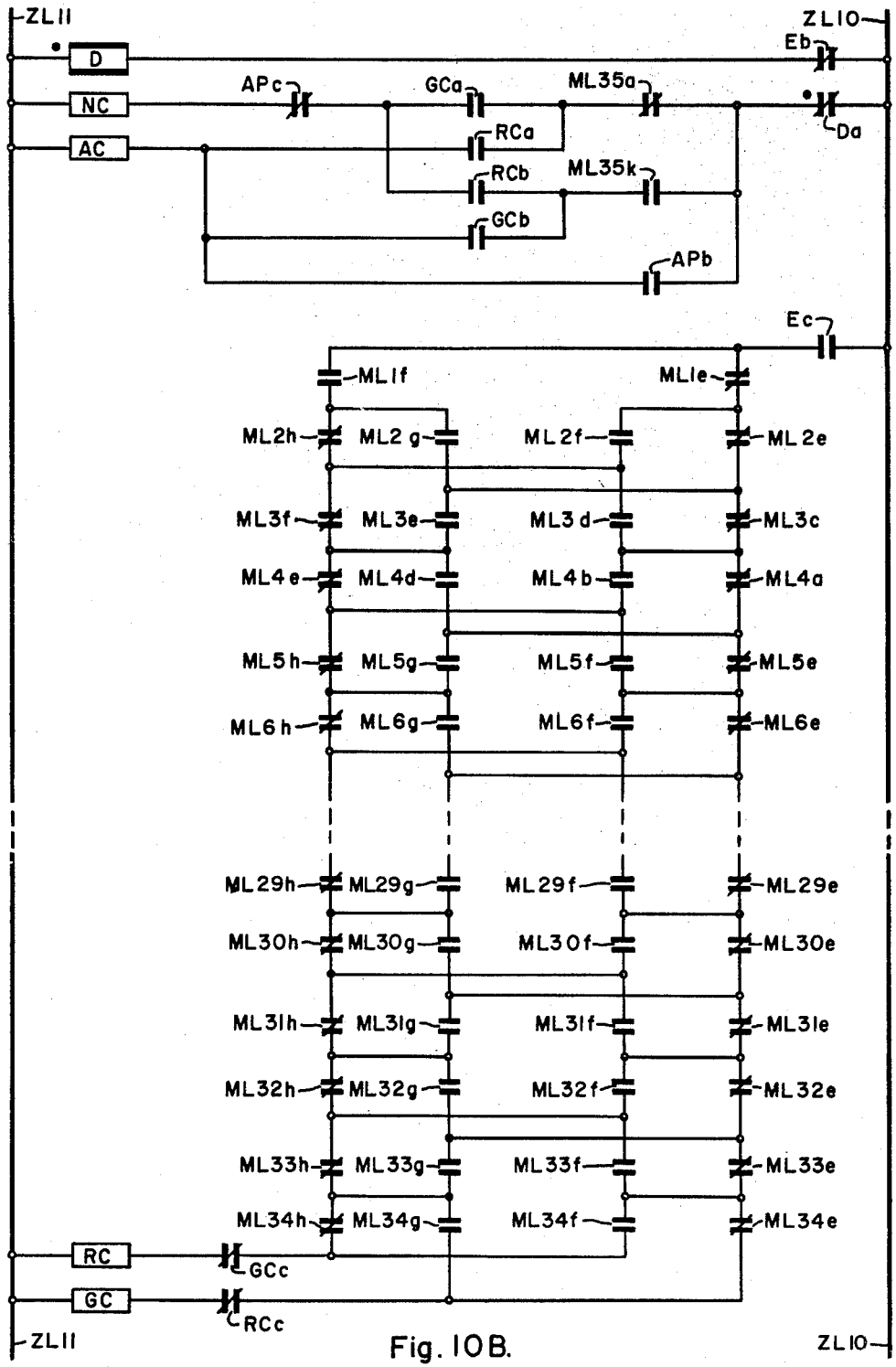
Figure 10C:
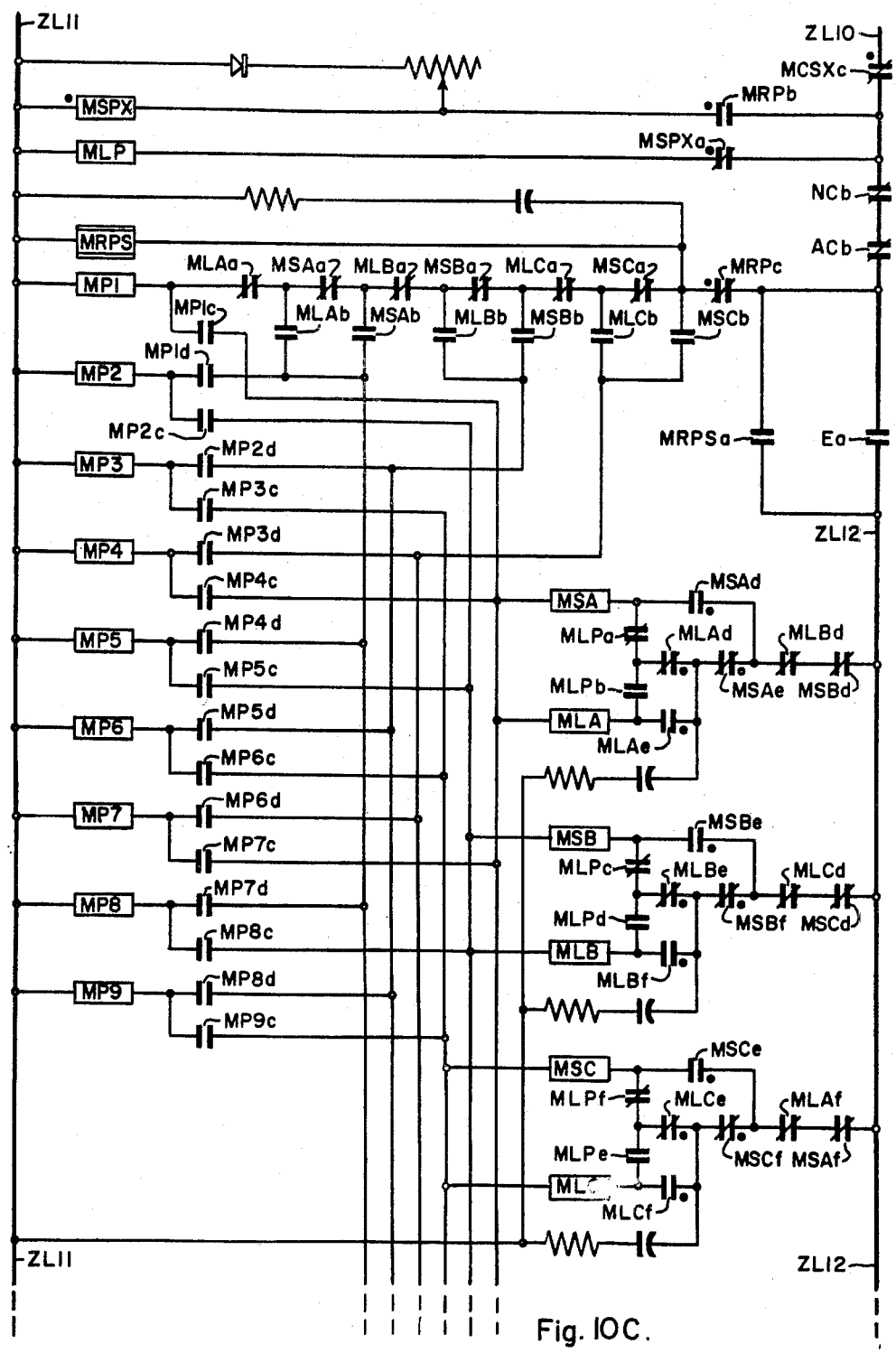
Figure 10D:
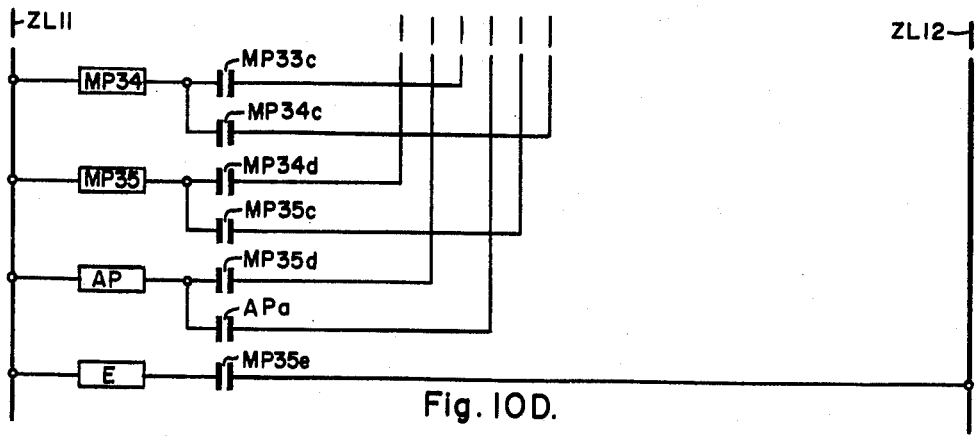

The Long-Short Pulse Discriminator includes relays MSPX and MLP (FIG 10C). The coil of relay MSPX is adapted to be connected between supply conductors ZL11 and ZL12 through a front contact MCSXc of an MCSX supervisory relay and a front contact MRPb of the MRP relay. The coil of the MLP relay is adapted to be connected between conductors ZL10 and ZL11 through the front contact MCSXc and a back contact MSPXa of the MSPX relay.

The Pulse Counter and Detector is similar to the Detector of the CONTROL RECEIVER except that it includes thirty-five counter relays MP1 through MP35 and an extra pulse relay AP in addition to the relays MSA, MLA, MLC, MSB, MLB, MLC, which discriminate between long and short pulses, the connection of the counter relays MP1 through MP35 and AP and the relays MSA through MLC are similar to the corresponding connection of the relays DP1 through DL10 and SA, LA, SB, LB, SC and LC in the CONTROL RECEIVER.

The Pulse Counter and Detector is adapted to be energized from a conductor ZL12 which is adapted to be connected to conductor ZL10 alternatively through front contacts MRPSa or Ea of MRPS or E relays and back contacts ACb, NCb, MCSXc of the AC, NC and MCSX relays.

The Code Register Unit includes a plurality of relays ML1 through ML35 (FIG. 10A). Each of these relays includes an operating coil and a reset coil identified as MLo and MLr respectively and are latched into any position in which they are set. The operating coils of the relays ML1 through ML35 are adapted to be connected between conductors ZL10 and ZL11 through a front contact MP1a through MP35a of a corresponding MP relay and a front contact MLAc, MLBc, MLCc of relay MLA, MLB or MLC, depending on the order number of the ML coil. For example, the operating coil ML1o is adapted to be connected between conductors ZL10 and ZL11 through front contact MP1a and front contact MLAc and the operating coil ML3o is adapted to be connected between conductors ZL10 and ZL11 through front contact MP3a and front contact MLCc. The reset coils of relays ML1 through ML35 are adapted to be connected between conductors ZL10 and ZL11 through a front contact MP1b through MP35f of the corresponding MP relay and a front contact MSAc, MSBc, MSCc of the associated relays MSA, MSB or MSC. Thus, the reset coil ML1r is adapted to be connected between conductors ZL10 or ZL11 through the front contact MP1b and front contact MSAc and the reset coil MS3r is adapted to be connected between conductors ZL10 and ZL11 through front contact MP3b and front contact MSCc. As indicated by the letters L and S in their identifications, relays MLA, MLB and MLC are actuated for long pulses and relays MSA, MSB and MSC are actuated for short pulses.

Figure 10E:
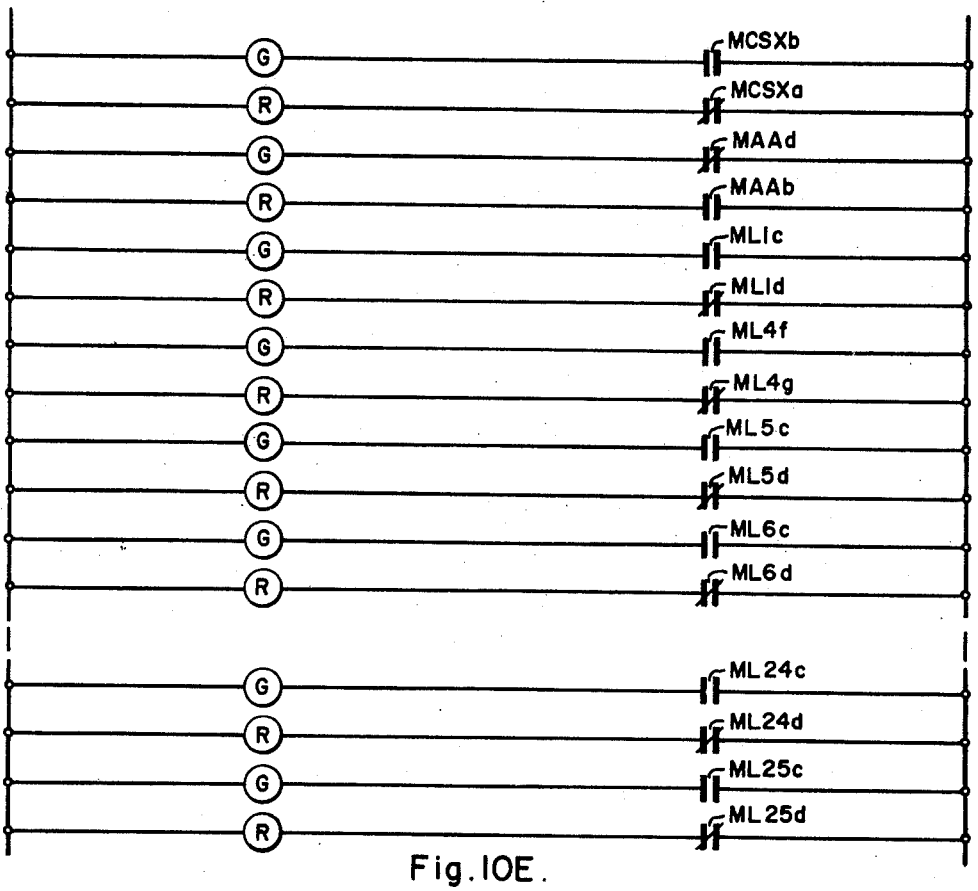

The INDICATION UNIT includes a plurality of sets of green and red lamps identified as G and R (FIG. 10E). Each of the green lamps is adapted to be energized from alternating-current conductors ZL13 and ZL14 through a front contact of one of an associated ML relay. Each red lamp is adapted to be maintained energized through a back contact of an associated ML relay.

The Odd-Even Check Unit includes relays RC and GC. The coils of relays RC and GC (FIG. 10B) are adapted to be connected between conductors ZL12 and ZL11, selectively depending on whether or not the number of ML relays actuated is odd or even. The connection is through a front contact Ec of the E relay, which is actuated to signal the end of a coding cycle. For example, if only the first ML relay, ML1, is actuated, a circuit is closed which extends from ZL12 through front contact Ec, the front contact ML1f of the ML1 relay, back contacts ML2h, ML3f, ML4e and ML5h through ML34h of relays ML2 through ML34 and a back contact GCc of the GC relay and the coil of the RC relay. If both the ML1 relay and the ML2 relay are actuated, a circuit is closed which extends from conductor ZL12 through the front contact Ec, the front contacts ML1f and ML2g of ML1 and ML2 and back contacts ML3c, ML4a, ML5e through ML34e of ML3 through ML34 and a back contact RCc of RC, the coil of GC to ZL12. Thus, RC is actuated for an odd number of ML relays energized and GC for an even number of relays.

The Normal Reset Unit includes a relay NC (FIG. 10B). The coil of this relay is adapted to be connected between conductors ZL10 and ZL11 through a back contact Da of a D relay, a back contact ML35a of the ML35 relay, a front contact GCa of the GC relay and a back contact APc of the AP relay. The coil of NC is also adapted to be connected between the conductors ZL10 and ZL11 through the back contact Da, a front contact ML35k of ML35, a front contact RCb of RC and the back contact APc. Thus, when the thirty-fifth pulse is short and ML35 is unactuated, relay NC is actuated if GC is actuated, that is, if the number of relays, ML1 through ML34, actuated is even, but if the thirty-fifth pulse is long so that ML35 is actuated, NC is actuated only if RC is actuated and it responds only if the number of relays, ML1, through ML34, actuated is odd.

The abnormal Reset Unit includes relays AC (FIG. 10B) and MAA (FIG. 10A). The coil of relay AC is adapted to be connected between conductors ZL10 and ZL11 through the back contact Da, the back contact ML35a, and front contact RCa. The coil of relay AC is also adapted to be connected between conductors ZL10 and ZL11 through Da, ML35k, GCb. The coil of relay AC is also adapted to be connected between conductors ZL10 and ZL11 through the back contact Da and a front contact APb of AP. Thus, the relay AC is actuated in the event that the odd-even count is incorrect or a spurious pulse is received. Since conductor ZL12 is energized through back contacts NCb and ACb of NC and AC, the actuation of either NC or AC deenergizes ZL10 and resets the apparatus.

An alarm relay MAA is also adapted to be connected between conductors ZL10 and ZL11 through a front contact Aca of AC and to be locked in through a front contact MAAa of MAA and a back contact NCa of NC.

The Interrupted Operation Reset Unit includes relay MRPS (FIG. 10C). The coil of this relay is adapted to be connected between conductors ZL10 and ZL11 through back contacts MCSXc, NCf, ACf and MRPc. Thus on the receipt of the first pulse, when MRP becomes energized MRPS is energized. The timing interval of MRPS is longer than the gaps between the pulses. Thus during the coding interval, MRPS remains energized maintaining conductor ZL12 connected to conductor ZL10. At the end of the coding interval, relay E is actuated connecting conductor ZL12 to conductor ZL10 independently of the MRPS front contact MRPSa. If the coding should be interrupted before relay E is actuated, MRPS would be deenergized, disconnecting conductor ZL12 from conductor ZL10 and resetting the apparatus.

*Indication Receiver—Standby*

In the standby condition of the INDICATION RECEIVER, conductors ZL10 and ZL11 are energized. Since Tone Receiver VIII is energized, MRP is actuated. Supervisory relays MCSX and MCS are then actuated. MSPX is also actuated and MLP is deenergized. Since MRP is actuated, MRPS is deenergized and conductor ZL12 is deenergized so that the Pulse Counter and Detector is deenergized. Since the Pulse Counter and Detector is deenergized, the MP relays are deenergized and the ML relays are in the condition in which they were left when the apparatus was turned off.

For the purpose of explaining the operation of the system, it may be assumed that the ML relays are all in the Reset Position. With the ML relays in the Reset Position, all of the signal lamps are red.

*Indication Receiver—Operation*

In explaining the operation, assume that a code is received and that the third and sixth pulses of this code are long and the remainder short. On the receipt of the first pulse of the code, MRP is deenergized, actuating MRPS and energizing conductor ZL12. The time interval of MRPS is such that MRPS remains actuated during the whole interval during which the thirty-five pulses are received. If the pulsing is interrupted before the thirty-fifth pulse is received, MRPS drops out deenergizing ZL12 and resetting the Detector and the Odd-Even Check Unit.

Since the first pulse is short, relays MR1 and MSA are actuated, energizing coil ML1R. This has no effect since relay ML1 is already in the Reset Position. The same situation arises for the second pulse which is also short. The third pulse is long and in this case MP3 and MLC are actuated. This energizes the operate coil of the ML3 relay, actuating the relay to the operate position and deenergizing the associated red lamp and energizing the associated green lamp. Relays ML4 and ML5 are unaffected by the coding, but the sixth pulse being long, the operate coil of ML6 is actuated, deenergizing the associated red lamp and energizing the associated green lamp. The other pulses being short, the remaining ML relays and lamp are unaffected. Since the code signal contains an even number of long pulses, the thirty-fifth pulse is short. MSB and MP35 are then actuated. This energizes the reset coil of ML35. The actuation of MP35 actuates relay E, in turn deenergizing relay D which drops out. The actuation of relay E provides an energizing circuit for ZL12 through the front contact Ea of E. Since the coding now is terminated, MRPS drops out but this has no effect on ZL12. In addition, since relays ML3 and ML6 are actuated, relay GC is actuated. In the absence of a spurious pulse, relay NC is now actuated through the back contact Da of D, the back contact ML35a of ML35, the front contact GCa of GC, the back contact APc of AP. The actuation of NC deenergizes conductor ZL12.

The actuation of NC deenergizes ZL12, resetting the apparatus. In the event that the pulsing stops before MP35 is actuated, MRPS drops out deenergizing ZL12 and resetting the apparatus. In addition, the alarm relay MAA is actuated through a front contact MRPSk of MRPS and locked in.

If the code does not check correctly, RC is actuated rather than GC. Under such circumstances, relay AC is actuated through back contact DA, back contact ML35a, and front contact of RCa. The actuation of relay AC actuates the apparatus and energizes the alarm of MAA. When a spurious pulse is receiver, relay AP is actuated. The actuation of AP prevents actuation of NC and produces actuation of AC through back contact Da and the front contact APb. The above-described Resetting and Alarm Indication is then produced.

If Tone Receiver VII is disabled relay CS is deenergized, KG25 is deenergized and the signals are scanned.

*Conclusion*

It is seen that a complete supervisory system for a control station and a plurality of controlled stations are disclosed herein. The system includes provisions for actuating apparatus at the controlled stations in various ways and also apparatus for communicating the settings of the indicators which correspond to the conditions or states of the actuated apparatus. The coding is of the binary type by means of long and short pulses or broadly by means of long or short signal components. One of the important features of the invention is the inclusion of apparatus for determining whether each signal component is long or short before apparatus or indicators are set to respond to it. For example, in apparatus in accordance with the teachings of the prior art, the receipt of a long signal component at the INDICATION RECEIVER would first energize the red lamp and then, if the signal component turned out to be long, would deenergize the red lamp and energize the green lamp. Any automatic controlled operation such as that taking place through the Automatic Selecting Unit of the CONTROL SENDER could then start and thus the possibility of misoperation would be greatly increased.

While a preferred embodiment of this invention has been disclosed herein, many modifications thereof are feasible. This invention then is not to be restricted except insofar as is necessitated by the spirit of the prior art.

We claim as our invention:

1. Apparatus for controlling remotely from a sending station at least one device at a receiving station, said receiving station including an indication system for indicating the condition of said device and related devices, there being a control communication channel and an indication communication channel between said sending and receiving stations, said control channel to transmit signals from said sending to said receiving station to actuate said device and said indication channel to transmit signals from said receiving to said sending station, the said apparatus including manually operable switch means for setting the desired condition of said device, automatically operable switch means for setting the condition of said device, means connected to said manually operable switch means and actuable responsive to the setting thereof for transmitting a signal corresponding to said last-named setting over said control channel to said receiving station, means responsive to a signal received by said sending station through said indication channel connected to said automatically operable switch means for setting said last-named switch means in accordance with said received signal, means connected to said automatically operable switch means and actuable responsive to the setting thereof for transmitting to said receiving station a signal over said control channel corresponding to said last-named setting, said means responsive to a signal received by said sending station including means for resetting said apparatus following the transmitting of a signal to said receiving station, and interlock means between said means connected to said manually operable switch means and said means connected to said automatically operable switch means preventing the actuation of one of said last-named connected means if the other connected means is previously actuated.

2. Apparatus for controlling remotely from a sending station at least one device at each of a plurality of receiving stations, each of said receiving stations including an indication system for indicating the condition of its associated and related devices, said sending station communicating with each receiving station through a control communication channel through which signals are transmitted from said sending station to said last-named receiving station to control the associated device, and through an indication communication channel through which signals are transmitted from said last-named receiving station to said sending station to indicate the condition of said device at said last-named receiving station, the said apparatus including first manually operable switch means at said sending station for selecting one of said receiving stations, second manually operable switch means for setting the condition of said device at each of said stations, conditioning means connecting said first means to said second means to condition said second means to be operated on operation of said first means to select one of said receiving stations, means connected to said second switch means when conditioned as aforesaid and actuable responsive to the setting thereof for transmitting to said selected one of said receiving stations over the corresponding control channel a signal corresponding to the setting of said second switch means, automatically operable switch means for setting the condition of said device at each said station, means connected to said automatically operable switch means responsive to a signal received by said sending station through one of said indication channels for setting said automatically operable switch means in accordance with said last-named signal, means connected to said automatically operable switch means and actuable responsive to the setting thereof for transmitting to at least one of said receiving stations over the corresponding control channel a signal corresponding to said last-named setting to set the associated device in a condition corresponding to said last-named setting, and interlock means between said means connected to said second switch means and said last-mentioned means connected to said automatically operable switch means preventing the actuation of one of said last-named connected means if the other last-named connected means is previously actuated.

3. In a communication system, the apparatus including means for producing a code signal consisting of a predetermined number of signal components of a first type and a predetermined number of signal components of a second type in a predetermined order and an additional checking signal component of the first or second type depending on whether one of said predetermined numbers is odd or even, said signal components of said first and second types being of first and second durations, respectively, normal reset means, timing means, abnormal reset means, means responsive to said additional checking signal component and connected to said normal reset means for conditioning said normal reset means to reset said producing means on transmission of said additional checking signal component, means responsive to said additional checking signal component and connected to said timing means for actuating said timing means to time out on transmission of said additional checking signal component, and means responsive to said additional checking signal component and connected to said abnormal reset means for conditioning said abnormal reset means to reset said producing means independently of said normal reset means on the timing out of said timing means.

4. In a communication system, the apparatus including means for producing a code signal consisting of a predetermined number of signal components of a first type and a predetermined number of signal components of a second type in a predetermined order and an additional checking signal component of the first or second type depending on whether one of said predetermined numbers is odd or even, said signal components of said first and second types being of first and second durations, respectively, means for receiving a confirming code signal following the completion of the transmission of said first-named code signal by said producing means, said receiving means being quiescent in the standby condition of said apparatus, means responsive to said additional checking signal component connected to said receiving means for conditioning said receiving means to receive as aforesaid on the transmission of said additional checking signal component, and means connected to said receiving means and said producing means for resetting said producing means following the receipt of said confirming signal.

5. In a communication system, the apparatus including means for producing a code signal consisting of a predetermined number of signal components of a first type and a predetermined number of signal components of a second type in a predetermined order and an additional checking signal component of the first or second type depending on whether one of said predetermined numbers is odd or even, said signal components of said first and second types being of first and second durations, respectively, means for receiving a confirming code signal following the completion of the transmission of said first-named code signal by said producing means, said receiving means including means for decoding said confirming signal, said decoding means being quiescent in the standby condition of said apparatus, means responsive to said additional checking signal component connected to said decoding means for conditioning said decoding means to decode as aforesaid on the transmission of said additional component, means connected to said decoding means and said producing means for resetting said producing means following the decoding of said confirming signal, timing means, means responsive to said additional checking signal component connected to said timing means for starting the timing out of said timing means on the transmission of said additional checking signal component, means connected to said timing means and said producing means for resetting said producing means on the timing out of said timing means, said timing means timing out in an interval appreciably longer than that required for said decoding.

6. In combination, means to be actuated for producing selectively a long signal component or a short signal component, counting means connected to said actuable means for counting a first predetermined number of said components, memory means connected to said actuable means and to said counting means when set actuating said actuable means to produce said first predetermined number of components following the completion of a component producing operation in progress, if any, when said memory means is set, means for receiving and counting a second predetermined number of signal components independently of said first-mentioned counting means, and means connecting said receiving means and said memory means to set said memory means to actuate said actuable means as aforesaid on the receipt of said second number of components.

7. Supervisory control apparatus for controlling a first station having first equipment to be actuated, and also having first means for producing signals revealing the state of the operation of said first equipment and second means for producing signals revealing the state of operation of second equipment at a second station, the said apparatus comprising first code receiving means, means connecting said first code receiving means to said first equipment for selectively operating said first equipment in dependence upon the code received by said receiving means, means responsive to the operation of said first equipment and connected to said first signal producing means for actuating said first signal producing means to signal said last-named operation, code transmitting means, means connected to said transmitting means and responsive both to the operation of said first equipment and to said actuation of said first signal producing means for transmitting a code indicating the operation of said first equipment, second code receiving means responsive to a code indicating said operation of said second equipment, reset means connected to said selectively operating means when actuated resetting said selectively operating means, means connecting said reset means to said second code receiving means for actuating said reset means on the receipt of a code by said second code receiving means, and means connecting said second signal producing means to said second code receiving means for actuating said second signal producing means on the receipt of a code by said second code receiving means.

8. Supervisory control apparatus for controlling a first station having first equipment to be actuated and also having means for producing signals revealing the state of the operation of second equipment at a second station, the said apparatus comprising first code receiving means, means connecting said first code receiving means to said first equipment for selectively operating said first equipment in dependence upon the code received by said code receiving means, code transmitting means, means connected to said code transmitting means and responsive to the operation of said first equipment for transmitting a code indicating the operation of said first equipment, second code receiving means responsive to a signal indicating said operation of said second equipment, said second code receiving means including means connected to said selectively operating means for preventing operation of said second code receiving means on the receipt by said first code receiving means of a code for producing operation of said first equipment, reset means connected to said selectively operating means when actuated resetting said selectively operating means, means connecting said reset means to said second code receiving means for actuating said reset means on the receipt of a code by said second code receiving means, and means connecting said signal producing means to said second code receiving means for actuating said signal producing means on the receipt of a code by said second code receiving means.

9. Supervisory control apparatus for controlling a first station having first equipment to be actuated, said first station cooperating with a second station having a second equipment to be operated, the said apparatus comprising first code receiving means, means connecting said first code receiving means to said first equipment for selectively operating said first equipment in dependence upon the code received by said receiving means, code transmitting means, means connected to said transmitting means and responsive to the operation of said first equipment for transmitting a code indicating the operation of said equipment, second code receiving means responsive to a code indicating operation of said second equipment at said second station, reset means connected to said selectively operating means when actuated resetting said selectively operating means, and means connecting said reset means to said second code receiving means for actuating said reset means on the receipt of a code by said second code receiving means.

10. Supervisory control apparatus for controlling a first station having first equipment to be actuated, said first station cooperating with a second station having second equipment, the said apparatus comprising first code receiving means, means connecting said first means to said first equipment for selectively operating said first equipment in dependence upon the code received by said receiving means, code transmitting means, means connected to said transmitting means and responsive to the operation of said first equipment for transmitting a code indicating the operation of said equipment, second code receiving means responsive to a code indicating operation of said second equipment at said second station, said second code receiving means including means connected to said selectively operating means for preventing operation of said second code receiving means on the receipt by said first code receiving means of a code for producing operation of said first equipment, reset means connected to said selectively operating means when actuated resetting said selectively operating means, and means connecting said reset means to said second code receiving means for actuating said reset means on the receipt of a code by said second code receiving means.

11. Supervisory control apparatus for controlling a station having equipment to be actuated, the said apparatus comprising first code receiving means, verifying means connected to said first code receiving means for verifying the correctness of the code received by said receiving means, means connecting said first code receiving means to said equipment when conditioned actuable for selectively operating said equipment in dependence upon the code received by said receiving means, means connecting said selectively operating means to said verifying means for conditioning said selectively operating means to be actuated as aforesaid on the verification of a code received by said receiving means, code transmitting means, and means responsive to said operation of said equipment and connected to said transmitting means for operating said transmitting means to transmit a code indicating said last-named operation.

12. Supervisory apparatus for producing selectable functions at a controlled station from a control station, comprising a first plurality of relays at said control station, each of said relays having an energized and a deenergized condition, the energization and deenergization of individual ones of said relays in any setting of said plurality determining the selection of said functions, an energizing circuit for each of said relays connected to each of said relays and including means in said circuit for latching said circuit in energized condition so that on reenergization following deenergization of said circuit each circuit which was energized before said deenergization is reenergized, a second plurality of relays each relay corresponding to a relay of said first plurality, and means connected to a relay of said first plurality and responsive to a function selection operation at said controlled station for energizing each corresponding relay of said second plurality, the polarity of the current energizing each relay of said second polarity depending on the condition of the corresponding relay of said first polarity.

13. Communication apparatus including a sending station, a first receiving station, a second receiving station, confirming signal transmitting means at said first receiving station, confirming signal receiving means at said first receiving station, means connected to said transmitting means and responsive to the completion of an operation at said first receiving station for actuating said transmitting means to transmit a confirming-signal, means connected to said confirming-signal receiving means responsive to the completion of an operation at said second station for actuating said receiving means, means connected to said transmitting means for resetting said first receiving station for reception on the completion of said transmissions of said confirming signal, and means connected to said receiving means for resetting said first receiving station for reception on said actuation of said receiving means.

14. Communication apparatus including a sending station, a first receiving station, a second receiving station, confirming signal transmitting means at said first receiving station, confirming signal receiving means at said first receiving station, means connected to said transmitting means and to said receiving means and responsive to the completion of an operation at said first receiving station for precluding the operation of said confirming signal receiving means and for actuating said transmitting means to transmit a confirming signal, means connected to said transmitting means and to said confirming signal receiving means responsive to the completion of an operation at said second station for precluding the actuation of said transmitting means and for actuating said receiving means, means connected to said transmitting means for resetting said first receiving station for reception on the completion of said transmissions of said confirming signal, and means connected to said receiving means for resetting said first receiving station for reception on said actuation of said receiving means.

(References on following page)

References Cited in the file of this patent

UNITED STATES PATENTS

| | | | |
|---|---|---|---|
| Re. 23,601 | Hamming et al. | Dec. 23, | 1952 |
| 1,620,987 | Trenor | Mar. 15, | 1927 |
| 2,114,255 | Powell | Apr. 12, | 1938 |
| 2,241,899 | Brown | May 13, | 1941 |
| 2,273,383 | Snavely et al. | Feb. 17, | 1942 |
| 2,276,646 | Boswau | Mar. 17, | 1942 |
| 2,399,734 | Hailes et al. | May 7, | 1946 |
| 2,409,696 | Lewis | Oct. 22, | 1946 |
| 2,411,375 | Jackel | Nov. 19, | 1946 |
| 2,420,546 | Lewis | May 13, | 1947 |
| 2,424,566 | Heron | July 29, | 1947 |
| 2,444,243 | Breese | June 29, | 1948 |
| 2,515,968 | Shanklin | July 18, | 1950 |
| 2,520,007 | Hochgraf | Aug. 22, | 1950 |
| 2,623,939 | Derr | Dec. 30, | 1952 |
| 2,626,382 | Coley | Jan. 20, | 1953 |
| 2,674,727 | Spielberg | Apr. 6, | 1954 |
| 2,698,425 | Miller | Dec. 28, | 1954 |
| 2,707,778 | Neiswinter | May 3, | 1955 |
| 2,719,959 | Hobbs | Oct. 4, | 1955 |
| 2,788,517 | Smoot et al. | Apr. 9, | 1957 |
| 2,848,707 | Emmel | Aug. 19, | 1958 |
| 2,883,647 | Leeds et al. | Apr. 21, | 1959 |
| 2,897,480 | Kumagai | July 28, | 1959 |
| 3,048,820 | Derr et al. | Aug. 7, | 1962 |

FOREIGN PATENTS

| | | | |
|---|---|---|---|
| 686,829 | Great Britain | Feb. 4, | 1953 |
| 211,165 | Australia | Nov. 15, | 1956 |

OTHER REFERENCES

Book: "Design of Switching Circuits," by Keister et al., Van Nostrand Co., 1951, pp. 425–430 relied on.